(12) United States Patent
Whiteley et al.

(10) Patent No.: US 11,580,514 B1
(45) Date of Patent: Feb. 14, 2023

(54) REDUCED FRICTION FOR MERCHANT INTERACTIONS

(71) Applicant: Block, Inc., San Francisco, CA (US)

(72) Inventors: Sivan Whiteley, Los Altos Hills, CA (US); Kirupa Pushparaj, Santa Clara, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 16/894,330

(22) Filed: Jun. 5, 2020

(51) Int. Cl.
| G06Q 20/40 | (2012.01) |
| G06K 9/00 | (2022.01) |
| G06Q 20/20 | (2012.01) |
| G06Q 20/32 | (2012.01) |
| G06Q 20/24 | (2012.01) |

(Continued)

(52) U.S. Cl.
CPC ........... *G06Q 20/204* (2013.01); *G01K 3/005* (2013.01); *G01K 13/20* (2021.01); *G06Q 20/108* (2013.01); *G06Q 20/201* (2013.01); *G06Q 20/209* (2013.01); *G06Q 20/24* (2013.01); *G06Q 20/3223* (2013.01); *G06Q 20/3224* (2013.01); *G06Q 20/3267* (2020.05); *G06Q 20/36* (2013.01); *G06Q 30/0226* (2013.01); *G06Q 30/0282* (2013.01); *G06Q 30/0631* (2013.01); *G06Q 40/025* (2013.01); *H04L 51/04* (2013.01); *G06F 3/04847* (2013.01)

(58) Field of Classification Search
CPC ............. G06Q 20/204; G06Q 20/3267; G06Q 20/108; G06Q 20/201; G06Q 20/209; G06Q 20/24; G06Q 20/3223; G06Q 20/3224; G06Q 20/36; G06Q 30/0226; G06Q 30/0282; G06Q 30/0631; G06Q 40/025; H04L 51/04; G06F 3/04847; G01K 13/20; G01K 13/005
See application file for complete search history.

(56) References Cited

U.S. PATENT DOCUMENTS 6,386,448 B1 * 5/2002 Addy .................. G07G 1/0036
235/383
8,326,747 B2 * 12/2012 Ang .................. G06Q 30/0207
705/38

(Continued)

*Primary Examiner* — Talia F Crawley
(74) *Attorney, Agent, or Firm* — Lee & Hayes, P.C.

(57) ABSTRACT

Improvements to existing technologies associated with point-of-sale transactions and merchant ecosystems to, among other things, reduce in-person contact and, in some examples, improve the efficiency at which point-of-sale transactions are completed (i.e., reduce friction) are described. In some examples, such reduced in-person contact and/or improved efficiencies can limit transmission of infectious diseases. As such, techniques described are directed to modifying aspects of point-of-sale transactions such that they occur on different computing devices (e.g., customer computing devices instead of merchant computing devices), are automated, and/or occur at different times than with conventional point-of-sale transactions. Furthermore, in at least one example, techniques described can leverage a distributed, network-based merchant ecosystem—comprising multiple merchant computing devices and/or customer computing devices that are specially configured to communicate with a service provider—to facilitate social distancing, which can reduce in-person contact and, in some examples, improve the efficiency at which point-of-sale transactions are completed.

20 Claims, 23 Drawing Sheets

(51) Int. Cl.
  *G06Q 20/10* (2012.01)
  *G06Q 40/02* (2023.01)
  *G06Q 30/0282* (2023.01)
  *G06Q 30/0226* (2023.01)
  *G06Q 20/36* (2012.01)
  *G06Q 30/0601* (2023.01)
  *G01K 3/00* (2006.01)
  *H04L 51/04* (2022.01)
  *G01K 13/20* (2021.01)
  *G06F 3/04847* (2022.01)

(56) References Cited

U.S. PATENT DOCUMENTS

| | | | | |
|---|---|---|---|---|
| 10,019,698 | B1* | 7/2018 | Scott | G06Q 20/102 |
| 2002/0170782 | A1* | 11/2002 | Millikan | G07G 1/0054 |
| | | | | 186/61 |
| 2004/0199475 | A1* | 10/2004 | Rivest | G06Q 20/04 |
| | | | | 705/67 |
| 2006/0080236 | A1* | 4/2006 | Welker | G06Q 40/00 |
| | | | | 705/40 |
| 2012/0172027 | A1* | 7/2012 | Partheesh | H04W 4/021 |
| | | | | 455/420 |
| 2014/0310168 | A1* | 10/2014 | Ang | G06Q 40/00 |
| | | | | 705/40 |
| 2015/0356563 | A1* | 12/2015 | Vohra | G06Q 20/401 |
| | | | | 705/44 |
| 2016/0217536 | A1* | 7/2016 | Camp | G06Q 50/12 |
| 2018/0189901 | A1* | 7/2018 | Poisner | G06Q 50/12 |
| 2020/0286166 | A1* | 9/2020 | Perkins | G06Q 20/0855 |
| 2021/0174417 | A1* | 6/2021 | Kawamoto | G06Q 20/20 |

\* cited by examiner

REDUCED FRICTION FOR MERCHANT INTERACTIONS

TECHNICAL FIELD

Merchants can offer items (e.g., goods, services, etc.) for sale via brick-and-mortar stores patronized by customers who purchase items from the merchants. These in-store shopping experiences can expose customers and merchants (e.g., employees thereof) to risk, particularly with respect to germs and/or other disease-causing microorganisms. In some examples, aspects of transactions, and payments associated therewith, can necessitate interactions between people, computing devices, currency, and the like. Each of these touchpoints can create additional opportunities for customers and merchants (e.g., employees thereof) to be exposed to risk, again, as it pertains to viruses and/or other disease-causing microorganisms (i.e., germs).

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
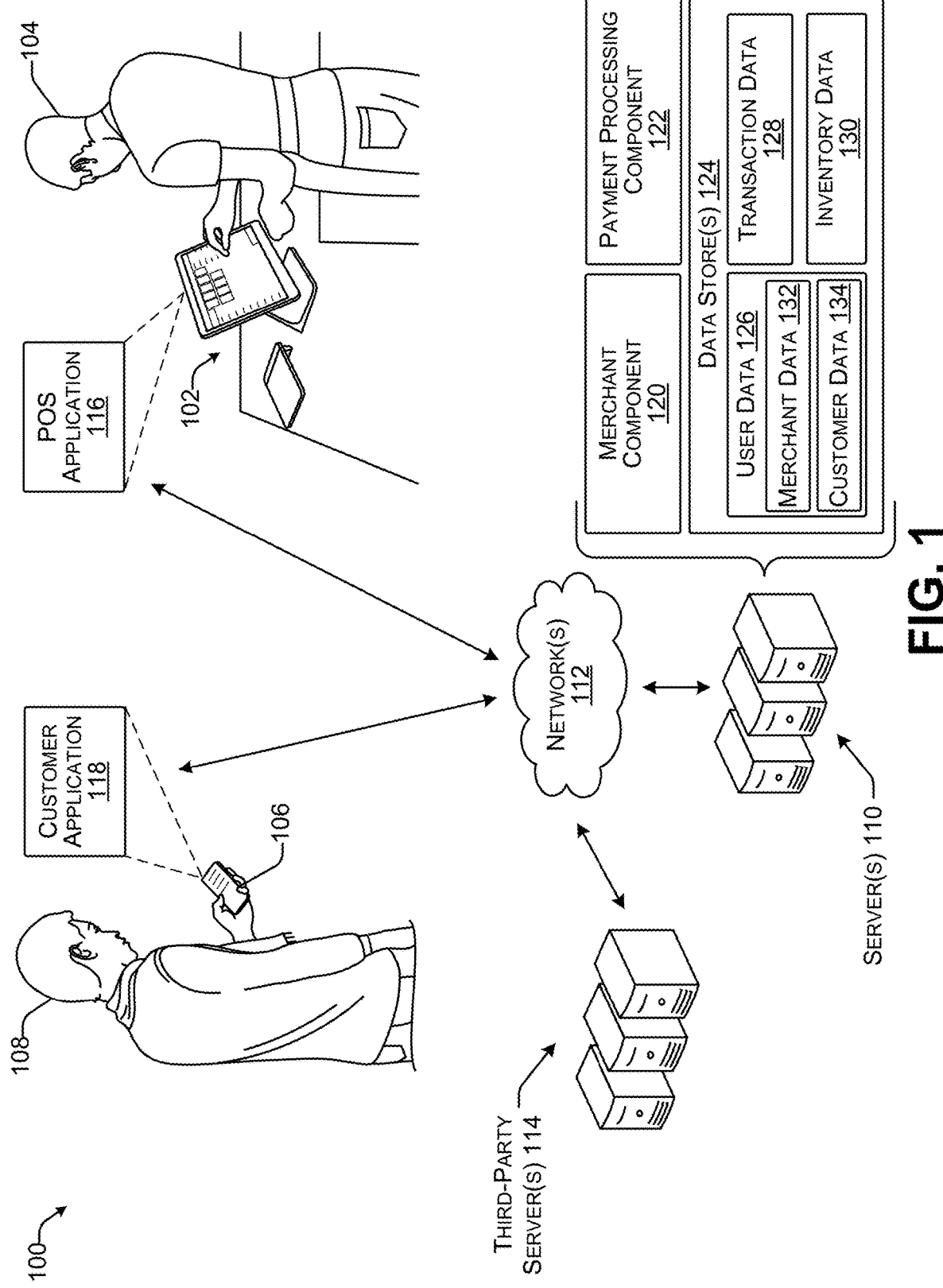
FIG. 1 illustrates an example environment for performing techniques described herein.

Techniques described herein are directed to improvements to existing technologies associated with point-of-sale transactions and merchant ecosystems to, among other things, reduce in-person contact and, in some examples, improve the efficiency at which point-of-sale transactions are completed (i.e., reduce friction). In some examples, such reduced in-person contact and/or improved efficiencies can limit transmission of infectious diseases (e.g., reduce the spread of viruses and/or other germs that cause diseases). As such, techniques described herein are directed to modifying aspects of point-of-sale transactions such that they occur on different computing devices (e.g., customer computing devices instead of merchant computing devices), are automated, and/or occur at different times than with conventional point-of-sale transactions.

In an example, techniques described herein are directed to moving aspects of point-of-sale transactions—for example, inputting loyalty information, providing identity verification information, providing payment data, etc.—off of merchant computing devices (e.g., point-of-sale systems) and on to customer computing devices in an effort to reduce in-person contact between merchants and customers and/or improve the efficiency at which point-of-sale transactions are completed. Further, in some examples, techniques described herein are directed to automating aspects of point-of-sale transactions (e.g., identity verification), thereby reducing in-person contact between merchants and customers and/or improving the efficiency at which point-of-sale transactions are completed. Moreover, in some examples, techniques described herein can modify the timing of payments to be made by customers, such as by providing customers the opportunity to remit payments after they have left physical establishments (e.g., brick-and-mortar stores) of merchants, thereby reducing the amount of time and/or number of interactions between customers and merchants while the customers are in the physical establishments.

Furthermore, in at least one example, techniques described herein can leverage a distributed, network-based merchant ecosystem—comprising multiple merchant computing devices and/or customer computing devices that are specially configured to communicate with a service provider, such as a payment processing service provider—to facilitate social distancing, which can reduce in-person contact and, in some examples, improve the efficiency at which point-of-sale transactions are completed (i.e., reduce friction). That is, techniques described herein can leverage the distributed, network-based merchant ecosystem to spread customers around in physical space and/or in time. For instance, techniques described herein can direct customers to go to different places at a same time (i.e., spreading customers out by place) or different places at different times (i.e., spreading customers out by place and/or time). Further, techniques described herein can direct customers to go to a same place at different times (i.e., spreading customers out by time). In some examples, techniques described herein can leverage funding mechanisms availed via the merchant ecosystem to bring forward in time payroll payments, government benefits, and the like to mitigate the batching of customers that occurs in conventional scenarios (e.g., increased traffic at supermarkets at the first of the month when payroll and/or government benefits are paid).

As described above, techniques described herein can facilitate physical social distancing by intelligently recommending that a customer shop at a particular merchant (e.g., of the merchant ecosystem), based on the needs of the customer (e.g., a list of items compiled at least in part by the customer) and/or the inventory and/or in-store occupancy of the merchant. In some examples, techniques described herein can recommend times at which the customer should shop and/or can facilitate an appointment or reservation for a particular time. That is, techniques described herein can leverage the merchant ecosystem for monitoring and/or reducing a number of people in physical establishments at one time, in an effort to facilitate social distancing. Further, techniques described herein can be used to direct customers where and/or when to shop to improve their ability to procure items and/or to enable customers to avoid having to visit multiple merchants.

In some examples, techniques described herein can facilitate social distancing by offering payment options for customers. For example, some customers may be limited as to when they can shop depending on receipt of payroll payments, government benefits, or the like. This can cause an influx of customers shopping at the same time, (e.g., because payroll and/or benefits are often paid to large groups of people on the same day) which can cause depleted inventories and/or crowded physical establishments. In an example, techniques described herein can offer funding (e.g., credit, a loan, an advance, etc.) to customers to allow them to shop when necessary and/or convenient without relying on timing associated with when their payroll payments, government benefits, or the like are received. In such examples, a service provider offering such funding options can pay merchants as payment is due from the customers but can collect funds from the customers at a later time (e.g., when payroll payments are received, when government benefits are received, or the like), or can even collect such funds from the customers at an earlier time. As a result, techniques described herein can leverage the merchant ecosystem for deferring payments for customers, thereby reducing the number of people in physical establishments at particular times, in an effort to facilitate social distancing.

As described above, techniques described herein offer improvements to existing technologies associated with point-of-sale transactions and merchant ecosystems. In conventional technologies, merchants interact with merchant computing devices to perform operations associated with payment flows. In some examples, customers perform certain operations (e.g., providing payment data, adding gratuity, providing contact information for receiving an electronic receipt, etc.) via interactions with merchant computing devices. In some examples, such interactions can be via customer-facing components of merchant computing devices, but merchant computing devices nonetheless. When disease transmission is of concern, it can be an issue for customers to have to touch merchant computing devices for the purpose of completing a transaction and a burden for merchants to sanitize such merchant computing devices. Techniques described herein leverage technology—availed via specially configured devices that are capable of communicating via a network-based merchant ecosystem—to effectuate modifications to existing transaction processing and/or payment flows by modifying aspects of point-of-sale transactions such that they occur on different computing devices (e.g., customer computing devices instead of merchant computing devices), are automated, and/or occur at different times than with conventional point-of-sale transactions. That is, techniques described herein modify conventional operations and technologies to reduce interaction between customers and merchants, thereby mitigating transmission of infectious diseases.

In addition to the public health benefits described above—which are the result of technical improvements to existing technologies associated with point-of-sale transactions and merchant ecosystems—techniques described herein improve the efficiency at which point-of-sale transactions are performed. That is, by modifying aspects of point-of-sale transactions such that they occur on different computing devices (e.g., customer computing devices instead of merchant computing devices), are automated, and/or occur at different times than with conventional point-of-sale transactions, the time required for processing each point-of-sale transaction at the point-of-sale is reduced. Further, by modifying aspects of point-of-sale transactions such that they occur on different computing devices (e.g., customer computing devices instead of merchant computing devices), are automated, and/or occur at different times than with conventional point-of-sale transactions, techniques described herein reduce the number of interactions between users (e.g., customers and/or merchants) and their respective computing devices (e.g., customer computing devices and/or merchant computing devices). Thus, techniques described herein offer improvements to existing technologies.

Furthermore, by modifying aspects of point-of-sale transactions such that they occur on different computing devices (e.g., customer computing devices instead of merchant computing devices), are automated, and/or occur at different times than with conventional point-of-sale transactions, techniques described herein offer more security for processing transactions. That is, using techniques described herein, a customer can provide a personal identification number, signature, or other information via their own computing device instead of via a merchant computing device that may not be secure and/or may be within view of other customers. As such, techniques described herein are useful for making transactions more secure.

Furthermore, techniques described herein leverage specially configured devices that are capable of communicating via a network-based merchant ecosystem to intelligently generate recommendations with respect to shopping lists, fulfillment options, merchants, and/or payment options to facilitate social distancing, which can reduce in-person contact and, in some examples, improve the efficiency at which payment transactions are completed (i.e., reduce friction). That is, techniques described herein can leverage the distributed, network-based merchant ecosystem to spread customers around in physical space and/or in time. For instance, techniques described herein can direct customers to go to different places at a same time (i.e., spreading customers out by place) or different places at different times (i.e., spreading customers out by place and/or time). Further, techniques described herein can direct customers to go to a same place at different times (i.e., spreading customers out by time). In some examples, the merchant ecosystem can leverage machine learning mechanisms to identify opportunities to add items to a shopping list to minimize the number of times customers need to leave their homes and/or reduce the number of merchants they need to visit. Further, in some examples, the merchant ecosystem can leverage machine learning mechanisms to identify opportunities for mixed fulfillment to limit the amount of time customers need to spend in physical establishments of merchants. Such intelligent recommendations can be customized and/or personalized, which are improvements to conventional one-size-fits-all schemes. As described above, in some examples, techniques described herein can leverage funding mechanisms availed via the merchant ecosystem to bring forward in time payroll payments, government benefits, and the like to mitigate the batching of customers that occurs in conventional scenarios (e.g., increased traffic at supermarkets at the first of the month when payroll and/or government benefits are paid). In such examples, intelligence (e.g., machine learning) can be used to determine which customers can utilize such funding mechanisms, terms of such funding mechanisms, and, in some examples, which funding mechanism is a best option for individual customers.

Additional benefits are described below with reference to FIGS. 1-32.

FIG. 1 illustrates an example environment 100 for performing techniques described herein. As described above, techniques described herein can leverage a distributed, network-based merchant ecosystem that comprises merchant computing device(s) ("merchant device(s)"), customer computing device(s) ("customer device(s)"), and server computing device(s) (e.g., "server(s)"), which can be associated with a service provider. The example environment 100 illustrates portions of such a distributed, network-based merchant ecosystem. For instance, the example environment 100 can include one or more merchant devices, such as the merchant device 102, which can be operable by a merchant 104. The merchant device 102 illustrated in FIG. 1 comprises two components: a merchant-facing component and a customer-facing component. In some examples, the merchant device 102 can comprise multiple components, as shown, or can comprise a single component. In at least one example, the merchant device 102 can be associated with a reader device. In some examples, the reader device can be integrated into the merchant device 102, coupled to the merchant device 102, or the like. Additional details are described below. In at least one example, the example environment 100 can include one or more customer devices, such as customer device 106, which can be operable by a customer 108. In at least one example, the customer device 106 can be associated with a reader device. In some examples, the reader device can be integrated into the customer device 106, coupled to the customer device 106, or the like. Additional details are described below. While a single merchant device 102 and single customer device 106 are illustrated, in additional or alternate examples, the example environment 100 can have multiple merchant devices and/or multiple customer devices.

In at least one example, the example environment 100 can include one or more server computing devices (e.g., server(s) 110), which can be associated with a service provider and which can communicate with the merchant device 102 and/or the customer device 106 via network(s) 112. In some examples, the server(s) 110, the merchant device 102 and/or the customer device 106 can communicate with third-party server(s) 114 via the network(s) 112. The network(s) 112 can include the Internet, cable network(s), cellular network(s), cloud network(s), wireless network(s) (e.g., Wi-Fi), wired network(s), close-range communications networks (e.g., Bluetooth®, Bluetooth® low energy (BLE), Near-field Communications (NFC), etc.), long-range communications networks, and the like.

In at least one example, the merchant device 102 and/or the customer device 106 can have application(s) installed thereon, which can be provided by the service provider, and can specially configure the merchant device 102 and/or the customer device 106 to exchange communications with the server(s) 110 over the network(s) 112. That is, in at least one example, the merchant device 102 can have an instance of a point-of-sale (POS) application 116, which can be a desktop application, a web browser application, or a dedicated application, installed thereon which can specially configure the merchant device 102 to exchange communications with the server(s) 110 over the network(s) 112. In some examples, the POS application 116 can present user interfaces, via one or more displays associated with the merchant device 102, with which the merchant 104 can interact for, among other things, performing transactions and/or processing payment for such transactions. In some examples, the merchant 104 can interact with the merchant device 102 via a user interface presented via another functional component, such as a web browser.

In at least one example, the customer device 106 can have an instance of a customer application 118, which can be a desktop application, a web browser application, or a dedicated application, installed thereon which can specially configure the customer device 106 to exchange communications with the server(s) 110 over the network(s) 112. In some examples, the customer application 118 can be an application that manages payment instruments and/or stores payment data associated with payment instruments, for example, as a mobile wallet. In some examples, the customer application 118 can be an application that enables the customer 108 to participate in peer-to-peer payments and/or access funds managed by the service provider associated with the application. In some examples, the customer application 118 can be an application configured to perform and/or enable the performance of operations of a transaction. Additional or alternative examples of customer applications are within the scope of this disclosure. In some examples, the customer application 118 can present a user interface with which a customer can interact for, among other things, performing transactions and/or providing payment for such transactions. In some examples, the customer 108 can interact with the customer device 106 via a user interface presented via another functional component, such as a web browser.

In at least one example, the server(s) 110 can be associated with one or more functional components. Functional components can comprise instructions or programs that are executable by processor(s) associated with the server(s) 110 to implement operational logic for performing the actions and services attributed above to the server(s) 110. In at least one example, the functional components can include a merchant component 120 and a payment processing component 122. In some examples, the server(s) 110 can include data store(s) 124, which can store user data 126, transaction data 128, and inventory data 130 (or "inventory").

In at least one example, the merchant component 120 can perform various operations as described herein. In some examples, the merchant component 120 can facilitate the transmission of transaction data, or operations associated with a transaction, from the merchant device 102 to the customer device 106 to offload one or more operations associated with a transaction from the merchant device 102 to the customer device 106. In some examples, the merchant component 120 can monitor one or more transactions to determine if and/or when additional information is required to complete a transaction. If information is required, the merchant component 120 can facilitate procurement of such additional information. In some examples, the merchant component 120 can analyze customer data to determine how to distribute individual customers within a merchant ecosystem and can facilitate such distribution. In some examples, the merchant component 120 can facilitate deferred payment techniques as described herein. Additional details associated with operations that the merchant component 120 is configured to perform is described below.

In at least one example, the payment processing component 122 can receive payment data from the merchant device 102, the customer device 106, and/or other device(s) and/or component(s) of the example environment 100. In at least one example, the payment data can be associated with a payment instrument of the customer 108. In some examples, the payment data can be received via a reader device associated with the merchant device 102, as described below, and/or via a payment user interface presented via the merchant device 102. In some examples, the payment data can be received via a reader device associated with the customer device 106, as described below, and/or via a payment user interface presented via the customer device 106. In some examples, the payment data can be stored, in association with the data store(s) 124 and/or on the customer device 106. In some examples, the payment processing component 122 can receive transaction data from other payment mechanisms such as online payment portals, or the like.

In at least one example, the payment processing component 122 can transmit requests (e.g., authorization, capture, settlement, etc.) to payment service server computing device(s) to facilitate transaction(s) between merchant(s) and customer(s). That is, the payment processing component 122 can receive payment data and can send one or more requests (e.g., authorization, capture, settlement, etc.) to a payment service to process payment for a transaction using the payment data. The payment service can respond to such requests and the payment processing component 122 can communicate a success or a failure to the merchant device 102 and/or customer device 106.

In some examples, the payment data can be associated with another payment mechanism (e.g., an account of the customer 108, a check or other instrument payable to the customer 108, etc.). In such examples, the payment processing component 122 can receive the payment data and process the payment using techniques described herein. In some examples, the payment processing component 122 can process the payment by communicating with additional or alternative entities, such as for processing payment via check. In some such examples, the payment processing component 122 can process payment locally, for example cash, and may not need to communicate with other entities as described above.

As described above, in some examples, the server(s) 110 can include data store(s) 124, which can store user data 126, transaction data 128, and inventory data 130 (or "inventory"). In some examples, the data store(s) 124 can be integrated with the other functional components, as is illustrated in FIG. 1. In some examples, the data store(s) 124 can be remotely located from the server(s) 110 and can be accessible to the server(s) 110.

In at least one example, the user data 126 can be associated with data, which can include, for example, merchant data 132 and customer data 134.

The merchant data 132 can store, or otherwise be associated with, data about a merchant (e.g., name, phone number, email, social media handle, geographic location, operating hours, etc.), merchant identifier(s) (e.g., unique identifier, phone number, email address, social media handle, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan data associated with the merchant (e.g., previous loans made to the merchant, previous defaults on said loans, etc.), risk data associated with the merchant (e.g., indications of risk, instances of fraud, chargebacks, etc.), appointments data (e.g., previous appointments, upcoming (scheduled) appointments, timing of appointments, lengths of appointments, etc.), payroll data (e.g., employees, payroll frequency, payroll amounts, etc.), employee data, permission data (e.g., indications of which operations are associated with permission(s), which employees have said permission(s), etc.), reservations data (e.g., previous reservations, upcoming (scheduled) reservations, interactions associated with such reservations, etc.), inventory data, customer service data, etc. In some examples, the merchant data 132 can securely store bank account data as provided by individual merchants. In some examples, the merchant data 132 is arranged in merchant profiles, wherein each merchant profile is associated with an individual merchant.

The customer data 134 can store, or otherwise be associated with, customer data (e.g., name, phone number, email, address, birthdate, banking data, biometric data, identification data (e.g., driver's license information, passport information, etc.), customer identifier(s) (e.g., unique identifier, phone number, email, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), loyalty data (e.g., loyalty programs, loyalty numbers/identifiers, rewards earned, rewards redeemed, etc.), appointments data (e.g., previous appointments, upcoming (scheduled) appointments, timing of appointments, lengths of appointments, etc.), payroll data (e.g., employers, payroll frequency, payroll amounts, etc.), government benefit data (e.g., benefits, amounts of benefits, timing of receiving benefits, etc.), reservations data (e.g., previous reservations, upcoming (scheduled) reservations, reservation duration, interactions associated with such reservations, etc.), customer service data, etc. In some examples, the customer data 134 can include list data associated with lists of items generated, at least in part, by customers via their customer devices. In some examples, the customer data 134 is arranged in customer profiles, wherein each customer profile is associated with an individual customer.

The transaction data 128 can store data associated with transactions. In some examples, the transaction data 128 can include data structures representing previous transactions, transactions that are in progress, or transactions that are upcoming. In some examples, a data structure can include a merchant identifier, a customer identifier, a transaction identifier, a date associated with a transaction, a time associated with a transaction, item(s) associated with the transaction, fulfillment status of item(s) associated with the transaction, fulfillment mechanism(s) associated with the transaction, payment data and/or mechanisms associated with the transaction, feedback associated with the transaction, and the like.

The inventory data 130 can store the inventory records associated with individual items of inventory available for acquisition from the merchant(s) 104. In at least one example, an inventory record can be associated with item data, indicating item characteristics, quantity available, available fulfillment mechanisms, cost, and the like.

In some examples, as described herein, the merchant device 102 can communicate with the customer device 106 indirectly via the network(s) 112 and the server(s) 110. That is, in some examples, the POS application 116 can send data to the server(s) 110 (e.g., via the network(s) 112) and the server(s) 110 can send the data to the customer application 118 (e.g., via the network(s) 112), or vice versa. In some examples, the merchant device 102 can communicate with the customer device 106 directly via the network(s) 112, without routing data through the server(s) 110.

Additional details associated with the computing devices and/or functional components described in the example environment 100 are described below with reference to FIGS. 31 and 32.

Figure 2:
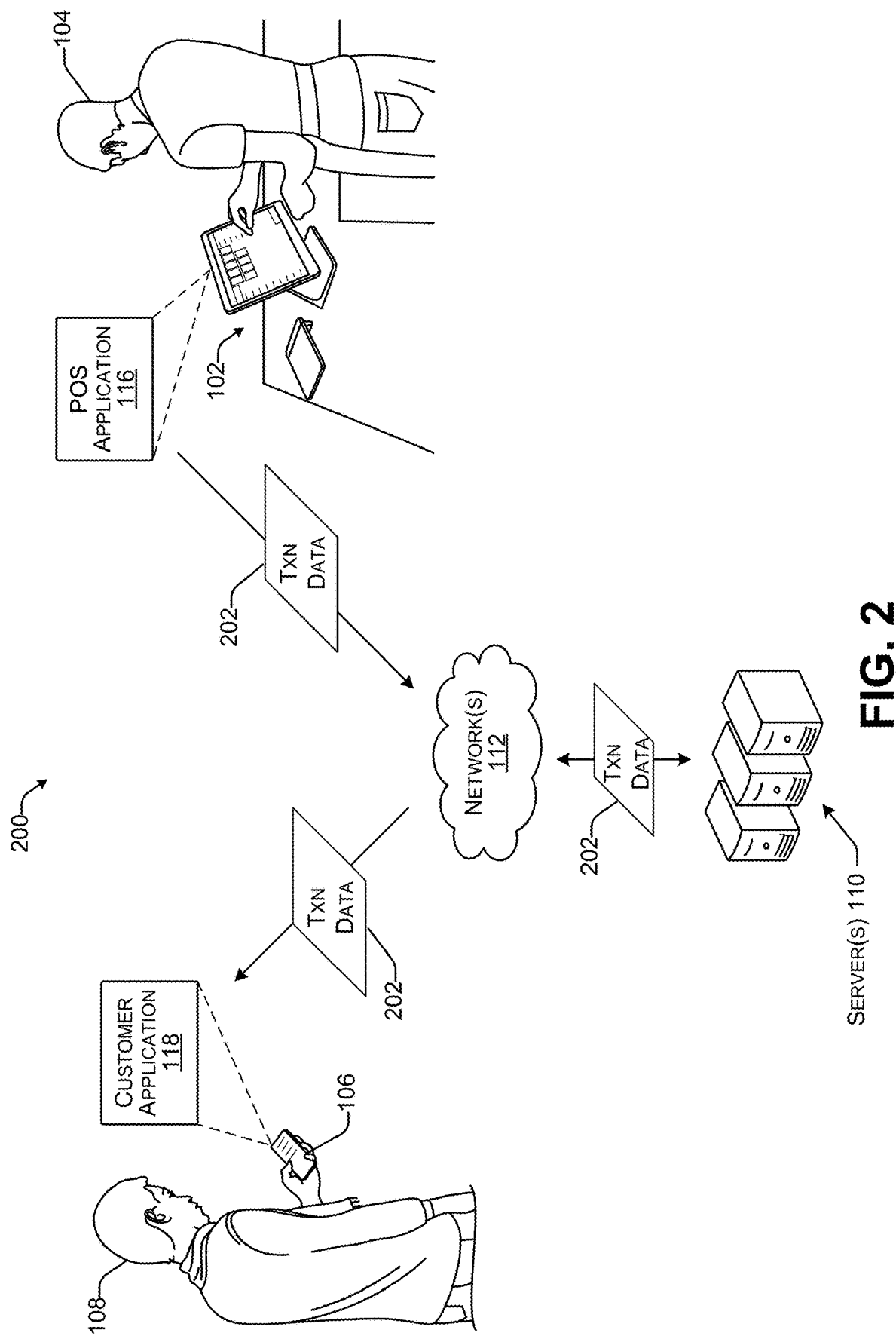
FIG. 2 illustrates an example environment for sending transaction data to a customer device to offload at least some operations associated with a transaction performable by a merchant device to the customer device, as described herein.

FIG. 2 illustrates an example environment 200 for sending transaction data to the customer device 106 to offload at least some operations associated with a transaction performable by the merchant device 102 to the customer device 106, as described herein. As described above, in at least one example, at least a portion of a transaction (e.g., operation(s) associated therewith) can be offloaded from the merchant device 102 to the customer device 106. In some examples, such operations can be "offloaded" by causing operations conventionally performed via POS application 116 (e.g., by the merchant 104, on the merchant device 102) to the customer application 118 (and customer device 106). In at least one example, to offload one or more operations, the POS application 116 can transmit transaction data 202 (e.g., "txn data" in FIG. 2), or a portion thereof, to the customer device 106 so that the POS application 116 and the customer application 118 are performing operations in association with a same transaction. In at least one example, the POS application 116 and/or the merchant component 120 can send requests and/or instructions to the customer device 106 for the customer to perform operations that, in some examples, are conventionally performed on the merchant device 102 in association with point-of-sale transactions.

In at least one example, the transaction data 202 can include data associated with one or more items to be purchased, or otherwise acquired, via the transaction. In some examples, the transaction data 202 can include item details, such as quantity, item characteristic, price, or the like. In some examples, the transaction data 202 can be associated with operations to be performed (e.g., requests and/or instructions associated therewith) in association with the transaction. The transaction data 202 can be provided to the customer device 106 via one or more mechanisms, as described below. As described herein, the transaction data 202 can be provided to the customer device 106 at any time, for example, at a beginning of a transaction, during the transaction, when payment is requested for the transaction, or after payment has been received and the transaction is otherwise complete.

In at least one example, the merchant component 120 can receive one or more identifiers from the POS application 116 and/or the customer application 118, identify the relevant transaction data 202 based at least in part on the identifier(s), and send the transaction data 202, or a portion thereof, to the customer application 118. In some examples, the identifier(s) can be associated with the transaction (i.e., a transaction identifier), the identifier can be associated with the merchant 104 (i.e., a merchant identifier), and/or the identifier can be associated with the customer 108 (i.e., a customer identifier). In at least one example, the merchant component 120 can receive the identifier(s), access the transaction data 128 in the data store(s) 124, determine whether the identifier(s) correspond to a transaction associated with the transaction data 128, and, if the identifier(s) correspond to a transaction, send the portion of the transaction data 128 associated with the transaction (i.e., transaction data 202), or a portion thereof, to the customer application 118.

In at least one example, the customer 108 can scan or read a barcode, Quick Read (QR) code, or the like, which can be associated with a transaction identifier, using the customer device 106. In at least one example, the barcode, QR code, or the like can be encoded with information which can include the transaction identifier. The customer application 118 can send an indication of the barcode, QR code, or the like to the merchant component 120. In some examples, instead of scanning or reading a barcode, QR code, or the like, the customer 108 can input a transaction identifier provided by the merchant 104 via a user interface and/or the customer 108 can cause an interaction between the customer device 106 and the merchant device 102 (e.g., via a tap) to receive a transaction identifier associated with the transaction. The customer application 118 can then send the transaction identifier to the server(s) 110. As described above, the merchant component 120 can use the transaction identifier to identify the transaction for which transaction data is to be sent to the customer application 118 and can send the transaction data 202, or a portion thereof, to the customer application 118.

In at least one example, the customer 108 can scan or read a barcode, QR code, or the like, which can be associated with a merchant identifier, using the customer device 106. In at least one example, the barcode, QR code, or the like can be encoded with information which can include the merchant identifier. The customer application 118 can send an indication of the barcode, QR code, or the like to the merchant component 120. In some examples, instead of scanning or reading a barcode, QR code, or the like, the customer 108 can input a merchant identifier provided by the merchant 104 via a user interface and/or the customer 108 can cause an interaction between the customer device 106 and the merchant device 102 (e.g., via a tap) to receive a merchant identifier associated with the transaction. The customer application 118 can then send the merchant identifier to the server(s) 110. As described above, the merchant component 120 can use the merchant identifier to identify the transaction for which transaction data is to be sent to the customer application 118 and can send the transaction data 202, or a portion thereof, to the customer application 118.

In at least one example, the customer 108 can provide a customer identifier to the merchant 104. In some examples, the customer identifier can be provided to the merchant 104 via an interaction between the customer device 106 and a reader device associated with the merchant device 102. For example, the customer application 118 can store a customer identifier and the customer 108 can cause the customer device 106 to interact with a reader device of the merchant device 102 (e.g., via a tap). In at least one example, such an interaction can cause the customer identifier to be transmitted to the POS application 116 (e.g., via the reader device) and the POS application 116 can send an indication of the customer identifier to the merchant component 120. In some examples, the merchant 104 can input a customer identifier provided by the customer 108 via a user interface and the merchant component 120 can use the customer identifier to identify the customer, associated contact information, and the like for sending the transaction data 202, or a portion thereof, to the customer application 118. As described above, the merchant component 120 can utilize the customer identifier to identify the transaction for which transaction data is to be sent to the customer application 118 and can send the transaction data 202, or a portion thereof, to the customer application 118.

In at least one example, the merchant device 102 and/or the server(s) 110 can detect that the customer device 106 is proximate to, or otherwise within a threshold distance of, the merchant device 102, and can cause the transaction data 202 to be transmitted to the customer device 106 (e.g., to the customer application 118 on the customer device 106) as described below.

In at least one example, the POS application 116 can determine that the customer device 106 is within a threshold distance of the merchant device 102 via one or more techniques. In some examples, the threshold distance can be associated with a geofence corresponding to a merchant location and the POS application 116 can determine that the customer device 106 is proximate to or otherwise within a threshold distance of the merchant device 102 based at least in part on detecting the customer device 106 within the geofence. In additional or alternative examples, the POS application 116 can receive location data (e.g., GPS data) associated with the customer device 106 to determine a location of the customer device 106 relative to the merchant device 102 and the POS application 116 can determine that the customer device 106 is proximate to or otherwise within a threshold distance of the merchant device 102 based at least in part on detecting the customer device 106 within the threshold distance of the merchant device 102.

In at least one example, the POS application 116 can determine that a customer device 106 is proximate to or within a threshold distance of the merchant device 102 based at least in part on determining that a signal associated with the customer device 106 satisfies a threshold. For instance, in some examples, the POS application 116 can measure radio strength signals (e.g., decibels, signal to noise ratio, received signal strength (RSSI), etc.) emitted by the customer device 106. Based on determining that the signal satisfies a threshold, the POS application 116 can determine the presence of the customer device 106 is proximate to or within a threshold distance of the merchant device 102. Further, the POS application 116 can determine that the customer device 106 is proximate to or within a threshold distance of the merchant device 102 based at least in part on determining how the customer device 106 responds to a signal emitted by the merchant device 102.

Moreover, in at least one example, the POS application 116 can determine that the customer device 106 is proximate to or within a threshold distance of the POS application 116 based at least in part on determining that the customer device 106 has joined a same network as the merchant device 102 (e.g., joined a Wi-Fi network associated with the merchant). Furthermore, in at least one example, the POS application 116 can determine that the customer device 106 is proximate to or within a threshold distance of the merchant device 102 based at least in part on sensor data (e.g., cameras, etc.) identifying a presence of the customer device 106. In such an example, the sensors can be associated with the merchant device 102 and/or can be external sensors that communicate to the merchant device 102 and/or the server(s) 110.

In some examples, server(s) 110 can determine that the customer device 106 is proximate to or within a threshold distance of the merchant device 102. In such examples, the merchant component 120 can utilize location data and/or radio strength signals to determine that a customer device 106 is proximate to or within a threshold distance of the merchant device 102. Further, the merchant component 120 can determine that the customer device 106 is proximate to or within a threshold distance of the merchant device 102 via same and/or similar methods as described above. In at least one example, the merchant component 120 can send an indication to the merchant device 102 indicating that a customer device 106 is proximate to or within a threshold distance of the merchant device 102.

In at least one example, based at least in part on determining that the customer application 118 is proximate to, or otherwise within a threshold distance of, the merchant device 102, the POS application 116 and/or the merchant component 120 can transmit the transaction data 202, or a portion thereof, to the customer application 118. In some examples, the POS application 116 can send the transaction data 202, or a portion thereof, to the customer application 118 directly via the network(s) 112. In other examples, the POS application 116 can send the transaction data 202, or a portion thereof, to the customer application 118 indirectly via the network(s) 112 (e.g., via the server(s) 110).

As described above, in at least one example, the POS application 116 can send the transaction data 202, or a portion thereof, to the customer application 118 directly via the network(s) 112. For instance, in such an example, the POS application 116 can transmit the transaction data 202, or a portion thereof, directly to the customer application 118 via NFC or another of the network(s) 112. That is, the customer 108 can cause the customer device 106 to interact with the merchant device 102 (e.g., via a tap) and the transaction data 202 can be transmitted to the customer application 118 via NFC or another of the network(s) 112.

As described above, in an additional or alternative example, the POS application 116 can send the transaction data 202, or a portion thereof, to the customer application 118 indirectly. For example, the POS application 116 can send an instruction to the merchant component 120 to instruct the merchant component 120 to send the transaction data 202 to the customer application 118. Responsive to receiving such an instruction, the merchant component 120 can send the transaction data 202 to the customer application 118.

In some examples, the POS application 116 can send an address (e.g., URL, etc.) to the customer application 118. The address can be associated with a remote location from which the transaction data 202 is accessible (e.g., the server(s) 110). In some examples, the address can be sent via NFC or another short-range network of the network(s) 112. The customer 108 can interact with the address (e.g., via a selectable control presented via a UI of the customer device 106) and the customer application 118 can send a request to the remote location for access to the transaction data 202. In such an example, the transaction data 202, or a portion thereof, can be sent to the customer application 118 from the remote location over the network(s) 112. For instance, the transaction data 202, or a portion thereof, can be downloaded onto the customer device 106 from the server(s) 110. In at least one example, the transaction data 202, or a portion thereof, can be transmitted to the customer application 118 via a long-range network of the network(s) 112.

In some examples, the merchant component 120 can send the transaction data 202 directly to the customer application 118. For example, the merchant component 120 can send the transaction data 202 to the customer application 118 responsive to a determination that the customer device 106 is proximate to, or within a threshold distance of, the merchant device 102 (e.g., via a push), as described above.

Furthermore, in at least one example, the customer 108 can interact with the customer application 118 to request access to the transaction data 202, or a portion thereof. In at least one example, the customer device 106 can send a request for the transaction data 202 to the merchant device 102 and/or the server(s) 110 responsive to such an interaction with the customer application 118. Responsive to sending the request, the POS application 116 and/or the merchant component 120 can send the transaction data 202, or a portion thereof, to the customer device 106.

As described above, in at least one example, the transaction data 202, or portion thereof, can be transmitted to the customer application 118 at any point in time relative to a transaction. In some examples, the transaction data 202, or a portion thereof, can be transmitted to the customer application 118 prior to a transaction, during a transaction, or after a transaction. For example, in at least one example, the transaction data 202, or a portion thereof, can be transmitted to the customer application 118 when the customer 108 enters a physical establishment of the merchant 104 and/or is otherwise detected as being proximate to, or within a threshold distance of, the merchant device 102. In another example, the transaction data 202, or a portion thereof, can be transmitted to the customer application 118 when the merchant 104 initiates the transaction at the merchant device 102. In yet another example, the transaction data 202, or a portion thereof, can be transmitted to the customer application 118 after a transaction is completed by the merchant 104 at the merchant device 102 (e.g., via a receipt).

Figure 3:
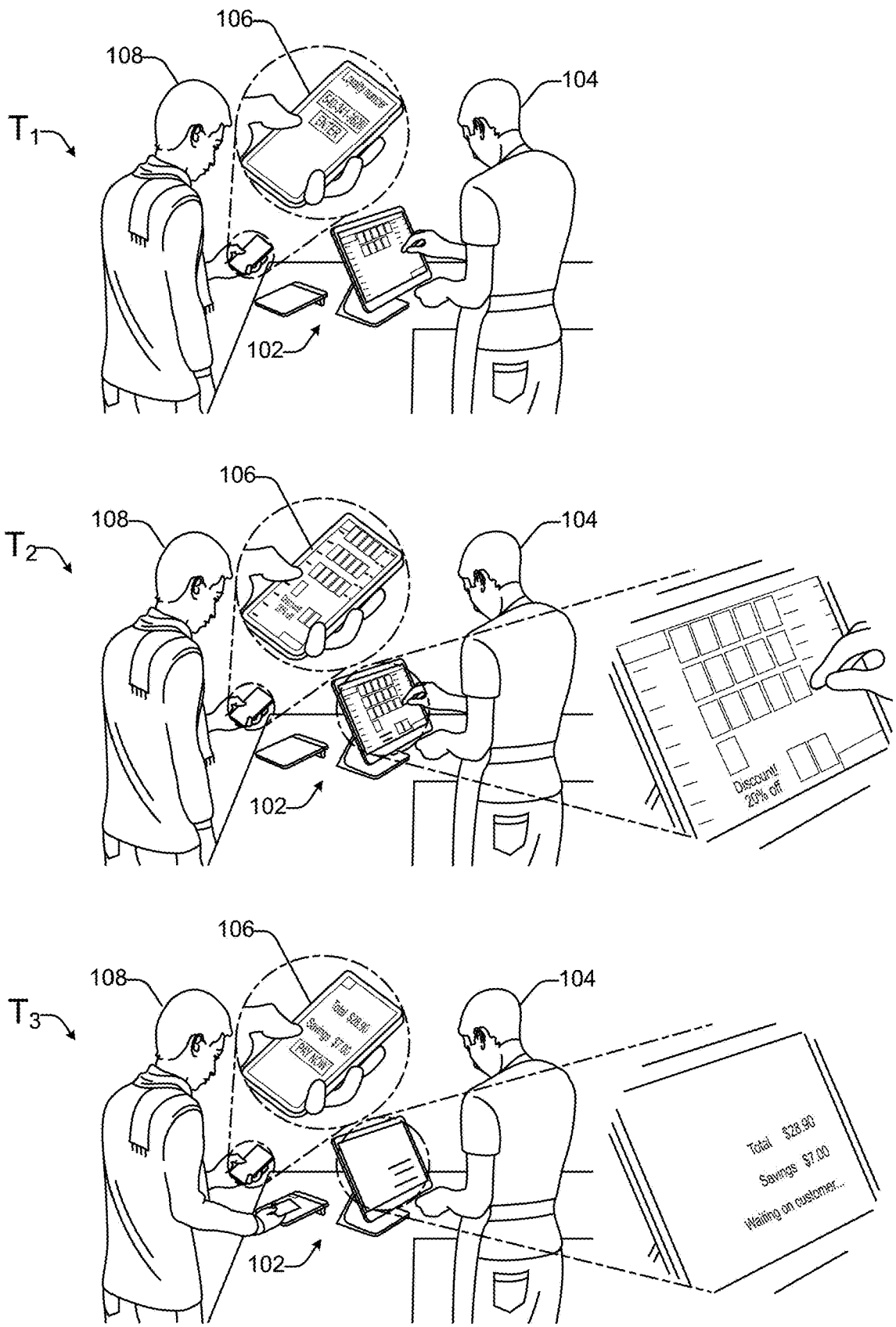
FIG. 3 illustrates an example implementation wherein transaction data, or a portion thereof, can be transmitted to a customer device, as described herein.

FIG. 3 illustrates an example wherein transaction data, or a portion thereof, can be transmitted to the customer device 106. In at least one example, the customer 108 can approach a merchant 104 (e.g., employee, agent, etc. associated therewith) to purchase, or otherwise acquire, one or more items from the merchant. As described above, an item can be a good or a service.

In at least one example, the merchant 104 can interact with the merchant device 102 to initiate a transaction. In at least one example, based at least in part on the merchant 104 initiating a transaction, the POS application 116 can generate a data structure for storing transaction data associated with the transaction. In some examples, the POS application 116 can send the data structure, or a duplicate thereof, to the merchant component 120. As described below, in some examples, a transaction can be initiated without input from the merchant 104.

Figure 4:
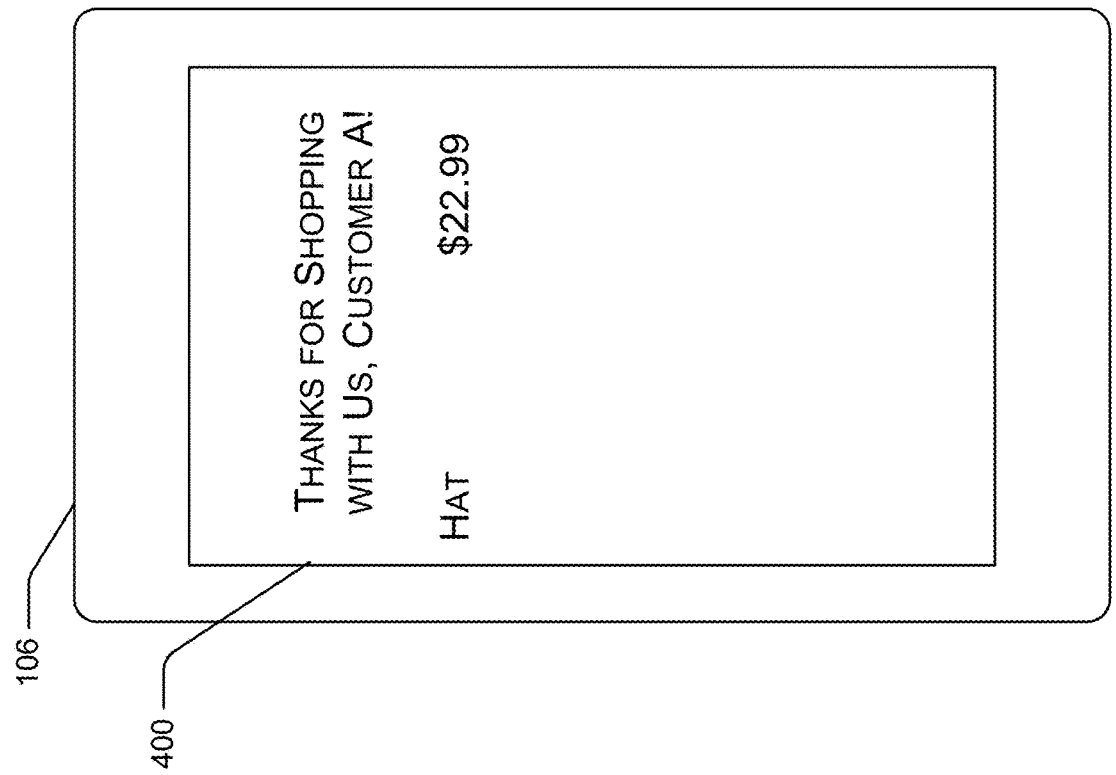
FIG. 4 illustrates an example graphical user interface (GUI), as described herein.

In FIG. 3, the customer device 106 can receive transaction data via any of the techniques described above with reference to FIG. 2. In at least one example, based at least in part on receiving transaction data, the customer application 118 can cause the transaction data, or a portion thereof, to be presented via a GUI 400, as illustrated in FIG. 4. In at least one example, indication(s) of item(s) associated with a transaction can be presented via the GUI 400. In some examples, additional data associated with the item(s) can be presented via the GUI 400 (e.g., quantity, item characteristic, price, etc.). In at least one example, the indication(s) of the item(s) can be text, images, graphics, or any other user interface element or object.

Figure 5:
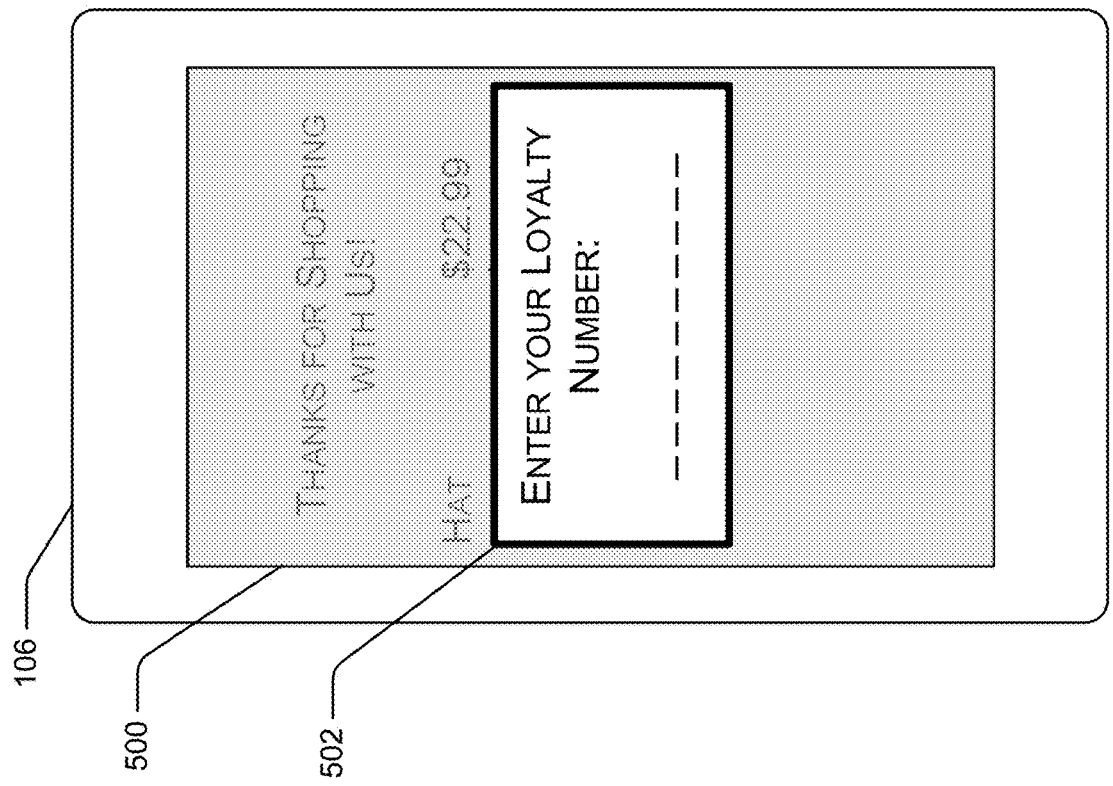
FIG. 5 illustrates another example GUI, as described herein.

Returning to FIG. 3, in some examples, based at least in part on receiving the transaction data at a first time ($T_1$), the customer application 118 can prompt the customer 108 for loyalty information, for example at, or near, the beginning of the transaction. A non-limiting example of a GUI 500 that can be presented to prompt the customer 108 for such information is illustrated in FIG. 5. In some examples, the POS application 116 can initiate the request, which can be sent via the server(s) 110 to the customer application 118. In some examples, the merchant component 120 can initiate the request. In at least one example, a user interface element 502 can be presented via the GUI 500 to prompt the customer 108 to input loyalty information via the GUI 500. In some examples, the customer 108 can interact with the GUI 500 to input a loyalty number. In additional or alternative examples, the customer 108 can tap a loyalty card or other instrument to the customer device 106 and the customer device 106, which can be associated with a reader device, can read loyalty information associated with the loyalty card or other instrument. In some examples, instead of or in addition to loyalty information, the customer application 118 can prompt the customer 108 to input coupons or other discount codes to enable such coupons or other discount codes to be applied to the transaction data in real time or near-real time, as they are received. Furthermore, in some examples, the customer application 118 can store loyalty information and/or the server(s) 110 can store loyalty information. In such examples, the customer 108 may not be prompted to enter such information and the loyalty information can be applied by the merchant component 120, as described herein.

Figure 6:
FIG. 6 illustrates an example GUI, as described herein.

Returning to FIG. 3, as additional items are added to the transaction—and additional transaction data is generated by the POS application 116—the POS application 116 can send additional transaction data to the customer application 118 (e.g., directly or indirectly) and such additional transaction data can be presented via a GUI, as illustrated at a second time ($T_2$) after the first time ($T_1$). That is, transaction data can be presented in real time or near-real time so that the customer 108 can track transaction details as (or after) the merchant 104 adds items to the transaction. A non-limiting example of such a GUI 600 is illustrated in FIG. 6.

Figure 7:
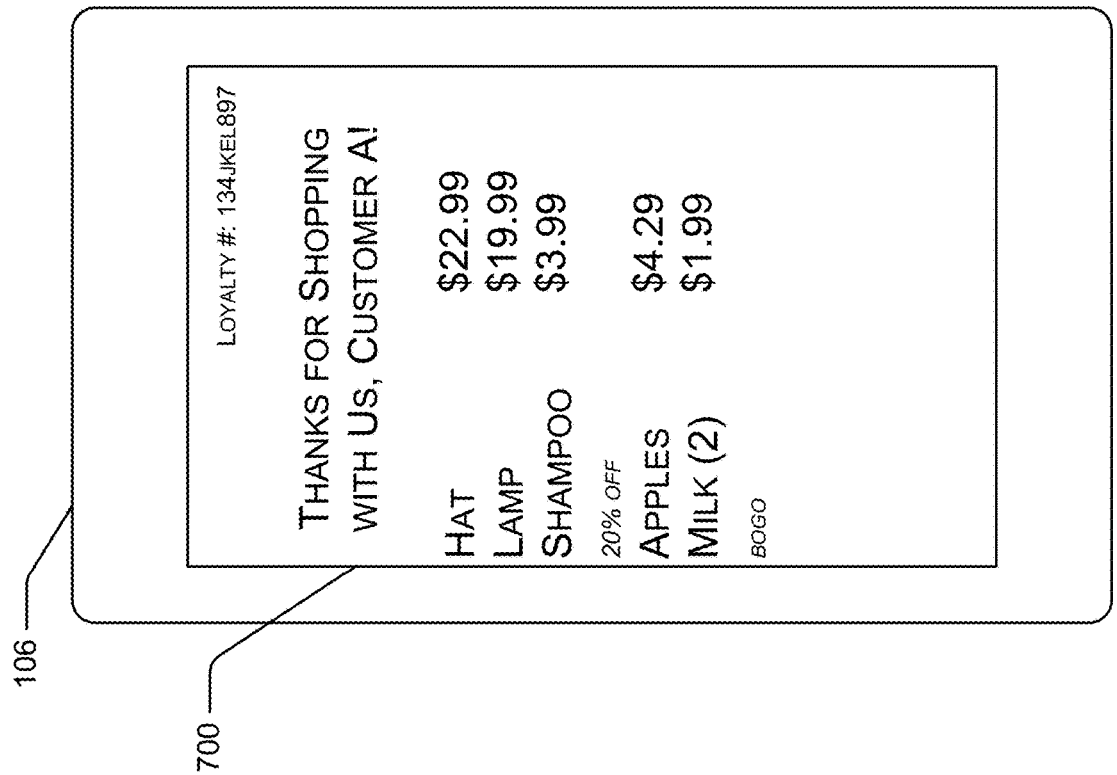
FIG. 7 illustrates another example GUI, as described herein.

In at least one example, based at least in part on the customer 108 providing loyalty information (e.g., as described above with reference to FIG. 4), reward information can be presented in association with the transaction data via a same user interface, as illustrated in the non-limiting example of a GUI 700 of FIG. 7. In at least one example, the loyalty information can be sent from the customer application 118 to the merchant component 120 and/or the POS application 116 and the merchant component 120 and/or the POS application 116 can determine whether rewards are applicable to individual items associated with the transaction and/or to the transaction as a whole. In at least one example, if an item qualifies for a discount, the discount can be presented via the GUI 700, for example proximate to the item and/or can be otherwise represented in the GUI 700.

Returning to FIG. 3, when each of the item(s) associated with the transaction have been added to the transaction, the merchant 104 can interact with the merchant device 102 to initiate a payment flow for collecting payment associated with the transaction. In some examples, a GUI presented by the POS application 116 can include a control or other mechanism that, when actuated, initiates a payment flow. In at least one example, based at least in part on the merchant 104 initiating the payment flow via the merchant device 102, the POS application 116 can send a request for payment to the customer device 106, as illustrated at a third time ($T_3$), which can be after the first time ($T_1$) and the second time ($T_2$). In at least one example, the customer application 118 can receive the request for payment and can cause a GUI to be presented via the customer device 106. A non-limiting example of such a GUI 800 is illustrated in FIG. 8.

Figure 8:
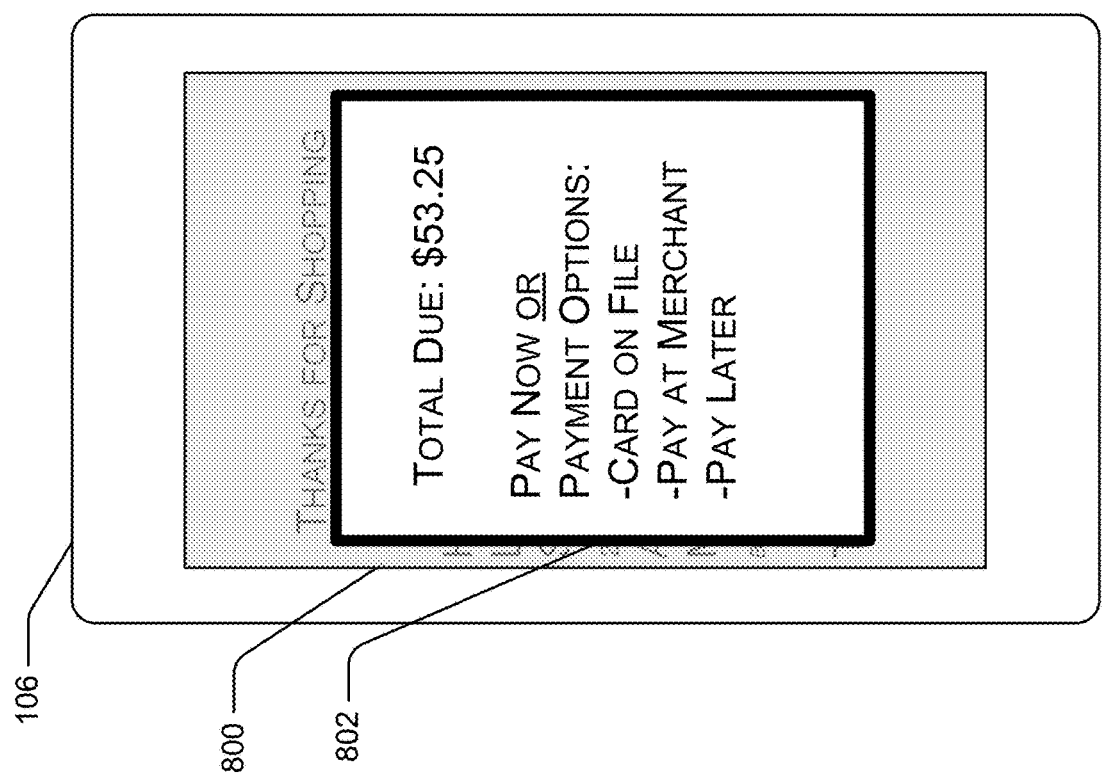
FIG. 8 illustrates an example GUI, as described herein.

As illustrated in FIG. 8, the GUI 800 can present the request for payment, which can include a total amount of the transaction. The total, which can be determined by the POS application 116 and/or the merchant component 120, can represent a total amount of the cost of each of the items associated with the transaction. In at least one example, a user interface element 802 can present the total and a request for payment. In some examples, the user interface element 802 can include one or more payment options.

In at least one example, the payment data can be provided by the customer application 118. In some examples, the customer device 106 can be associated with a reader device. In at least one example, the customer 108 can tap a payment instrument of the customer 108 to the customer device 106 and the reader device associated with the customer device 106 can read the payment data from the payment instrument. The reader device can send the payment data to the customer application 118 and the customer application 118 can send the payment data to the payment processing component 122.

In an additional or alternative example, the customer 108 can access a mobile wallet storing payment data associated with one or more payment instruments on the customer device 106. In some examples, the mobile wallet can be associated with the customer application 118. In other examples, the mobile wallet can be another application on the customer device 106 that can be accessible to the customer application 118. In at least one example, the customer application 118 can obtain payment data of a payment instrument associated with the mobile wallet and can send the payment data to the payment processing component 122. In some examples, the customer application 118 can access payment data via a payment instrument that is integrated into functionality provided by the customer application 118.

In some examples, the customer 108 can opt to use payment data that is permissibly stored by the server(s) 110 (e.g., in a customer profile associated with the customer 108 and/or a merchant profile associated with the merchant 104). In such an example, the customer 108 can provide an input indicating to use a "card-on-file" payment option and the customer application 118 can send an indication of such to the payment processing component 122. The payment processing component 122 can receive the indication and access the stored payment data.

In some examples, the customer 108 can opt to pay at the merchant 104, for example via a reader device associated with the merchant device 102, as illustrated in FIG. 3. In at least one example, the customer 108 can provide an input indicating to pay at the merchant and the customer application 118 can send an indication of such to the merchant component 120 and/or the POS application 116. The merchant component 120 can receive the indication and forward the indication to the POS application 116. In at least one example, the POS application 116 can instruct the reader device to prepare to read payment data from a payment instrument. In at least one example, the customer 108 can tap (or dip, swipe, etc.) a payment instrument of the customer 108 to the merchant device 102 and the reader device associated with the merchant device 102 can read the payment data from the payment instrument. The reader device can send the payment data to the POS application 116 and the POS application 116 can send the payment data to the payment processing component 122.

In some examples, the customer 108 can opt to pay later. In at least one example, a later payment can be a payment remitted via the customer 108 via at least some of the payment options described above (e.g., obtaining payment data via a reader device associated with the customer device 106, mobile wallet, card-on-file, etc.) but at a later time, for example, after the customer 108 has left the physical establishment of the merchant 104. In other examples, a later payment can be a payment that is satisfied via a payment mechanism such as credit, a loan, or advance and subsequently paid by the customer 108. In some examples, at least a portion of the credit, loan, or advance can be repaid using payroll payments, government benefits, or the like. Additional details are described below.

In at least one example, the payment processing component 122 can receive the payment data and can process the payment data as described above. In at least one example, based at least in part on the payment being successful (e.g., the payment data being authorized for at least a portion of the cost of the transaction), the payment processing component 122 can send an indication of such to at least the merchant device 102. In at least one example, the merchant component 120 and/or the POS application 116 can send an electronic receipt, or other confirmation that the payment is complete, to the customer device 106.

Figure 9:
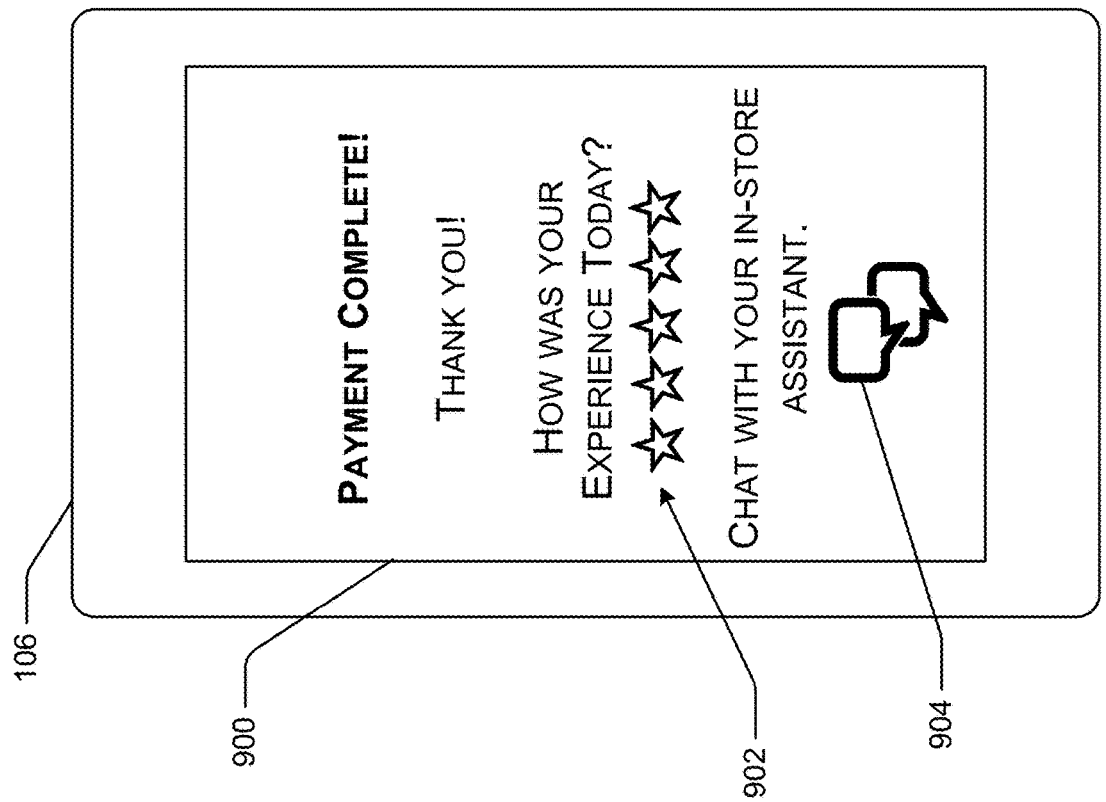
FIG. 9 illustrates another example GUI, as described herein.

In some examples, the customer application 118 can present a GUI 900 associated with the electronic receipt, as illustrated in FIG. 9. In some examples, the GUI 900 can include one or more user interface elements 902 that can be used by the customer 108 to provide feedback associated with a transaction. In FIG. 9, the user interface element(s) are illustrated as stars, which can be selected to indicate the customer's rating of the experience. In another example, the user interface element(s) can be a slider, a Likert scale, a dropdown, or any other user interface element that can be used to provide feedback. In some examples, the electronic receipt can be associated with a link, a barcode, a QR code or the like which, when actuated and/or read, can cause a survey or other input mechanism to be presented to the customer 108 for the customer 108 to provide additional feedback. Such feedback can be stored in the user data 126 and/or transaction data 128.

In some examples, the electronic receipt can be stored on the customer device 106 and/or the data store(s) 124 (e.g., in the customer data 134 and/or the transaction data 128) such that the electronic receipt can be accessible to the customer 108 after the transaction is complete. In some examples, the electronic receipt can provide an opportunity to continue communications with the merchant 104 after the customer 108 has left the physical establishment and/or the transaction is complete. For example, the electronic receipt can include a user interface element 904 that when actuated presents a chat or messaging mechanism to enable the customer 108 to send electronic communications to the merchant 104.

Figure 10:
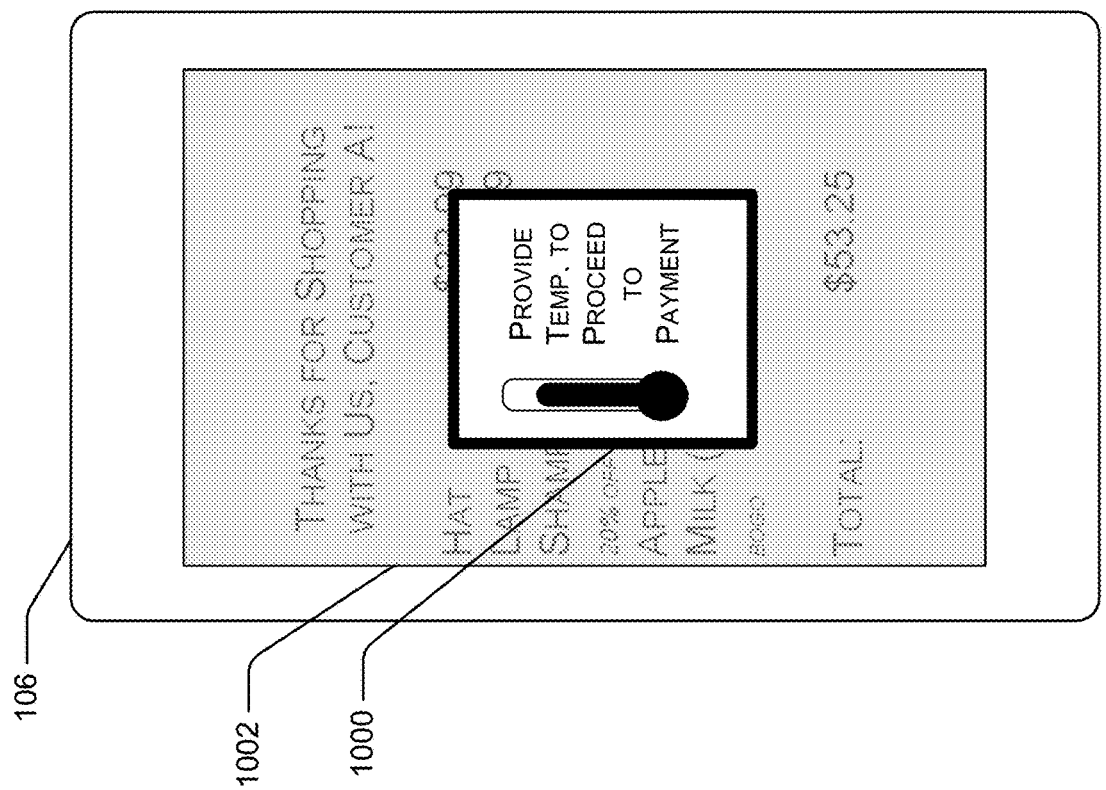
FIG. 10 illustrates another example GUI, as described herein.

In some examples, additional information can be required before a payment can be accepted. For example, in at least one example, the customer 108 can be required to satisfy one or more health-related requirements before the customer 108 can remit payment for the transaction. In such an example, the customer application 118 can cause a user interface element 1000 to be presented via a GUI 1002, as illustrated in FIG. 10, that requests the customer 108 to provide their temperature prior to being able to proceed to payment. In such an example, the customer 108 can submit to a temperature reading, for example, via a sensor associated with the customer device 106. In some examples, the customer 108 can utilize another device (e.g., a wearable, etc.) to obtain a temperature reading which can be provided to the customer application 118. In another example, the merchant 104 can have a temperature reading device which can be used for reading the temperature of the customer 108, which can be input via a user interface presented via the POS application 116.

In at least one example, a temperature reading can be provided to the merchant component 120 (e.g., from the POS application 116 and/or the customer application 118). In some examples, the merchant component 120 can compare the temperature reading to a threshold to determine whether the temperature of the customer 108 satisfies the threshold. In some examples, the merchant component 120 can compare the temperature reading to a range to determine whether the temperature of the customer 108 is within the range. In at least one example, if the temperature reading satisfies the threshold and/or is within the range, the merchant component 120 can send an indication of such to at least one of the POS application 116 and/or the customer application 118 to enable the customer 108 and the merchant 104 to complete the transaction.

Figure 11:
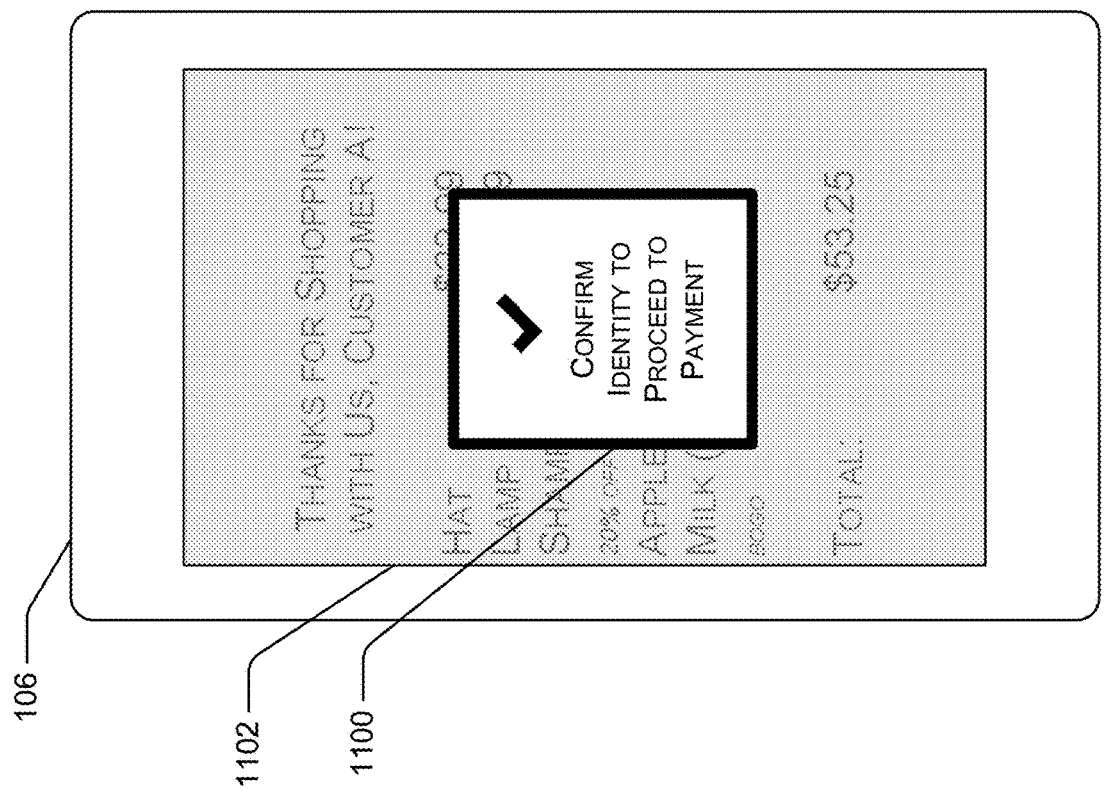
FIG. 11 illustrates yet another example GUI, as described herein.

In an additional or alternative example, the merchant 104 and/or the customer 108 may be required to provide an identification of the customer 108 and/or verify the identity of the customer 108 to ensure that the customer 108 is permitted to complete the purchase. As an example, if an item associated with the transaction requires a buyer to be of a certain age (e.g., alcohol, tobacco, etc.), the customer 108 may be required to provide proof that they are of the certain age. In at least one example, the POS application 116 and/or the merchant component 120 can determine that the transaction is associated with an item that requires the customer 108 to provide proof of identification and/or confirm their identity and can cause a user interface element 1100 to be presented via a GUI 1102, as illustrated in FIG. 11. In such an example, the customer 108 may be required to provide identification of the customer 108 for proof of their identity, thereby confirming they are of the certain age, before the transaction can proceed to payment.

In at least one example, the customer 108 can present a legal identification instrument (e.g., a driver's license, a passport, etc.), for example, which can be captured by an image capturing device (e.g., a camera) associated with the customer device 106. In another example, the customer 108 can show the legal identification instrument to the merchant 104 and the merchant 104 can provide an input via a user interface confirming the identity of the customer 108 and/or that the customer 108 satisfies the requirement. In yet another example, the customer 108 can present a legal identification instrument (e.g., a driver's license, a passport, etc.), for example, which can be captured by an image capturing device (e.g., a camera) associated with the merchant device 102. In at least one example, the image and/or indication of the legal identification instrument can be provided to the merchant component 120 (e.g., from the POS application 116 and/or the customer application 118). In some examples, the merchant component 120 can analyze the image and/or the indication of the legal identification instrument to determine whether the customer 108 is permitted to purchase the item. In some examples, the merchant component 120 can compare the data submitted by the customer 108 (e.g., via the image and/or the indication of the legal identification instrument) to stored data associated with the customer 108. In some examples, the stored data can be stored in the data store(s) 124. In other examples, the stored data can be stored in a data store associated with the third-party server(s) 114 (e.g., the Department of Motor Vehicles or the like), that can be accessible to the merchant component 120. In various embodiments, appropriate merchant 104 and/or customer 108 consents can be obtained by the merchant component 120 locally or remotely before the merchant component 120 engages in processing of private data or personally identifiable information (PII), or interacts with third-party systems storing the same. In some examples, the merchant component 120 can prompt the customer 108 to provide a second identifier, such as a biometric identifier, an identification number or the like, as a second factor that can be used to verify and/or otherwise confirm the identity of the customer 108.

In some examples, the customer 108 can provide a biometric identifier or another identifier (e.g., a personal identification number, etc.) instead of a legal identification instrument, for example, via the customer application 118. For instance, a sensor associated with the customer device 106 can read or otherwise capture biometric information associated with the customer 108. The customer application 118 can send an indication of the biometric information to the merchant component 120. The merchant component 120 can access the customer data 134 to determine data associated with the customer 108, for example, by comparing the biometric information with stored customer data 134. Based at least in part on accessing the data associated with the customer 108, the merchant component 120 can determine whether the stored data indicates that the customer 108 is of the certain age and/or otherwise is associated with a characteristic required to purchase the item. In some examples, the customer 108 can interact with the merchant device 102 to provide biometric information. In such an example, the merchant device 102 can send the biometric information to the merchant component 120 and the merchant component 120 can use such information as described above. The same or similar techniques can be implemented for another identifier provided by the customer 108 for the purpose of providing identification information associated with the customer 108.

In at least one example, if the information required from the customer 108 is received and/or the identity of the customer 108 is otherwise confirmed, the merchant component 120 can send an indication of such to at least one of the POS application 116 and/or the customer application 118 to enable the customer 108 and the merchant 104 to complete the transaction.

As described above, in some examples, techniques described herein are directed to moving aspects of point-of-sale transactions—for example, inputting loyalty information, providing identity verification information, providing payment data, etc.—off of merchant computing devices (e.g., point-of-sale systems) and on to customer computing devices in an effort to reduce in-person contact between merchants and customers and/or improve the efficiency at which point-of-sale transactions are completed. Further, in some examples, techniques described herein are directed to automating aspects of point-of-sale transactions (e.g., identity verification), thereby reducing in-person contact between merchants and customers and/or improving the efficiency at which point-of-sale transactions are completed. FIGS. 3-11 illustrate such techniques.

FIGS. 4-11 are diagrams showing example GUIs that can be presented via respective user interfaces, for example via the customer application 118, described above with reference to FIGS. 1-3. The GUIs illustrated are non-limiting examples. Additional or alternative data can be presented via GUIs described herein. Further, additional or alternative designs, configurations, or the like can be presented via GUIs described herein. In some examples, the GUIs can be presented via another functional component such as a web browser. In some examples, same or similar content can be output via the customer device 106 but via an additional or alternative output mechanism such as speech output (e.g., output via a speaker) or the like.

Figure 12:
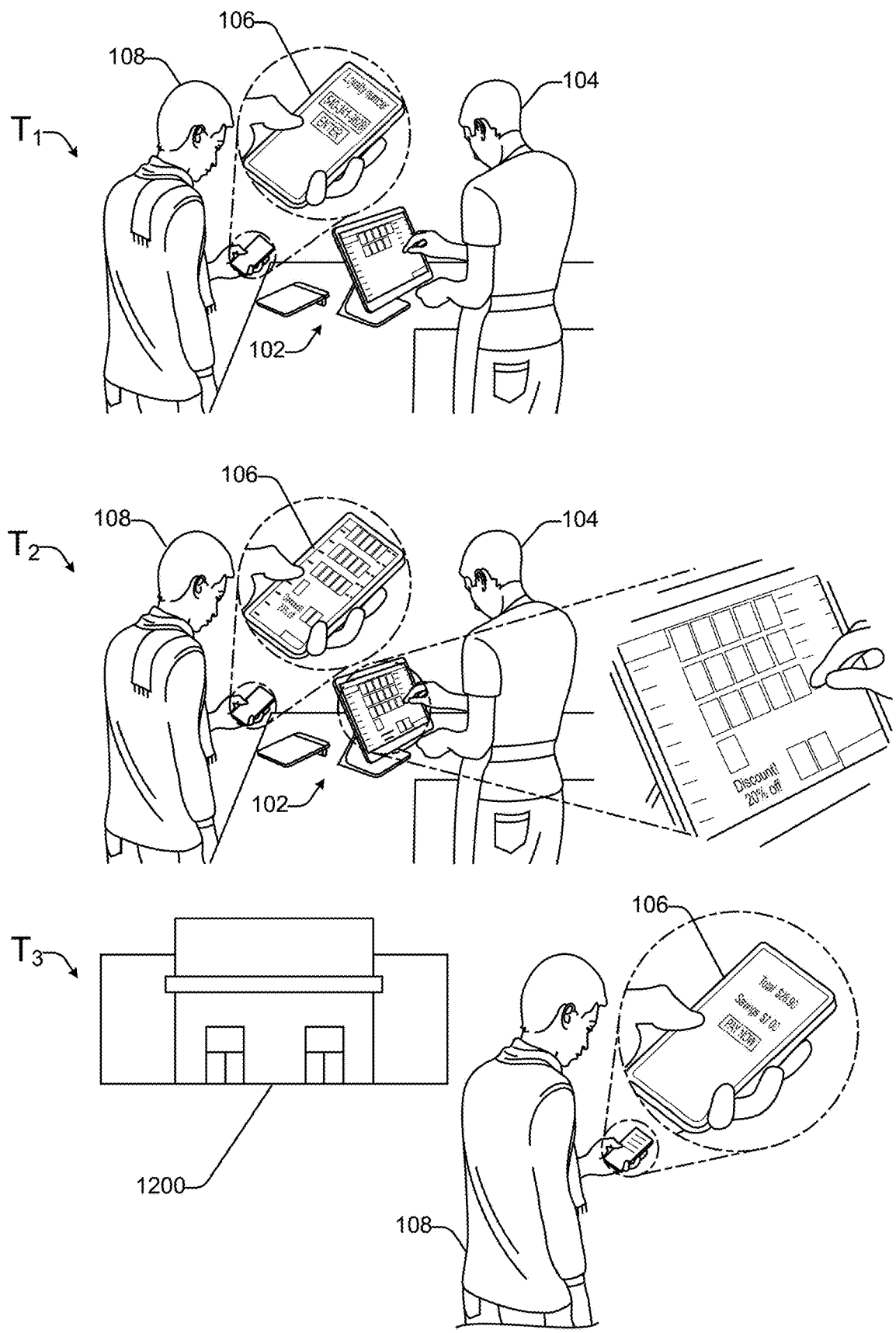
FIG. 12 illustrates another example implementation wherein transaction data, or a portion thereof, can be transmitted to a customer device based at least in part on a merchant initiating a transaction at a merchant device, as described herein.

As described above, in some examples, techniques described herein can modify the timing of payments to be made by customers, such as by providing customers the opportunity to remit payments after they have left physical establishments (e.g., brick-and-mortar stores) of merchants, thereby reducing the amount of time and/or number of interactions between customers and merchants while the customers are in the physical establishments. FIG. 12 illustrates an example of such. That is, FIG. 12 is substantially the same as FIG. 3; however, in FIG. 12, the customer 108 can remit payment after they have left the physical establishment 1200 of the merchant 104. In some examples, as shown below with reference to FIGS. 13 and 14, the customer application 118 can present a GUI that instructs the customer 108 to leave the physical establishment and pay at a later time. However, in some examples, techniques described herein can defer an ordinary payment such that the customer 108 can add items to a tab and pay for such items at a later time. In such an example, indication(s) of item(s) can be stored in association with a data structure that represents item(s) purchased by the customer 108 that can persist while payment for item(s) associated with the data structure is not complete (i.e., paid in full). In such an example, the customer 108 can remit payment, or a portion thereof, for such items at a later time, in a physical establish of the merchant 104, via an online payment portal, via the customer application 118, or the like. In some examples, the merchant 104 can cause an invoice based on the tab to be sent to the customer device 106 (e.g., via text message, email, push notification, in-app notification, etc.) and the customer 106 can remit payment for the invoice in a physical establish of the merchant 104, via an online payment portal, via the customer application 118, or the like.

Figure 13:
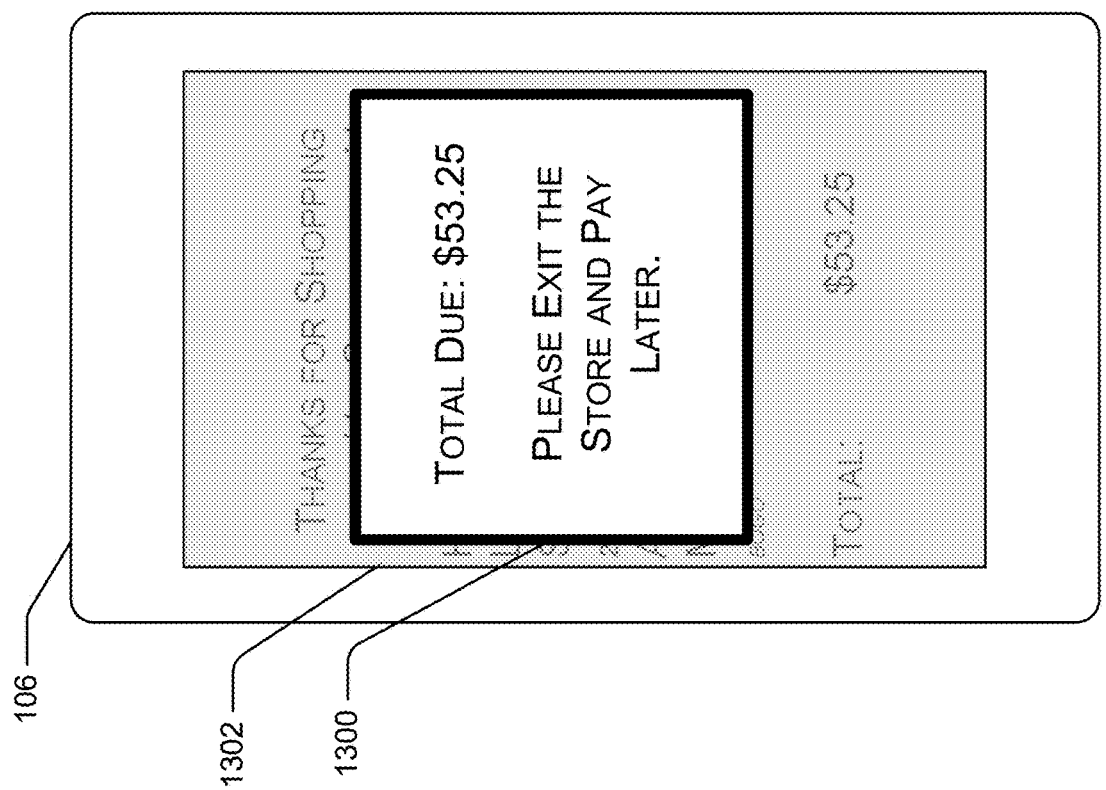
FIG. 13 illustrates an example GUI, as described herein.

In some examples, the customer application 118 can present a user interface element 1300 via a GUI 1302, as illustrated in FIG. 13, that instructs the customer 108 to exit or otherwise leave the physical establishment and pay via a deferred payment (e.g., at a later time). In at least one example, the merchant 104 can interact with the merchant device 102 to cause the POS application 116 to send such an instruction and/or the merchant component 120 can send such an instruction to the customer application 118.

Figure 14:
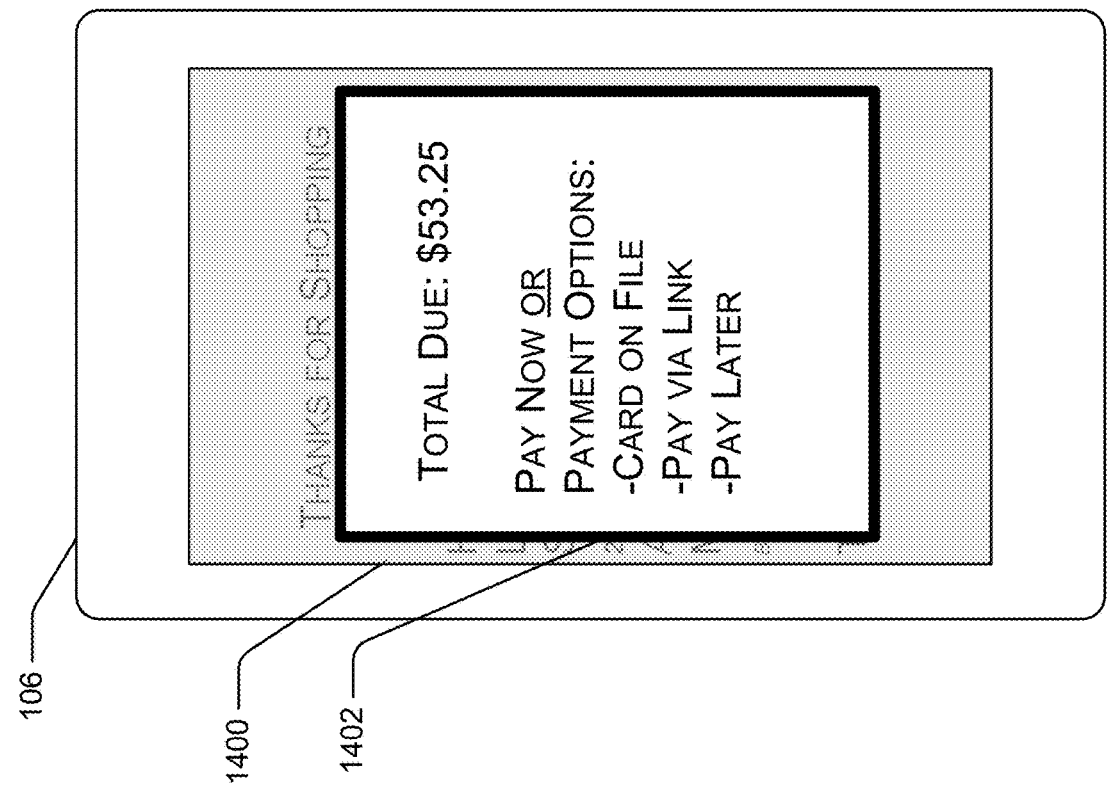
FIG. 14 illustrates another example GUI, as described herein.

Returning to FIG. 12, in at least one example, at some time after the customer 108 has left the physical establishment 1200 (e.g., a third time ($T_3$) after the first time ($T_1$) and the second time ($T_2$)), another GUI 1400, as illustrated in FIG. 14, can be presented via the customer device 106, which can prompt the customer 108 to remit payment. In at least one example, the time between when the customer 108 leaves the physical establishment 1200 and is prompted for payment, for example via the GUI 1400, can be determined based on a risk analysis of the customer 108. Such a risk analysis can leverage machine-trained models and a portion of the customer data 134 associated with the customer 108 to determine a risk associated with whether the customer 108 is likely to remit payment via a deferred payment. In some examples, a customer determined to be less risky may be permitted to remit payment at a time after a customer determined to be riskier. Additional details are described below.

The GUI 1400 can include a user interface element 1402 that includes indications of payment options. In at least one example, the payment options can be substantially similar to the payment options described above with reference to FIG. 8. However, in FIG. 8, when the customer 108 is still in the physical establishment, the customer 108 can have the option to pay at the merchant (e.g., via a merchant device 102) and when the customer 108 has left the physical establishment 1200, that option may not be available. However, a payment option associated with a deferred payment may include receiving a link or the like to access a secure portal associated with the merchant 104 and/or the service provider to input payment data, which can be provided to the payment processing component 122.

FIGS. 13 and 14 are diagrams showing example GUIs that can be presented via respective user interfaces, for example via the customer application 118, described above with reference to FIGS. 1, 2, and 12. The GUIs illustrated are non-limiting examples. Additional or alternative data can be presented via GUIs described herein. Further, additional or alternative designs, configurations, or the like can be presented via GUIs described herein. In some examples, the GUIs can be presented via another functional component such as a web browser. In some examples, same or similar content can be output via the customer device 106 but via an additional or alternative output mechanism such as speech output (e.g., output via a speaker) or the like.

Figure 15:
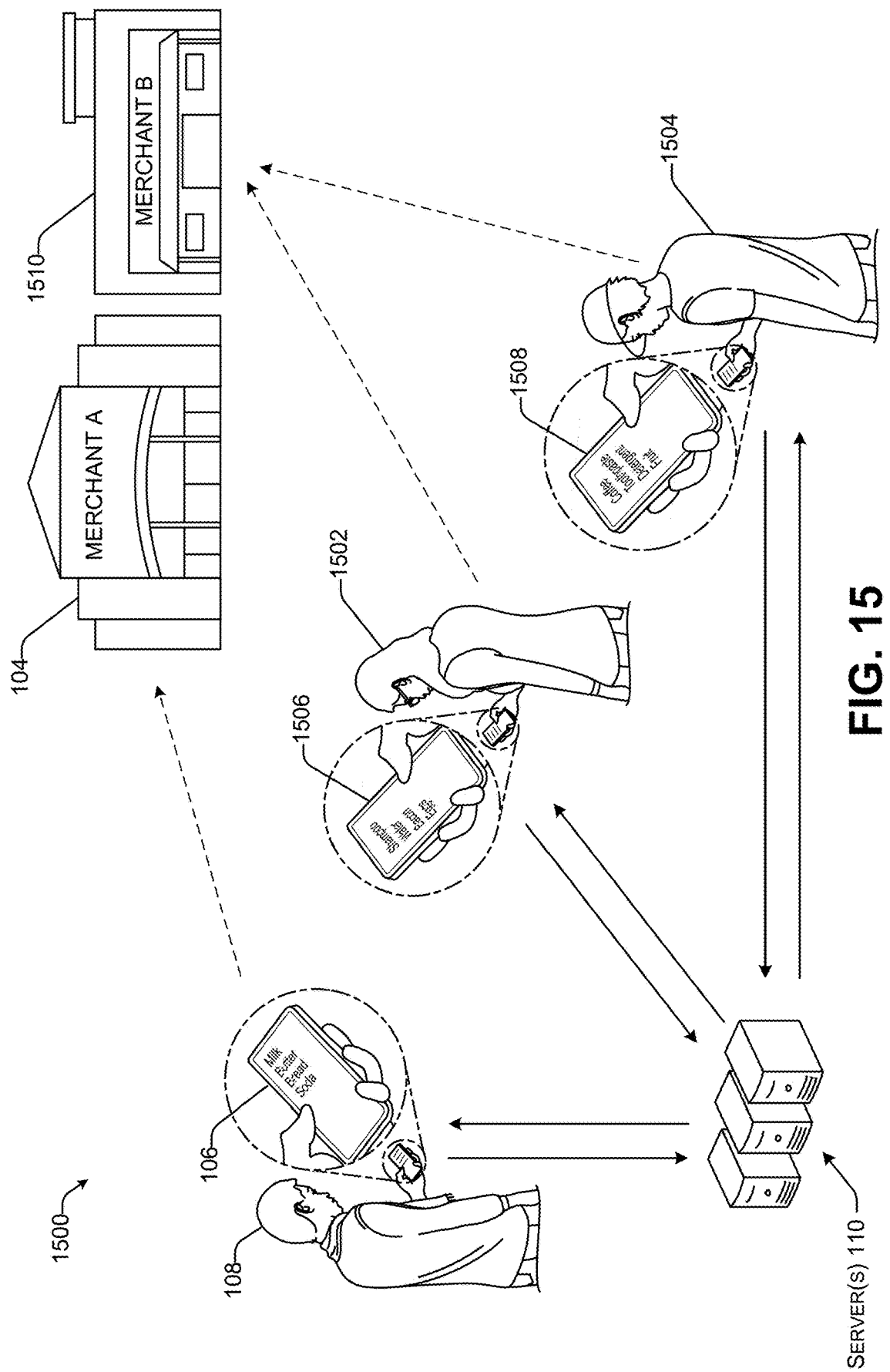
FIG. 15 illustrates an example environment for leveraging a distributed, network-based merchant ecosystem to facilitate social distancing, which can reduce in-person contact and, in some examples, improve the efficiency at which point-of-sale transactions are completed (i.e., reduce friction), as described herein.

FIG. 15 illustrates an example environment 1500 for leveraging a distributed, network-based merchant ecosystem, as illustrated in the example environment 100, to facilitate social distancing, which can reduce in-person contact and, in some examples, improve the efficiency at which point-of-sale transactions are completed (i.e., reduce friction), as described herein. As described above, the distributed, network-based merchant ecosystem can be utilized to spread customers around in space and/or in time, as described above. That is, as described above, techniques described herein can facilitate physical social distancing by intelligently recommending that a customer shop at a particular merchant (e.g., of the merchant ecosystem), based on the needs of the customer (e.g., a list of items compiled at least in part by the customer) and/or the inventory and/or in-store occupancy of the merchant.

In FIG. 15, three customers are depicted (e.g., the customer 108, customer 1502, and the customer 1504). Of course, any number of customers can be associated with the example environment 1500. Each customer can operate their own customer device (e.g., the customer device 106, a customer device 1506, and a customer device 1508). In at least one example, each customer device can have a customer application installed thereon, such as the customer application 118 described above. In at least one example, each of the customers 108, 1502, and 1504 can generate a list of items to be purchased at a later time from a merchant, for example by adding indications of the items to a list via a user interface presented via the customer application 118. In some examples, indications of the items on each list can be sent to the merchant component 120, which can compare the list of items with inventory data of merchants associated with the service provider.

Two merchants are illustrated in FIG. 15: Merchant A, which can correspond to the merchant 104, and Merchant B 1510. In at least one example, the merchant component 120 can compare the items on each list with the inventory data 130. In at least one example, the merchant component 120 can determine a recommendation regarding which merchant of the merchants each customer should patronize to purchase the items on their list. In some examples, the merchant component 120 can receive data indicative of occupancies of each of the physical establishments of the merchants, waiting times associated with each of the physical establishments of the merchants, transaction data indicative of a level of busyness of each of the merchants, and/or available inventories of each of the merchants, and the merchant component 120 can leverage such information to determine such recommendations regarding which merchant each of the customers should patronize.

Figures 16, 17, 18:
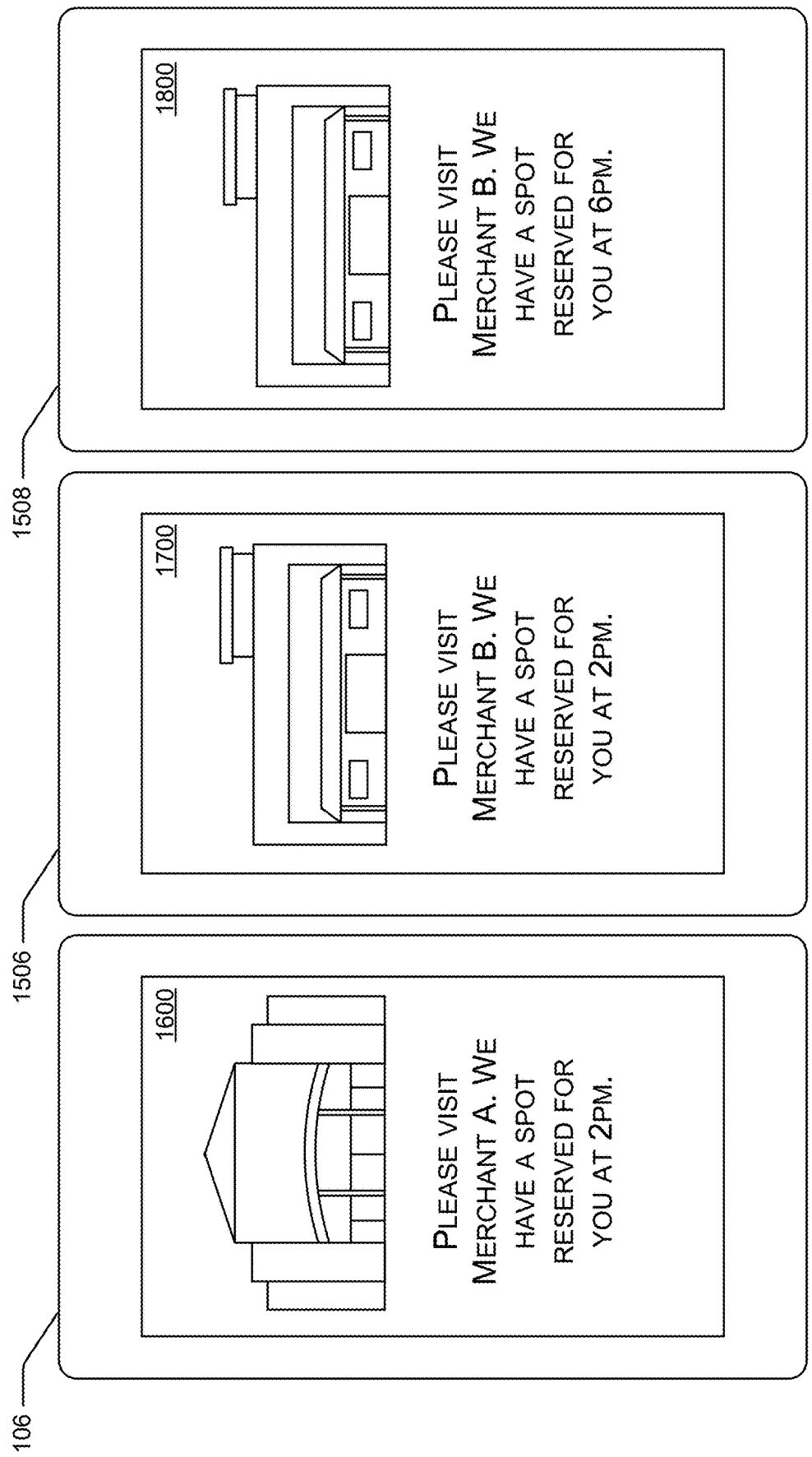
FIG. 16 illustrates an example GUI, as described herein.
FIG. 17 illustrates another example GUI, as described herein.
FIG. 18 illustrates yet another example GUI, as described herein.

In at least one example, the merchant component 120 can send a notification to each of the customer devices 106, 1506, and 1508 to indicate which merchant the corresponding customer is recommended to patronize. In at least one example, the customer applications on each of the customer devices can receive the notifications and present GUIs 1600, 1700, 1800 via the respective customer devices, as illustrated in FIGS. 16-18. In at least one example, the merchant component 120 can utilize an appointment service or a reservation service to reserve a time for each customer to shop at each of the merchants. In some examples, the notifications can include times reserved and/or recommended for each customer, as illustrated in GUIs 1600, 1700, and 1800. In additional or alternative examples, such times can be based on sales trends or the like, which can be determined based on stored transaction data 128.

Figure 19:
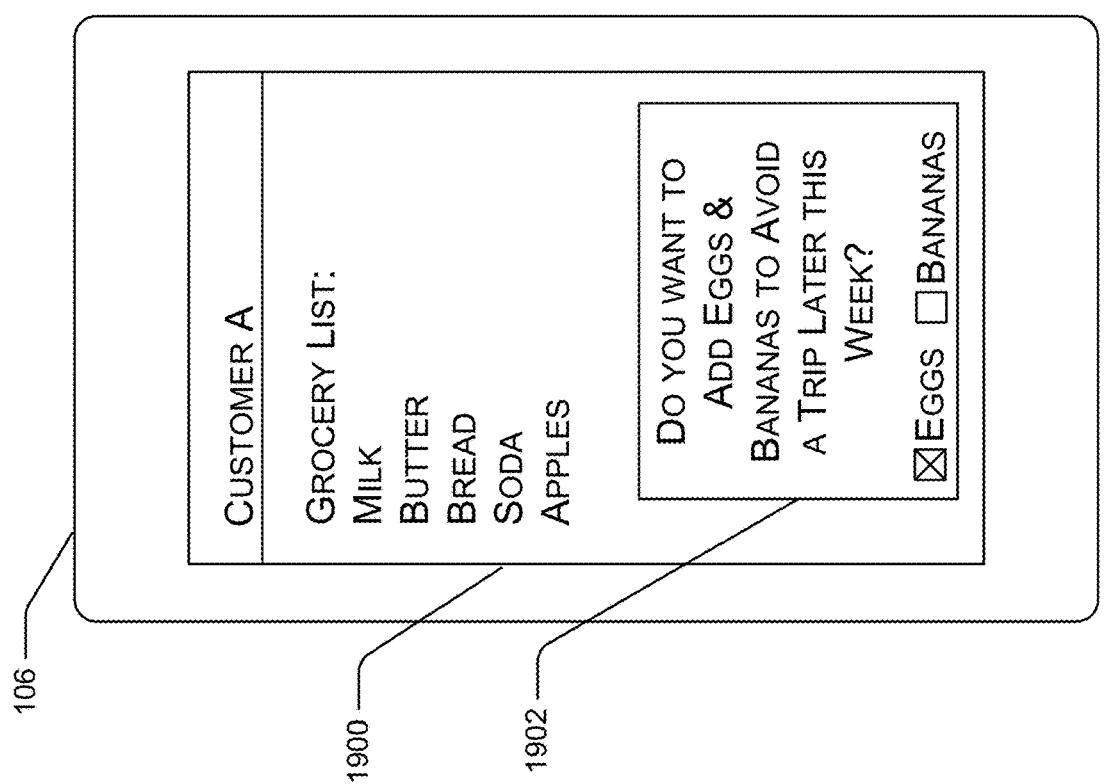
FIG. 19 illustrates an example GUI, as described herein.

In some examples, techniques described herein can leverage intelligence available via the distributed, network-based merchant ecosystem to make recommendations to individual customers with respect to items to add to their lists (e.g., to minimize a number of trips to a physical establishment and/or out of their homes). In some examples, the merchant component 120 can access customer data 134, transaction data 128, and/or inventory data 130 to determine one or more items to recommend adding to a list of the customer 108. In some examples, the merchant component 120 can utilize machine-trained models to identify which item(s) to recommend to the customer 108. In some examples, such recommendations can be based on previous purchases of the customer 108, previous purchases of customers similar to the customer 108, and/or a general population of customers associated with the service provider. In some examples, customer preferences associated with the customer data 134 can be considered. In some examples, available inventory can be considered. In at least one example, the merchant component 120 can send a recommendation to the customer device 106 and the customer application 118 can present a GUI 1900, as illustrated in FIG. 19, that can include a user interface element 1902 associated with a recommendation of item(s) to add to a list of items to be purchased.

In some examples, the merchant component 120 can facilitate mixed fulfillment options. For example, the customer 108 can opt to have some items pre-selected and packaged for pick-up at the merchant 104. However, some items (e.g., produce, meat, wine, beer, etc.) may be associated with more subjective selection and the customer 108 may prefer to select those personally. Nevertheless, for those items that are not associated with a subjective selection, the merchant component 120 can send an instruction to the merchant device 102 and the merchant 104 can select and package those items prior to the customer 108 arriving at the physical establishment of the merchant 104. As such, the customer 108 need not spend as much time in the physical establishment of the merchant 104.

Figure 20:
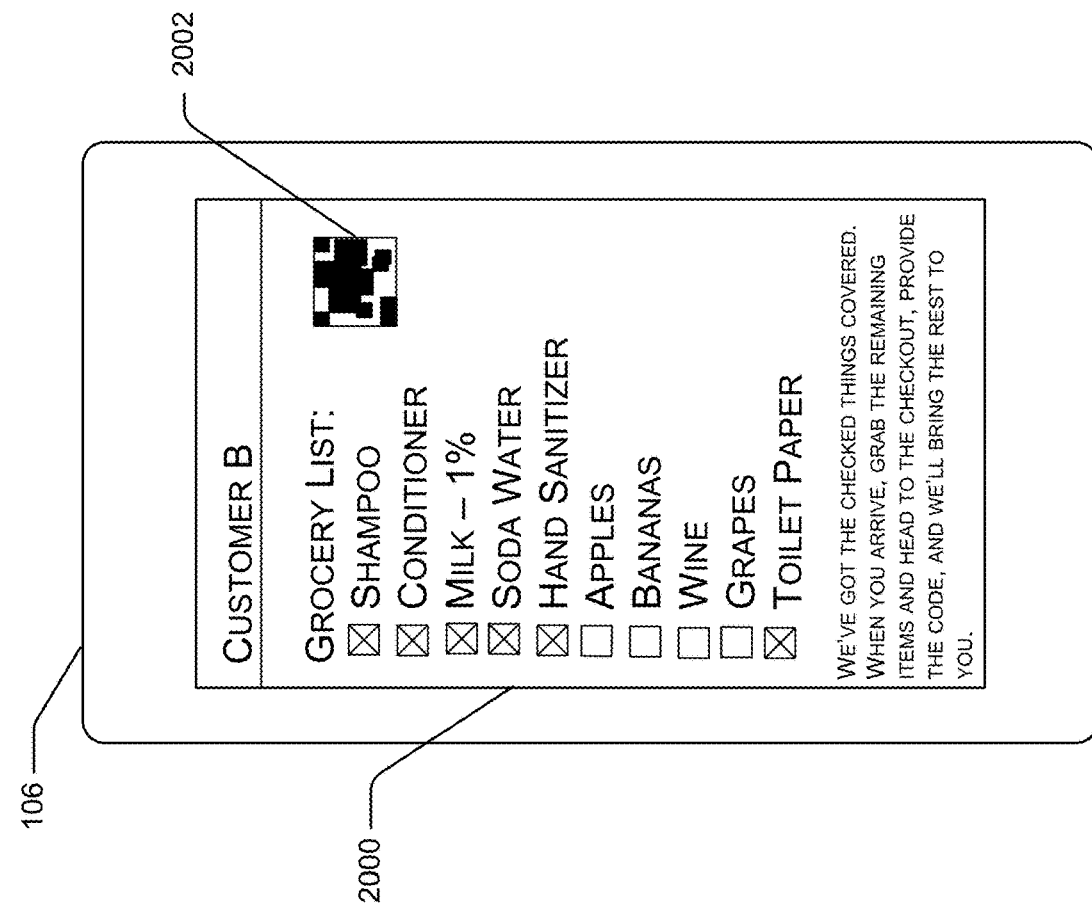
FIG. 20 illustrates another example GUI, as described herein.

In some examples, the customer 108 can designate which item(s) the merchant 104 is to fulfill and which item(s) the customer desires to fulfill. In other examples, the merchant component 120 can intelligently determine which item(s) the merchant 104 is to fulfill and which item(s) the customer 108 is to fulfill personally. In either example, if item(s) on the list are associated with a fulfillment option where the merchant 104 selects and packages the item(s), the merchant component 120 can cause a GUI 2000 to be presented via the customer device 106, as illustrated in FIG. 20, which can indicate which items are to be fulfilled prior to the customer 108 arriving at the physical establishment of the merchant 104 and which items the customer 108 is to select upon arrival. In some examples, the merchant component 120 can provide an identifier, barcode, QR code 2002, or the like that the customer 108 can present to the merchant 104 to identify their transaction. At the point-of-sale, the merchant 104 can input the identifier and/or the merchant device 102 can read and/or scan the barcode, QR code 2002, or the like, to determine which item(s) to obtain for the customer 108 at the point-of-sale.

Figure 21:
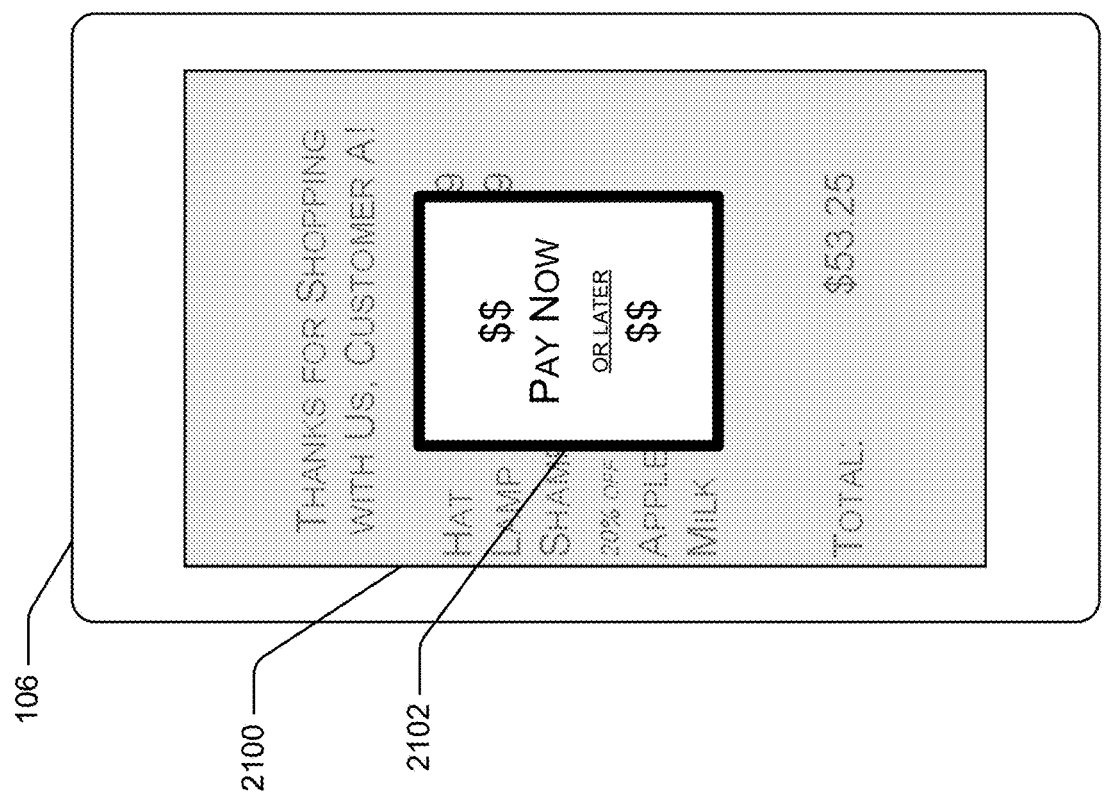
FIG. 21 illustrates another example GUI, as described herein.

As described above, in some examples, techniques described herein can facilitate social distancing by offering payment options for customers. For example, some customers may be limited as to when they can shop depending on receipt of payroll payments, government benefits, or the like. This can cause an influx of customers shopping at the same time, which can cause depleted inventories and/or crowded physical establishments. In an example, techniques described herein can offer funding (e.g., credit, a loan, an advance, etc.) to customers to allow them to shop when necessary and/or convenient without relying on timing associated with when their payroll payments, government benefits, or the like are received. In such examples, and as illustrated at FIG. 21, the merchant component 120 can offer such payment options (e.g., for deferred payment) at a point-of-sale, for example, when a payment is requested for a transaction. In at least one example, a GUI 2100 can present a payment request for a transaction, as described above with reference to FIGS. 8 and 14. In at least one example, the GUI 2100 can include a user interface element 2102 that includes an option to pay now and another option to pay later. In some examples, the GUI 2100 can be presented to all customers. In some examples, the GUI 2100 can be presented to customers known to be associated with a particular characteristic (e.g., recipient of government benefits, a risk score below a threshold, a status tier, etc.).

Figure 22:
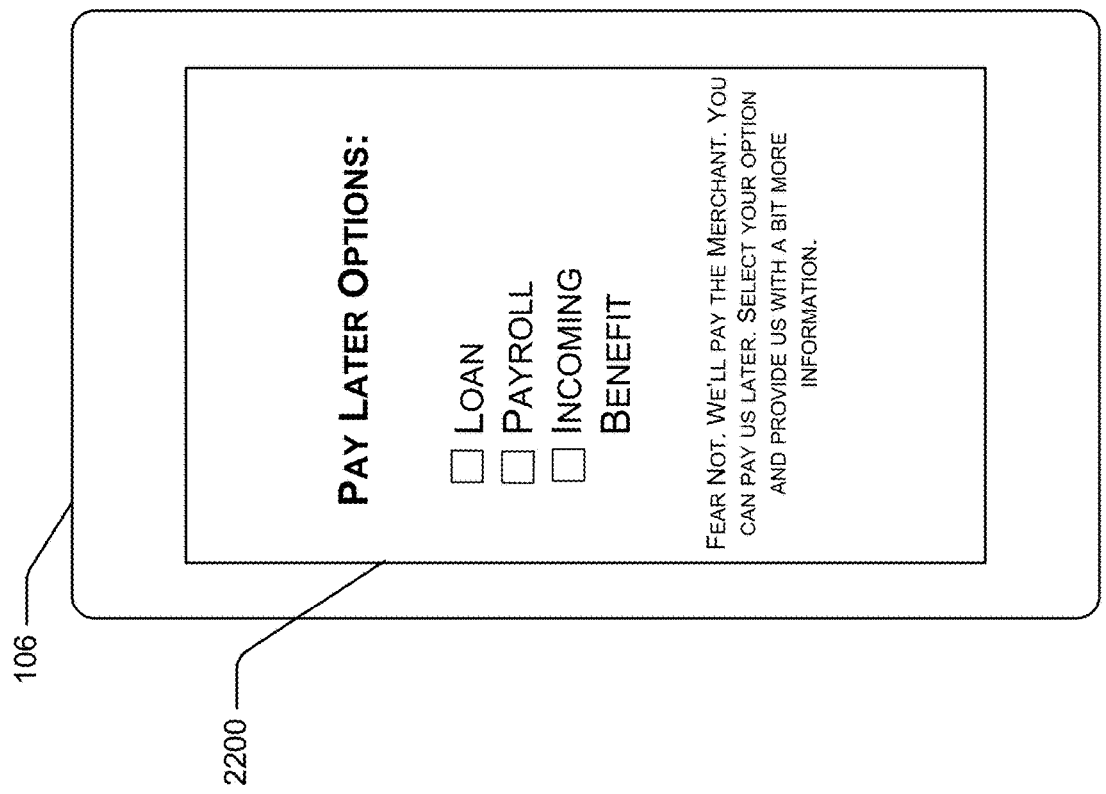
FIG. 22 illustrates yet another example GUI, as described herein.

In at least one example, if the customer 108 opts to pay later (e.g., by actuating a mechanism associated with the "pay later" option), another GUI 2200 can be presented via the customer device 106, as illustrated in FIG. 22. In at least one example, the GUI 2200 can include indications of one or more options for deferred payment. In at least one example, based at least in part on a customer 108 providing an input (e.g., via the GUI 2100) indicating a selection of a deferred payment option, the merchant component 120 can cause the presentation of one or more deferred payment options, which, in some examples, can be particular to the customer 108, based on other customers similar to the customer 108, or available to each customer associated with the service provider. As described above, such deferred payment options can include credit, a loan, or an advance. In each example, the merchant component 120 can pay the merchant 104 as payment is due for a transaction and can issue the credit, loan, advance, etc. to the customer 108. That is, the merchant component 120 can transfer funds based on a total cost of a transaction to an account of a merchant and associate an indication of the credit, loan, advance, etc. with a profile of the customer 108. Then, in at least one example, when the customer 108 receives a payroll payment or government benefit, the customer 108 can pay the service provider, and the payment processing component 122 can facilitate repayment of the service provider by depositing funds into an account associated with the service provider or otherwise repay a loan, credit, or advance. That is, the service provider can collect funds from the customer 108 at a later time (e.g., when payroll payments are received, when government benefits are received, or the like) after payment is due for a transaction. As a result, techniques described herein can leverage the merchant ecosystem for deferring payments for customers, thereby reducing the number of people in a physical establishment at particular times, in an effort to facilitate social distancing. Additional details are described below. As described above, in some examples, funds from the customer 108 can be collected at a time prior to when the customer 108 shops and the service provider can instruct the customer 108 when to shop. In some examples, the service provider can provide a reward or benefit to the customer 108 for pre-paying.

FIGS. 16-22 are diagrams showing example GUIs that can be presented via respective user interfaces, for example via the customer application 118, described above with reference to FIGS. 1, 2, and 15. The GUIs illustrated are non-limiting examples. Additional or alternative data can be presented via GUIs described herein. Further, additional or alternative designs, configurations, or the like can be presented via GUIs described herein. In some examples, the GUIs can be presented via another functional component such as a web browser. In some examples, same or similar content can be output via the customer device 106 but via an additional or alternative output mechanism such as speech output (e.g., output via a speaker) or the like.

While some techniques described above are described as being performed by the POS application 116 or the merchant component 120, in some examples, such techniques can be performed by the POS application 116 and/or the merchant component 120, as described below. Moreover, while techniques described above are described with reference to a transaction between the customer 108 and the merchant 104, wherein the merchant 104 is adding item(s) to the transaction, in additional or alternative examples, techniques described herein can be similarly applicable to self-checkout systems. In such examples, the customer 108 can be adding item(s) to the transaction instead of, or in addition to, the merchant 104.

FIGS. 23-30 are flowcharts showing example processes involving techniques as described herein. The processes illustrated in FIGS. 23-30 are described with reference to FIG. 1 for convenience and ease of understanding. FIGS. 31 and 32 provide additional details associated with the components of FIG. 1 above. The processes illustrated in FIGS. 23-30 are not limited to being performed using components described in FIG. 1, and such components are not limited to performing the processes illustrated in FIGS. 23-30.

The processes 2300-3000 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 2300-3000 can be combined in whole or in part with each other or with other processes.

Figure 23:
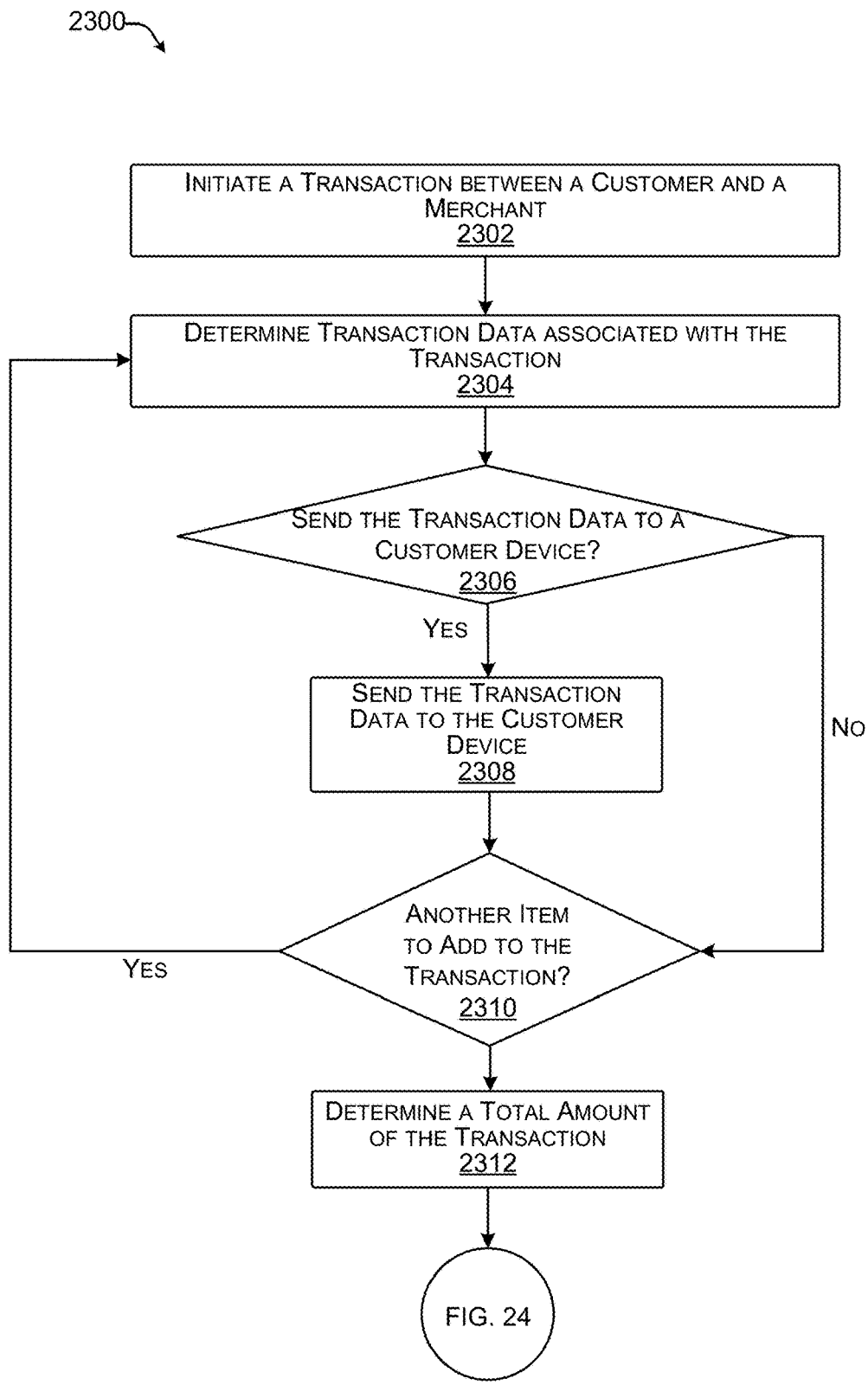
FIG. 23 illustrates an example process for generating transaction data and/or offloading at least a portion of the transaction data from a merchant device to a customer device, as described herein.

FIG. 23 illustrates an example process 2300 for generating transaction data and/or offloading at least a portion of the transaction data from a merchant device to a customer device, as described herein.

At operation 2302, a transaction between a customer and a merchant can be initiated. In at least one example, the merchant 104 can interact with the merchant device 102 to initiate a transaction. In such an example, based at least in part on the merchant 104 initiating a transaction, the POS application 116 can generate a data structure for storing transaction data associated with the transaction. In some examples, the POS application 116 can send the data structure, or a duplicate thereof, to the merchant component 120.

As described above, in some examples, a transaction can be initiated without input from the merchant 104. For instance, in some examples, a transaction can be initiated based on detecting the customer device 106 is proximate to, or within a threshold distance of, the merchant device 102 and/or a physical establishment of the merchant 104. In such examples, based at least in part on detecting the customer device 106 is proximate to, or within a threshold distance of, the merchant device 102 and/or a physical establishment of the merchant 104, the POS application 116 and/or the merchant component 120 can generate a data structure for storing transaction data associated with a transaction, thereby initiating a transaction. In some examples, a transaction can be initiated prior to the customer 108 entering the physical establishment of the merchant 104. For instance, in at least one example, generation of a data structure storing indications of items of a list, as described below, can initiate a transaction.

At operation 2304, the POS application 116 and/or the merchant component 120 can determine transaction data associated with the transaction. In at least one example, transaction data can include data associated with one or more items to be purchased, or otherwise acquired, via the transaction. In at least one example, as one or more items are added to a transaction (e.g., indication(s) of such item(s) can be added to the data structure associated with the transaction), the POS application 116 can determine transaction data. In some examples, the one or more items can be added to a transaction via scanning a barcode, QR code, or the like associated with each item, radio-frequency identification (RFID) tags associated with individual items, manually inputting item identifiers associated with individual items, or the like. In some examples, transaction data can include item details, such as quantity, item characteristic, price, or the like. In some examples, the POS application 116 can send transaction data to the merchant component 120 for association with the data structure (e.g., for storage).

At operation 2306, the POS application 116 and/or the merchant component 120 can determine whether to send the transaction data, or a portion thereof, to a customer device. In at least one example, the merchant component 120 can determine to send the transaction data to the customer device 106 based at least in part on receiving an identifier from either the POS application 116 (e.g., a customer identifier associated with the customer 108) or the customer application 118 (e.g., a transaction identifier associated with the transaction, merchant identifier associated with the merchant 104, etc.). That is, in some examples, as described above with reference to FIG. 2, the merchant component 120 can receive an identifier, and the merchant component 120 can determine to send the transaction data to the customer application 118 based at least in part on receiving such an identifier. Additional details are also described below with reference to FIG. 26.

In an additional or alternative example, the POS application 116 and/or the merchant component 120 can determine that the customer device 106 is proximate to, or within a threshold distance of, the merchant device 102 and can determine to send the transaction data, or a portion thereof, to the customer application 118 based at least in part on determining that the customer device 106 is proximate to, or within a threshold distance of, the merchant device 102. Examples of techniques for determining whether the customer device 106 is proximate to, or within a threshold distance of, the merchant device 102 are described above with reference to FIG. 2. Additional details are also described below with reference to FIG. 26.

At operation 2308, the POS application 116 and/or the merchant component 120 can send the transaction data to the customer device. In at least one example, based at least in part on determining to send the transaction data to the customer device 106 (i.e., "yes" at operation 2306), the POS application 116 and/or the merchant component 120 can send the transaction data to the customer device 106 (e.g., the customer application 118 associated therewith). In some examples, the POS application 116 can send transaction data, or a portion thereof, to the customer device 106 directly via the network(s) 112. In other examples, the POS application 116 can send transaction data, or a portion thereof, to the customer device 106 indirectly via the network(s) 112. In some examples, the merchant component 120 can send the transaction data, or a portion thereof, to the customer device 106, as described above. Additional details are described above with reference to FIG. 2.

As described above, in at least one example, transaction data, or portion thereof, can be transmitted to the customer application 118 at any point in time relative to a transaction. In some examples, transaction data, or a portion thereof, can be transmitted to the customer application 118 prior to a transaction, during a transaction, or after a transaction. For example, in at least one example, transaction data, or a portion thereof, can be transmitted to the customer application 118 when the customer 108 enters a physical establishment of the merchant 104 and/or is otherwise detected as being proximate to, or within a threshold distance of, the merchant device 102. In another example, transaction data, or a portion thereof, can be transmitted to the customer application 118 when the merchant 104 initiates the transaction at the merchant device 102. In yet another example, transaction data, or a portion thereof, can be transmitted to the customer application 118 after a transaction is completed by the merchant 104 at the merchant device 102 (e.g., via a receipt).

In at least one example, based at least in part on determining not to send the transaction data to the customer device 106 (i.e., "no" at operation 2306), the POS application 116 and/or the merchant component 120 can proceed to operation 2310 below.

At operation 2310, the POS application 116 and/or the merchant component 120 can determine whether there is another item to add to the transaction. In at least one example, the POS application 116 and/or the merchant component 120 can determine whether the merchant 104 has interacted with the merchant device 102 to indicate that all items have been added to the transaction and/or to initiate a payment flow. If the merchant 104 has not indicated either and/or if there is an additional item to be added to the transaction, the process 2300 can return to operation 2304, wherein additional transaction data can be determined for the additional item. In at least one example, the POS application 116 and/or the merchant component 120 can update the data structure to include an indication of another item and associate additional transaction data therewith.

At operation 2312, the POS application 116 and/or the merchant component 120 can determine a total amount of the transaction. In at least one example, if there are no more items to be added to the transaction, the POS application 116 and/or the merchant component 120 can determine a total amount for the transaction, which can be based at least in part on a cost of each item associated with the transaction. Based at least in part on determining the total amount of the transaction, the process 2300 can continue as described in FIG. 24 below.

Figure 24:
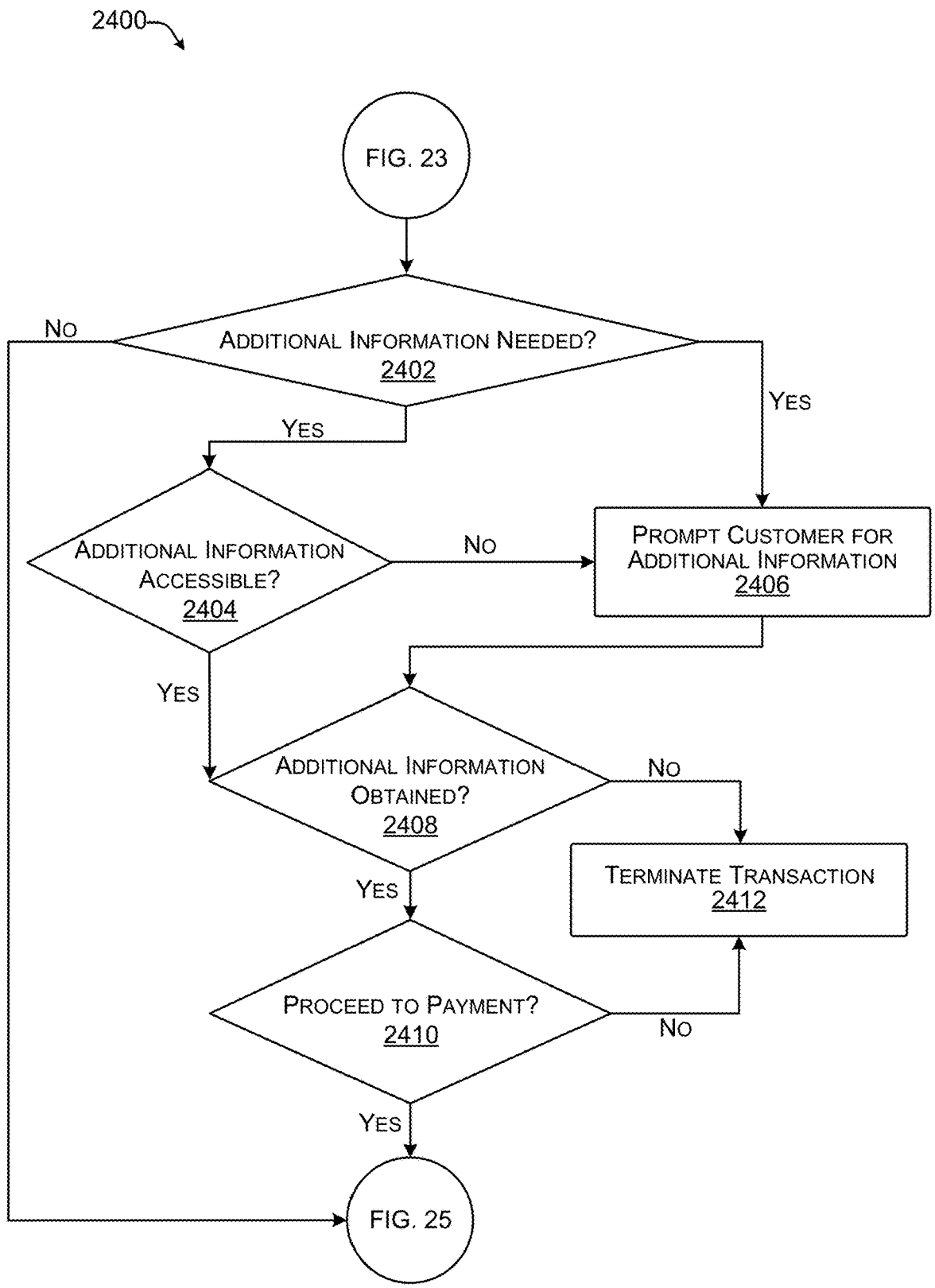
FIG. 24 illustrates an example process for determining whether additional information is needed to complete a transaction, as described herein.

FIG. 24 illustrates an example process 2400 for determining whether additional information is needed to complete a transaction, as described herein. As described above, in some examples, additional information can be required before a transaction can proceed to a payment flow and/or a payment can be accepted. For example, in at least one example, the customer 108 can be required to satisfy one or more health-related requirements before the customer 108 can remit payment for the transaction. In an additional or alternative example, the merchant 104 and/or the customer 108 may be required to provide an identification of the customer 108 and/or verify the identity of the customer 108 to ensure that the customer 108 is permitted to complete the purchase. In at least one example, failure to provide the requisite additional information can block the transaction from being completed.

At operation 2402, the POS application 116 and/or the merchant component 120 can determine whether additional information is needed to complete the transaction. In at least one example, each transaction can be conditional on satisfaction of a health-related requirement (e.g., during a pandemic or other large-scale health-related crisis). In such examples, the POS application 116 and/or the merchant component 120 can determine that additional information is required to complete the transaction. In additional or alternative examples, the POS application 116 and/or the merchant component 120 can analyze transaction data associated with a transaction to determine whether any of the item(s) associated with the transaction require the presentation of additional information.

If the POS application 116 and/or the merchant component 120 determine that additional information is not required (i.e., "no" at operation 2402), the process 2400 can proceed as described below with reference to FIG. 25.

At operation 2404, the POS application 116 and/or the merchant component 120 can determine whether additional information is accessible to the POS application 116 and/or the merchant component 120. For instance, in some examples, the additional information required can be stored in association with the data store(s) 124 and/or in association with data that is stored in a data store associated with the third-party server(s) 114 (e.g., the Department of Motor Vehicles or the like), which can be retrieved by the POS application 116 and/or the merchant component 120. In at least one example, the POS application 116 and/or the merchant component 120 can determine whether the requested additional information is stored in the data store(s) 124 and/or a data store associated with the third-party server(s) 114.

In at least one example, if such information is available, the POS application 116 and/or the merchant component 120 can determine whether the customer 108 has provided consent for accessing such additional information (e.g., via a consent flow prior to the time of the transaction). If the customer 108 has not provided consent (i.e., "no" at operation 2404) and/or the information is not available (i.e., "no" at operation 2404), the POS application 116 and/or the merchant component 120 can prompt the customer for additional information, as illustrated at operation 2406. That is, the POS application 116 and/or the merchant component 120 can send a request to the customer device 106 to prompt the customer 106 to provide consent to access stored data and/or to input or otherwise provide the requested additional information. That is, in at least one example, based at least in part on determining that additional information is required to complete the transaction (i.e., "yes" at operation 2402) and such additional information is not accessible to the POS application 116 and/or the merchant component 120 (i.e., "no" at operation 2404), the POS application 116 and/or the merchant component 120 can send a request for consent and/or such additional information to the customer device 106 and the customer application 118 can cause a notification of such a request to be presented via a user interface. In an example where consent is required, the POS application 116 and/or the customer application 118 can present a consent flow (e.g., present one or more GUIs for receiving input) to obtain consent (from the customer 108) to access stored data associated with the customer 108.

If the additional information is available and the customer 108 has provided consent (i.e., "yes" at operation 2404), the POS application 116 and/or the merchant component 120 can access the additional data as requested from the data store storing such additional information (e.g., the data store(s) 124 and/or in association with data that is stored in a data store associated with the third-party server(s) 114).

At operation 2408, the POS application 116 and/or the merchant component 120 can determine whether the additional information has been obtained. In at least one example, the POS application 116 and/or the merchant component 120 can monitor incoming data to determine whether the additional information has been received or otherwise obtained. If additional information is received (i.e., "yes" at operation 2408), the POS application 116 and/or the merchant component 120 can determine whether to proceed to payment, as illustrated at operation 2410.

For instance, in an example where the customer 108 is required to satisfy a temperature requirement before the customer 108 can remit payment for the transaction, a temperature reading can be provided to the POS application 116 and/or the merchant component 120 (e.g., from the POS application 116 and/or the customer application 118), as described above with reference to FIG. 10. In some examples, the POS application 116 and/or the merchant component 120 can compare the temperature reading to a threshold to determine whether the temperature of the customer 108 satisfies the threshold. In some examples, the POS application 116 and/or the merchant component 120 can compare the temperature reading to a range to determine whether the temperature of the customer 108 is within the range. In at least one example, if the temperature reading satisfies the threshold and/or is within the range, the POS application 116 and/or the merchant component 120 can determine to proceed with payment (i.e., "yes" at operation 2410).

In an additional or alternative example where the customer 108 is required to provide an identification and/or verify their identity to proceed to payment, and thus complete a transaction, the POS application 116 and/or the merchant component 120 can access the data store(s) 124 and/or in association with data that is stored in a data store associated with the third-party server(s) 114 (e.g., so long as the customer has consented to such access) to obtain the requested identification and/or verification data. In another example, the customer 108 can present a legal identification instrument (e.g., a driver's license, a passport, etc.) or other indicator of their identity (e.g., a biometric identifier, personal identification number, etc.), and the POS application 116 and/or the merchant component 120 can analyze the legal identification instrument and/or other indicator to determine whether the customer 108 is permitted to purchase the item. In some examples, the POS application 116 and/or the merchant component 120 can compare the data submitted by the customer 108 to stored data associated with the customer 108 (e.g., to verify an identity of the customer 108). In some examples, the stored data can be stored in the data store(s) 124. In other examples, the stored data can be stored in a data store associated with the third-party server(s) 114 (e.g., the Department of Motor Vehicles or the like), which can be retrieved by the POS application 116 and/or the merchant component 120.

In some examples, the POS application 116 and/or the merchant component 120 can prompt the customer 108 to provide a second identifier, such as a biometric identifier, an identification number or the like, as a second factor that can be used to verify and/or otherwise confirm the identity of the customer 108. In at least one example, if the identity of the customer 108 is verified and/or otherwise confirmed, the POS application 116 and/or the merchant component 120 can determine to proceed with payment (i.e., "yes" at operation 2410).

At operation 2412, the POS application 116 and/or the merchant component 120 can terminate the transaction. In at least one example, if no additional information is obtained (i.e., "no" at operation 2408) and/or the POS application 116 and/or the merchant component 120 determine not to proceed with payment (i.e., "no" at operation 2410), the POS application 116 and/or the merchant component 120 can determine to terminate the transaction. In such an example, the POS application 116 and/or the merchant component 120 can send an indication of such to the customer application 118 and the customer application 118 can cause a presentation of the indication via a user interface. That is, the customer application 118 can present an indication the that transaction was terminated and/or is otherwise not permitted to proceed to payment via a UI. In some examples, the POS application 116 can present a same or similar indication to the merchant 104.

Figure 25:
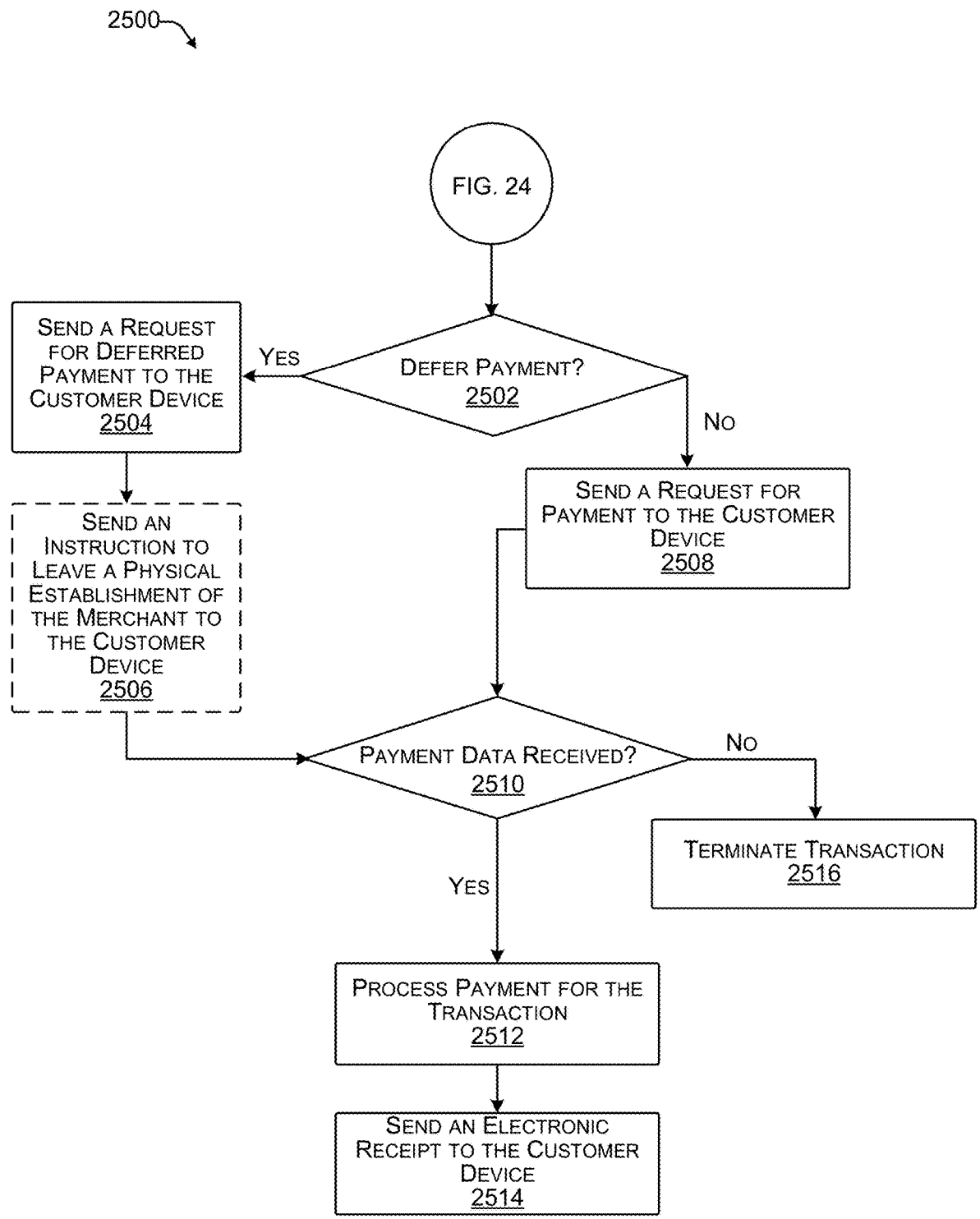
FIG. 25 illustrates an example process for processing payment for a transaction, as described herein.

FIG. 25 illustrates an example process 2500 for processing payment for a transaction, as described herein.

At operation 2502, the POS application 116 and/or the merchant component 120 can determine whether to defer payment for the transaction. In some examples, the POS application 116 and/or the merchant component 120 can access data associated with a customer 108 (e.g., stored in the customer data 134) and can determine that the customer 108 is associated with a deferred payment option. In some examples, such a determination can be made to enable the customer 108 to exit the physical establishment as soon as possible (e.g., to reduce the amount of time they are in the physical establishment). Additional details associated with determining whether the customer 108 is associated with a deferred payment option are described below. In some examples, the POS application 116 and/or the merchant component 120 can access data associated with a merchant (e.g., stored in the merchant data 132, transaction data 128, or the like) and can determine to defer a payment associated with the transaction. In some examples, such a determination can be made in an effort to get customers to leave a physical establishment of the merchant 104 to lower occupancy and/or to improve the flow of customers in the physical establishment.

At operation 2504, the POS application 116 and/or the merchant component 120 can send a request for deferred payment to the customer device. In at least one example, based at least in part on determining to defer payment for the transaction (i.e., "yes" at operation 2502), the POS application 116 and/or the merchant component 120 can send a request for deferred payment to the customer device 106. In at least one example, the customer application 118 can receive the request and can cause an indication of the request to be presented via a user interface.

At operation 2506, which can be optional, the POS application 116 and/or the merchant component 120 can send an instruction to leave a physical establishment of the merchant to the customer device. In at least one example, based at least in part on determining to defer payment for the transaction (i.e., "yes" at operation 2502), the POS application 116 and/or the merchant component 120 can send an instruction for the customer 108 to leave the physical establishment of the merchant 104 to the customer device 106. In at least one example, the customer application 118 can receive the request and can cause the instruction to be presented via a user interface.

In at least one example, an amount of time for which the payment is deferred can be determined based on a risk analysis of the customer 108. Such a risk analysis can leverage machine-trained models and a portion of the customer data 134 associated with the customer 108 to determine a risk associated with whether the customer 108 is likely to remit payment via a deferred payment. In some examples, a customer determined to be less risky may be permitted to remit payment at a time after a customer determined to be riskier. Additional details are described below.

It should be noted that not every deferred payment request is accompanied by an instruction to leave a physical establishment. In some examples, the POS application 116 and/or the merchant component 120 can send the request for deferred payment but can refrain from sending the instruction to leave the physical establishment.

At operation 2508, the POS application 116 and/or the merchant component 120 can send a request for payment to the customer device. In at least one example, when each of the item(s) associated with the transaction have been added to the transaction, and additional information has been procured, as necessary, the merchant 104 can interact with the merchant device 102 to initiate a payment flow for receiving payment associated with the transaction. In some examples, a GUI presented by the POS application 116 can include a control or other mechanism that, when actuated, initiates a payment flow. In at least one example, based at least in part on the merchant 104 initiating the payment flow via the merchant device 102, the POS application 116 can send a request for payment to the customer device 106. In examples where the payment is deferred, the POS application 116 and/or the merchant component 120 can send the payment request after a lapse of time (which can be particular to the customer 18, as described below), at a particular time, responsive to a request, or the like. In at least one example, the customer application 118 can receive the request for payment and can cause such a payment request to be presented via a user interface of the customer device 106.

At operation 2510, the payment processing component 122 can determine whether payment data has been received. In at least one example, the payment processing component 122 can monitor incoming data to determine whether payment data associated with a payment request has been received. The payment processing component 122 can receive payment data via any of the mechanisms described above with reference to FIG. 8.

At operation 2512, the payment processing component 122 can process payment for the transaction. In at least one example, based at least in part on the payment processing component 122 receiving the payment data (i.e., "yes" at operation 2510), the payment processing component 122 can process the payment data as described above with reference to FIG. 1 and also below with reference to FIG. 31.

At operation 2514, the payment processing component 122 can send an electronic receipt to the customer device. In at least one example, based at least in part on the payment being successful (e.g., the payment data being authorized for at least a portion of the cost of the transaction), the payment processing component 122 can send an indication of such to at least the merchant device 102. In at least one example, the merchant component 120 and/or the POS application 116 can send an electronic receipt, or other confirmation that the payment is complete, to the customer device 106. As described above with reference to FIG. 9, the electronic receipt can include transaction details and, in some examples, mechanism(s) for the customer 108 to provide feedback and/or continue a conversation (e.g., via a conversation platform) with the merchant 104 after the transaction and/or payment are complete.

At operation 2516, the POS application 116 and/or the merchant component 120 can terminate the transaction. In at least one example, if payment data is not received (i.e., "no" at operation 2510), the POS application 116 and/or the merchant component 120 can determine to terminate the transaction. In such an example, the POS application 116 and/or the merchant component 120 can send an indication of such to the customer application 118 and the customer application 118 can cause a presentation of the indication via a user interface. That is, the customer application 118 can present an indication the that transaction was terminated and/or is otherwise not permitted to proceed to payment via a UI. In some examples, the POS application 116 can present a same or similar indication to the merchant 104.

Figure 26:
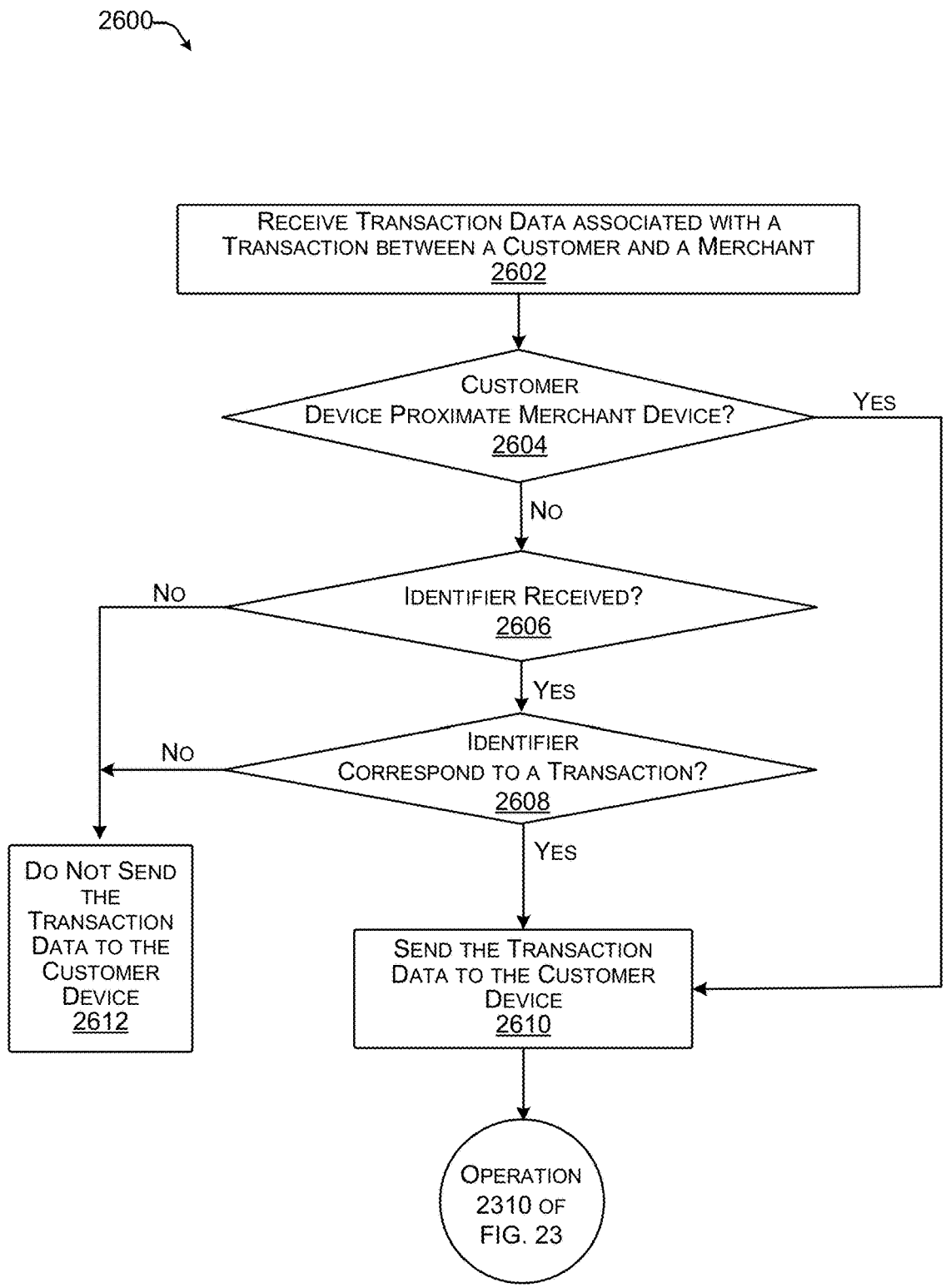
FIG. 26 illustrates an example process for sending transaction data to a customer device, as described herein.

FIG. 26 illustrates an example process 2600 for sending transaction data to a customer device, as described herein. As described above with reference to FIG. 2, in at least one example, at least a portion of a transaction (e.g., operation(s) associated therewith) can be offloaded from the merchant device 102 to the customer device 106. In some examples, such operations can be "offloaded" by causing operations conventionally performed via POS application 116 (e.g., by the merchant 104, on the merchant device 102) to the customer application 118 (and customer device 106). In at least one example, to offload one or more operations, the POS application 116 can transmit transaction data, or a portion thereof, to the customer device 106 (e.g., the customer application 118 associated therewith) so that the POS application 116 and the customer application 118 are performing operations in association with a same transaction.

At operation 2602, the merchant component 120 can receive transaction data associated with a transaction between a customer and a merchant. As described above, in at least one example, the POS application 116 can generate a data structure for storing transaction data associated with the transaction. In some examples, the POS application 116 can send the data structure, or a duplicate thereof, to the merchant component 120. In at least one example, after the POS application 116 generates transaction data, the POS application 116 can send the transaction data to the merchant component 120 (e.g., so that the merchant component 120 can update the data structure associated with the transaction with the transaction data).

At operation 2604, the merchant component 120 can determine whether a customer device is proximate to a merchant device. In at least one example, the merchant component 120 can determine whether the customer device 106 is proximate to, or within a threshold distance of, the merchant device 102 via the techniques described above with reference to FIG. 2. If the merchant component 120 determines that the customer device 106 is not proximate to, or within the threshold distance of, the merchant device 102 and/or otherwise is not able to determine such (i.e., "no" at operation 2604), the process can proceed to operation 2606, below. If the merchant component 120 determines that the customer device 106 is proximate to, or within the threshold distance of, the merchant device 102 (i.e., "yes" at operation 2604), the process can proceed to operation 2610, below.

At operation 2606, the merchant component 120 can determine whether an identifier has been received. In at least one example, the merchant component 120 can receive an identifier from the POS application 116 (e.g., a customer identifier associated with the customer 108) and/or the customer application 118 (e.g., a merchant identifier associated with the merchant 104, a transaction identifier associated with the transaction, etc.). In some examples, the identifier can be encoded in a barcode, QR code, or the like, which can be scanned or read via a reader device on the merchant device 102 and/or the customer device 106. In some examples, the identifier can be input via a user interface and/or read via a reader device associated with the merchant device 102 and/or the customer device 106. Additional details are described above with reference to FIG. 2.

At operation 2608, the merchant component 120 can determine whether the identifier corresponds to a transaction. In at least one example, based at least in part on determining that an identifier has been received (i.e., "yes" at operation 2606), the merchant component 120 can use the identifier to identify the transaction for which transaction data is to be sent to the customer application 118 and can send transaction data, or a portion thereof, to the customer application 118, as illustrated at operation 2610. Additional details are described above with reference to FIG. 2.

As described above, the merchant component 120 can send the transaction data to the customer application 118 via the network(s) 112. Additional details are described above with reference to FIG. 2.

Based at least in part on sending the transaction data to the customer device 106, the process 2600 can continue at operation 2310 of FIG. 23, above.

At operation 2612, the merchant component 120 can refrain from sending the transaction data to the customer device. If the merchant component 120 determines that the customer device 106 is not proximate to, or within the threshold distance of, the merchant device 102 and/or otherwise is not able to determine such (i.e., "no" at operation 2604), the process can proceed to operation 2606 and either no identifier is received (i.e., "no" at operation 2606) or the identifier does not correspond to a transaction (i.e., "no" at operation 2608), the merchant component 120 can refrain from sending the transaction data to the customer device 106.

Figure 27:
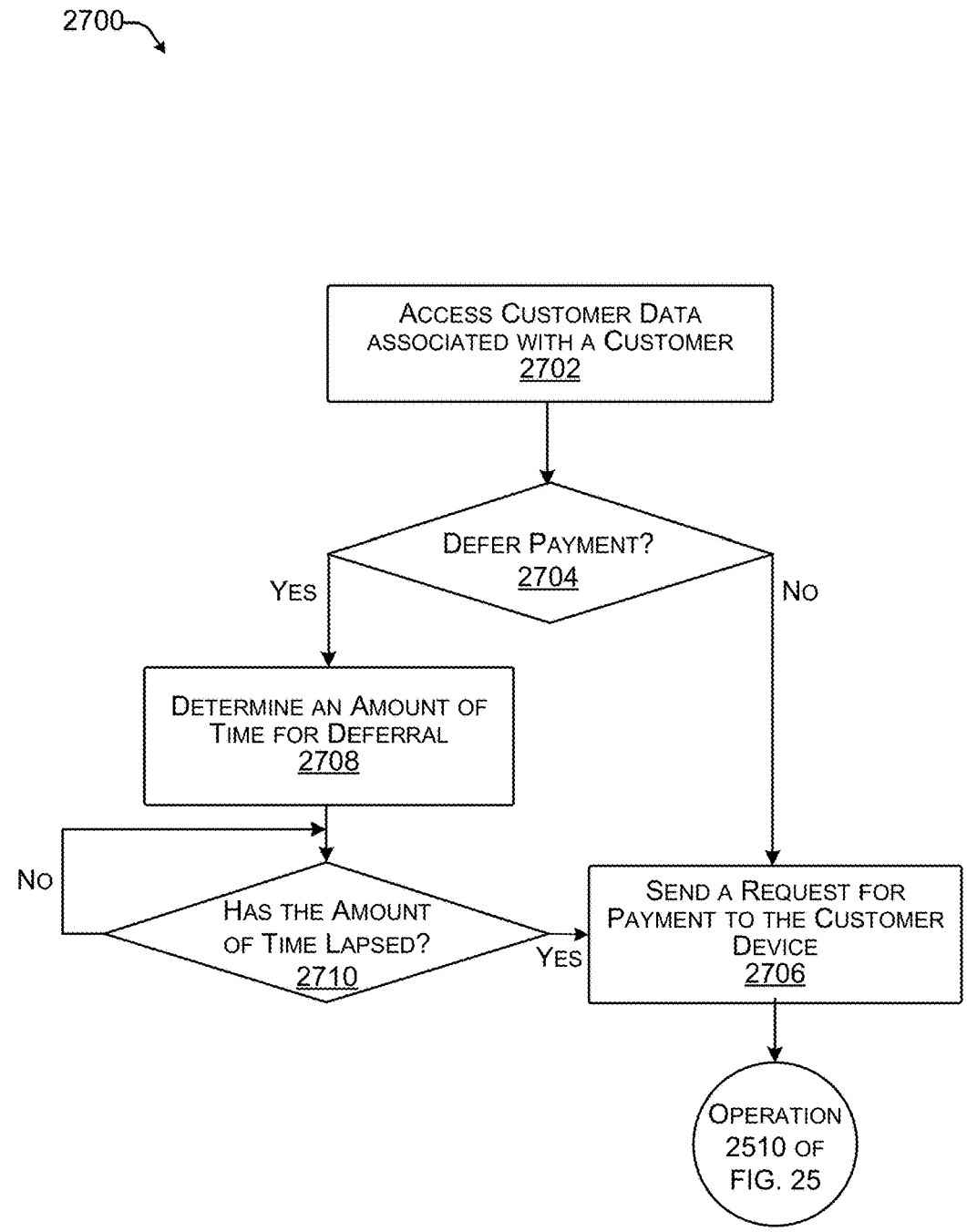
FIG. 27 illustrates an example process for determining an amount of time for which a payment can be deferred, as described herein.

FIG. 27 illustrates an example process 2700 for determining an amount of time for which a payment can be deferred, as described herein. As described above, in at least one example, the customer 108 can be either permitted to defer payment and/or requested to defer payment until a later time. In some examples, an amount of time associated with the deferred payment (i.e., how long after the transaction the customer 108 can defer payment before payment is due) can be determined based on a risk analysis of the customer 108.

At operation 2702, the merchant component 120 can access customer data associated with a customer. In at least one example, the merchant component 120 can access the data store(s) 124 and customer data 134 stored therein. As described above, the customer data 134 can store, or otherwise be associated with, customer data (e.g., name, phone number, email, address, birthdate, banking data, biometric data, identification data (e.g., driver's license information, passport information, etc.), customer identifier(s) (e.g., unique identifier, phone number, email, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), loyalty data (e.g., loyalty programs, loyalty numbers/identifiers, rewards earned, rewards redeemed, etc.), appointments data (e.g., previous appointments, upcoming (scheduled) appointments, timing of appointments, lengths of appointments, etc.), payroll data (e.g., employers, payroll frequency, payroll amounts, etc.), government benefit data (e.g., benefits, amounts of benefits, timing of receiving benefits, etc.), reservations data (e.g., previous reservations, upcoming (scheduled) reservations, reservation duration, interactions associated with such reservations, etc.), customer service data, etc.

At operation 2704, the merchant component 120 can determine whether a deferred payment option is available for the customer. In at least one example, the merchant component 120 can analyze the customer data 134 associated with the customer 108 to determine whether a deferred payment option is available for the customer 108 using machine-trained model(s), statistics, or other technique. In some examples, the machine-trained model(s) can output a risk score, or other indicator of risk, to indicate a level of risk associated with whether the customer 108 will remit payment (e.g., if permitted to defer payment). In at least one example, the merchant component 120 can compare the risk score to a threshold and can determine whether a deferred payment option is available for the customer. In some examples, if the risk score meets or exceeds a threshold, a deferred payment may not be permitted. However, if the risk score is below the threshold, a deferred payment may be permitted.

If a deferred payment is not permitted (i.e., "no" at operation 2704), the process 2700 can continue to operation 2706, described below.

At operation 2708, the merchant component 120 can determine an amount of time for deferral. In at least one example, based at least in part on determining that a deferred payment option is available (i.e., "yes" at operation 2704), the merchant component 120 can determine a length of time associated with the deferral based at least in part on the risk score. For example, a customer determined to be less risky may be permitted to remit payment at a time after a customer determined to be riskier. That is, in at least one example, a customer associated with a risk score below the threshold, or associated with a first range of risk scores, may be associated with a longer amount of time for deferring payment than a customer associated with a risk score that meets or exceeds the threshold, or is associated with a second range of risk scores. In some examples, the amount of time can be based on indications of when payroll payments are to be received and/or government benefits are to be received.

At operation 2710, the merchant component 120 can determine whether the amount of time has lapsed. In at least one example, based at least in part on determining that the amount of time has lapsed (e.g., using date information, time information, a timer, a calendar, etc.) (i.e., "yes" at operation 2710), the merchant component 120 can send a request for payment to the customer device, as illustrated at operation 2706. In at least one example, if the amount of time is not determined to have lapsed (i.e., "no" at operation 2710), the process 2700 can return to operation 2710 to again determine whether the amount of time has lapsed.

Based at least in part on sending the request to the customer device 106 at operation 2708, the process 2700 can proceed as described above at operation 2510 of FIG. 25.

Figure 28:
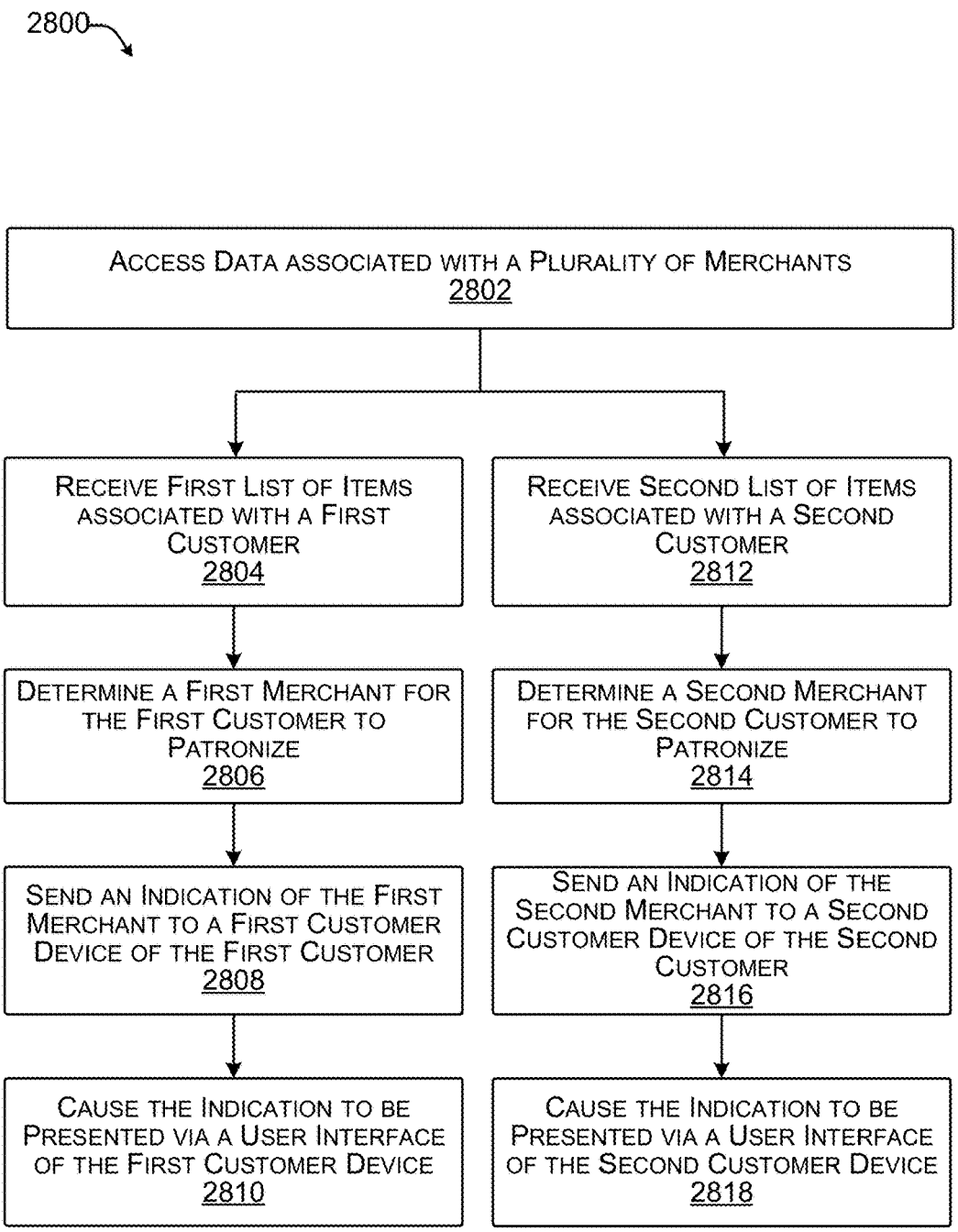
FIG. 28 illustrates an example process for determining how to distribute customers among merchants based at least in part on needs of the customers, as described herein.

FIG. 28 illustrates an example process 2800 for determining how to distribute customers among merchants based at least in part on needs of the customers, as described herein. As described above, techniques described herein can facilitate physical social distancing by intelligently recommending that a customer shop at a particular merchant (e.g., of the merchant ecosystem), based on the needs of the customer 108 (e.g., a list of items complied at least in part by the customer 108) and/or the inventory and/or in-store occupancy of the merchant 104. In some examples, techniques described herein can recommend times at which the customer should shop and/or facilitate a reservation for a particular time. That is, techniques described herein can leverage the merchant ecosystem for monitoring and/or reducing a number of people in a physical establishment at one time, in an effort to facilitate social distancing.

At operation 2802, the merchant component 120 can access data associated with a plurality of merchants. In at least one examples, individual of the plurality of merchants can operate merchant devices with instances of POS applications stored thereon, as described above with reference to the merchant device 102 and the POS application 116 in FIG. 1. In at least one example, the merchant component 120 can receive data indicative of occupancies of each of the physical establishments of the merchants, waiting times associated with each of the physical establishments of the merchants, etc. from the respective instances of the POS application. In some examples, such data can be stored in association with the merchant data 132. In some examples, the merchant component 120 can access the transaction data 128, which can be indicative of a level of busyness of each of the merchants, for example based on numbers of transactions processed and/or being processed, a rate at which transactions have been and/or are being processed, average amounts of transactions that have been and/or are being processed, end the like. Moreover, in some examples, the merchant component 120 can access the inventory data 130 to determine available inventories of each of the merchants.

In some examples, individual of the plurality of merchants can accept appointments or reservations for shopping at their physical establishments. In some examples, such appointments or reservations can be associated with indications of electronic calendars of the merchants, which can, in some examples, be publicly available and/or managed by the service provider (e.g., via an appointments service and/or a reservation service). In such examples, the merchant component 120 can access appointment data and/or reservation data associated with merchants offering such services.

At operation 2804, the merchant component 120 can receive a first list of items associated with a first customer. In at least one example, a first customer, such as the customer 108, can interact with a customer device, such as the customer device 106, to generate a list of one or more items that the first customer intends to purchase at a later time (e.g., at a brick-and-mortar store of a merchant). In at least one example, the list can be associated with a data structure comprising indications of the item(s) on the list.

At operation 2806, the merchant component 120 can determine a first merchant for the first customer to patronize. In at least one example, the merchant component 120 can analyze the data associated with the plurality of merchants and the first list of items to determine a first merchant for the first customer to patronize. In some examples, the merchant component 120 can additionally or alternatively access customer data 134, which can include customer preferences, for determining a first merchant to recommend to the first customer. In some examples, the merchant component 120 can determine the first merchant based on identifying, using the inventory data 130, a merchant that has each of the items on the first list of items. In some examples, the merchant component 120 can determine the first merchant based on identifying a merchant with a shortest waiting time and/or a waiting time below a threshold, a lowest occupancy and/or an occupancy below a threshold, a merchant with a lowest number of transactions that have been and/or are being processed and/or a number of transactions that have been and/or are being processed below a threshold, or the like. In some examples, the merchant component 120 can determine the first merchant based at least in part on a number of available appointments and/or reservations, availability at a preferred time of the first customer, or the like. In some examples, the merchant component 120 can utilize machine-trained model(s) to output a recommendation with respect to the first merchant. In such examples, the machine-trained model(s) can utilize the data associated with the plurality of merchants and the first list of items as inputs and can output recommendations associated with individual of the plurality of merchants. In some examples, the plurality of merchants can be ranked based at least in part on a score or other indicator, indicating which merchant is a best fit or best option for the first customer.

At operation 2808, the merchant component 120 can send an indication of the first merchant to a first customer device of the first customer. In at least one example, the merchant component 120 can send an indication of the first merchant to a first customer device of the first customer and the customer application associated therewith can cause the indication to be presented via a user interface of the first customer device, as illustrated at operation 2810. In some examples, the indication can include a time associated with an appointment or a reservation, or a recommended time to patronize the first merchant, which can be based on transaction data, sales trends determined therefrom, or the like.

In at least one example, the process 2800 described above with reference to operations 2804-2810 can be repeated for at least a second customer, which can be associated with a second list of items, as illustrated at operations 2812-2818. In at least one example, the first merchant and the second merchant can be different merchants. In some examples, the first merchant and the second merchant can be the same merchant. In examples where the first merchant and the second merchant are the same merchant, in some examples, the first customer and the second customer can be directed to same physical establishments or different physical establishments of the same merchant. In some examples, the first customer and the second customer can be provided the same or different times to patronize their respective merchants.

Figure 29:
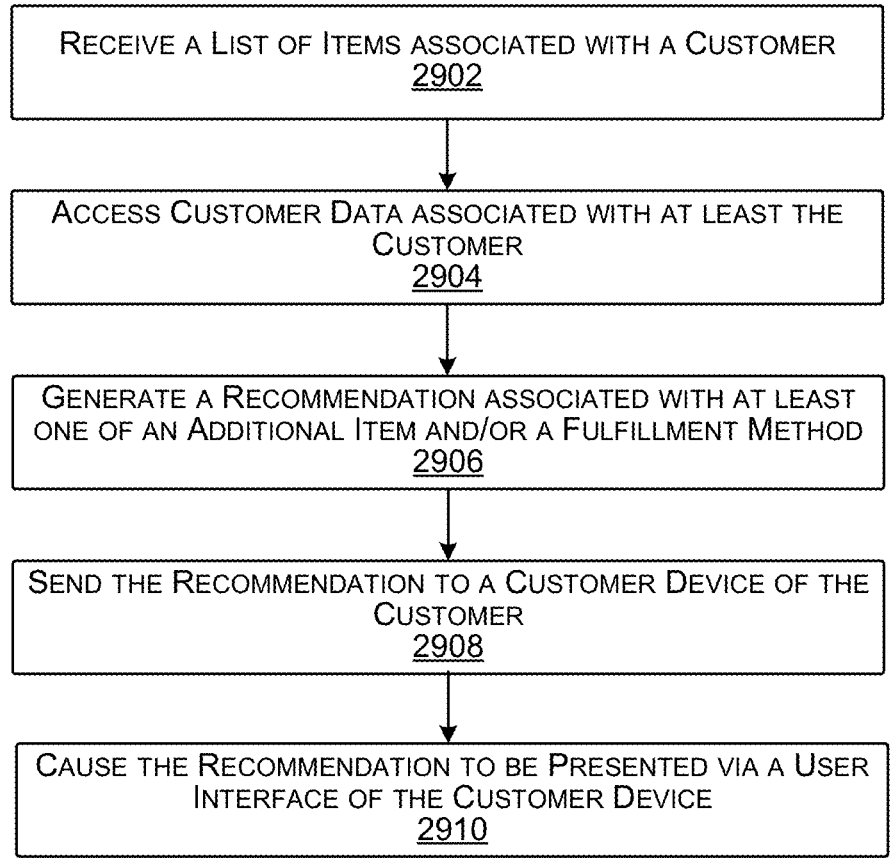
FIG. 29 illustrates an example process for determining and/or sending recommendations to customers, as described herein.

FIG. 29 illustrates an example process 2900 for determining and/or sending recommendations to customers, as described herein.

At operation 2902, the merchant component 120 can receive a list of items associated with a customer. In at least one example, a customer, such as the customer 108, can interact with a customer device, such as the customer device 106, to generate a list of one or more items that the first customer intends to purchase at a later time (e.g., at a brick-and-mortar store of a merchant). In at least one example, the list can be associated with a data structure comprising indications of the item(s) on the list.

At operation 2904, the merchant component 120 can access customer data associated with at least the customer. In at least one example, the merchant component 120 can access the data store(s) 124 and customer data 134 stored therein. As described above, the customer data 134 can store, or otherwise be associated with, customer data (e.g., name, phone number, email, address, birthdate, banking data, biometric data, identification data (e.g., driver's license information, passport information, etc.), customer identifier(s) (e.g., unique identifier, phone number, email, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), loyalty data (e.g., loyalty programs, loyalty numbers/identifiers, rewards earned, rewards redeemed, etc.), appointments data (e.g., previous appointments, upcoming (scheduled) appointments, timing of appointments, lengths of appointments, etc.), payroll data (e.g., employers, payroll frequency, payroll amounts, etc.), government benefit data (e.g., benefits, amounts of benefits, timing of receiving benefits, etc.), reservations data (e.g., previous reservations, upcoming (scheduled) reservations, reservation duration, interactions associated with such reservations, etc.), customer service data, etc.

At operation 2906, the merchant component 120 can generate a recommendation associated with at least one of an additional item and/or a fulfillment method. In some examples, the merchant component 120 can access the customer data 134 and can analyze the customer data 134 to determine one or more items to recommend adding to a list of the customer 108. In some examples, the merchant component 120 can utilize machine-trained model(s) to identify which item(s) to recommend to the customer 108. In some examples, such recommendations can be based on previous purchases of the customer 108, previous purchases of customers similar to the customer 108, and/or a general population of customers associated with the service provider. In some examples, customer preferences associated with the customer data 134 can be considered. In some examples, transaction data 128 and/or inventory data 130 can additionally or alternatively be used for determining item(s) to recommend adding to a list of the customer 108.

Further, in an additional or alternative example, the merchant component 120 can access the customer data 134 and can analyze the customer data 134 to determine one or more items to recommend for a first fulfillment option (e.g., in-store pick-up) instead of a second fulfillment option (e.g., in-store selection). In some examples, the merchant component 120 can utilize machine-trained model(s) to identify which item(s) to recommend to the customer 108 for the first fulfillment option. In some examples, such recommendations can be based on previous purchases of the customer 108, previous purchases of customers similar to the customer 108, and/or a general population of customers associated with the service provider. In some examples, customer preferences associated with the customer data 134 can be considered. In some examples, transaction data 128 and/or inventory data 130 can additionally or alternatively be used for determining item(s) to recommend associating with a particular fulfillment option.

At operation 2908, the merchant component 120 can send the recommendation to a customer device of the customer. In at least one example, the merchant component 120 can send a recommendation to the customer device 106 and the customer application 118 can present the recommendation via a user interface, as illustrated at operation 2930. In some examples, the recommendation can include item(s) to add to a list of items to be purchased. In some examples, the recommendation can include fulfillment options.

Figure 30:
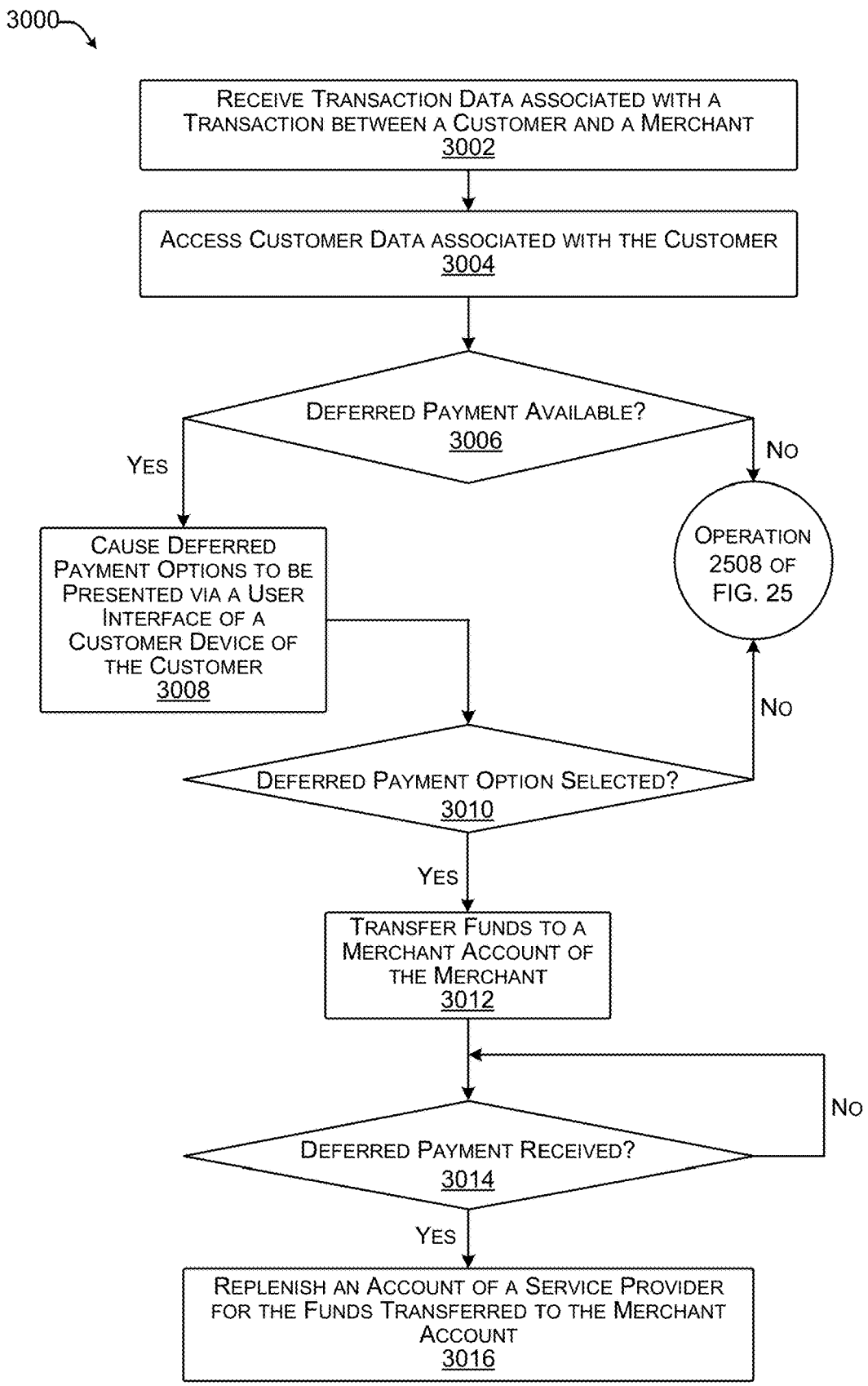
FIG. 30 illustrates an example process for processing deferred payment transactions, as described herein.

FIG. 30 illustrates an example process 3000 for processing deferred payment transactions, as described herein.

At operation 3002, the merchant component 120 can receive transaction data associated with a transaction between a customer and a merchant. As described above, in at least one example, the POS application 116 can generate a data structure for storing transaction data associated with the transaction. In some examples, the POS application 116 can send the data structure, or a duplicate thereof, to the merchant component 120. In at least one example, after the POS application 116 generates transaction data, the POS application 116 can send the transaction data to the merchant component 120 (e.g., so that the merchant component 120 can update the data structure associated with the transaction with the transaction data).

At operation 3004, the merchant component 120 can access customer data associated with the customer. In at least one example, the merchant component 120 can access the data store(s) 124 and customer data 134 stored therein. As described above, the customer data 134 can store, or otherwise be associated with, customer data (e.g., name, phone number, email, address, birthdate, banking data, biometric data, identification data (e.g., driver's license information, passport information, etc.), customer identifier(s) (e.g., unique identifier, phone number, email, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), loyalty data (e.g., loyalty programs, loyalty numbers/identifiers, rewards earned, rewards redeemed, etc.), appointments data (e.g., previous appointments, upcoming (scheduled) appointments, timing of appointments, lengths of appointments, etc.), payroll data (e.g., employers, payroll frequency, payroll amounts, etc.), government benefit data (e.g., benefits, amounts of benefits, timing of receiving benefits, etc.), reservations data (e.g., previous reservations, upcoming (scheduled) reservations, reservation duration, interactions associated with such reservations, etc.), customer service data, etc.

At operation 3006, the merchant component 120 can determine whether a deferred payment option is available for the customer. In at least one example, the merchant component 120 can analyze the customer data 134 associated with the customer 108 to determine whether a deferred payment option is available for the customer 108 using a machine-trained model, statistics, or other technique. In some examples, the machine-trained model can output a risk score, or other indicator of risk, to indicate a level of risk associated with whether the customer 108 will remit payment (e.g., if permitted to defer payment). In at least one example, the merchant component 120 can compare the risk score to a threshold and can determine whether a deferred payment option is available for the customer. In some examples, if the risk score meets or exceeds a threshold, a deferred payment may not be permitted. However, if the risk score is below the threshold, a deferred payment may be permitted. In some examples, the risk score can be used to determine one or more deferred payment option(s) are available for the customer 108, an amount of time associated with the deferred payment (e.g., how long the payment can be deferred), and/or terms associated with the deferred payment option(s).

If deferred payment options are not available for the customer 108 (i.e., "no" at operation 3006), the process 3000 can proceed as described at operation 2508 of FIG. 25.

At operation 3008, the merchant component 120 can cause deferred payment option(s) to be presented via a user interface of a customer device of the customer. In at least one example, if deferred payment option(s) are available for the customer 108 (i.e., "yes" at operation 3006), the merchant component 120 can cause the presentation of one or more deferred payment options, which, in some examples, can be particular to the customer 108, based on other customers similar to the customer 108, or available to each customer associated with the service provider. As described above, such deferred payment options can include credit, a loan, or an advance. In at least one example, the merchant component 120 can present the deferred payment option(s) responsive to an input from the customer 108 (e.g., via the customer device 106). In some examples, the merchant component 120 can present the deferred payment option(s) without an input from the customer 108.

At operation 3010, the merchant component 120 can determine whether a deferred payment option is selected. In at least one example, the merchant component 120 can receive an input indicating a payment option selected by the customer 108. For instance, the customer 108 can interact with a user interface presented via the customer application 118 to select a payment option and the customer application 118 can send such an indication to the merchant component 120. The merchant component 120 can receive the input and determine whether a deferred payment option is selected.

At operation 3012, the merchant component 120 can transfer funds to a merchant account of the merchant. In at least one example, if a deferred payment option is selected (i.e., "yes" at operation 3010), the service provider can pay the merchant 104 for the transaction at the point-of-sale even though the customer 108 is not remitting payment at the point-of-sale. In such an example, the merchant component 120 can transfer funds from an account of the service provider to an account of the merchant (e.g., which can be associated with the service provider). In at least one example, the funds can be equal to the total amount of the transaction less transaction processing fees charged by the service provider.

If a deferred payment option is not selected by the customer 108 (i.e., "no" at operation 3010), the process 3000 can proceed as described at operation 2508 of FIG. 25.

At operation 3014, the merchant component 120 can determine whether payment is received. In at least one example, the payment processing component 122 can monitor incoming data to determine whether payment data has been received. The payment processing component 122 can receive payment data via any of the mechanisms described above with reference to FIG. 8. In at least one example, based at least in part on the payment processing component 122 receiving the payment data (i.e., "yes" at operation 3014), the payment processing component 122 can process the payment data as described above, and in some examples, the merchant component 120 can replenish an account of a service provider for the funds transferred to the merchant account, as illustrated at operation 3016. That is, in such an example, the merchant component 120 can receive an indication of new funds received from the customer 108 and can transfer the funds to the account of the service provider instead of the account of the merchant 104 (e.g., because the merchant 104 has already been paid by the service provider).

In at least one example, if the payment processing component 122 has not yet received the payment data (i.e., "no" at operation 3014), the payment processing component 122 can continue to monitor incoming payment data to determine whether payment for the deferred payment has been received.

Figure 31:
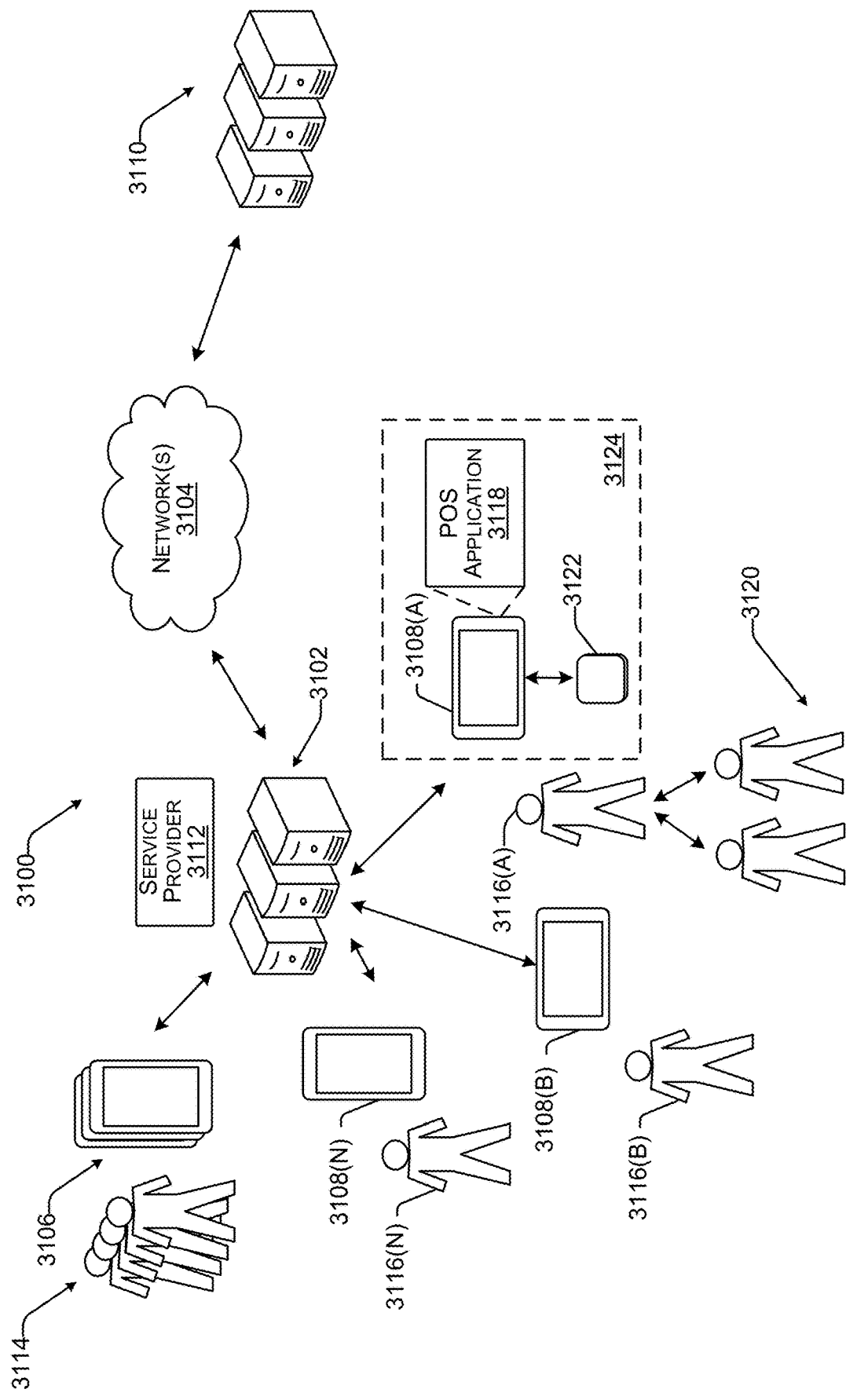
FIG. 31 illustrates an example merchant ecosystem for facilitating, among other things, techniques described herein.

FIG. 31 illustrates an example environment 3100. The environment 3100 includes server computing device(s) 3102 that can communicate over network(s) 3104 with user devices 3106 (which, in some examples can be merchant devices 3108 (individually, 3108(A)-3108(N))) and/or server computing device(s) 3110 associated with third-party service provider(s). The server computing device(s) 3102 can be associated with a service provider 3112 that can provide one or more services for the benefit of users 3114, as described below. Actions attributed to the service provider 3112 can be performed by the server computing device(s) 3102.

In at least one example, the server computing device(s) 3102 correspond to the server(s) 110, the merchant device 102 and/or the customer device 106 can correspond to individual of the user devices 3106, the network(s) 112 can correspond to the network(s) 3104, and the third-party server(s) 114 can correspond to the server computing device(s) 3110 associated with third-party service provider(s).

The environment 3100 can include a plurality of user devices 3106, as described above. Each one of the plurality of user devices 3106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 3114. The users 3114 can be referred to as customers, buyers, merchants, sellers, borrowers, employees, employers, payors, payees, couriers and so on. The users 3114 can interact with the user devices 3106 via user interfaces presented via the user devices 3106. In at least one example, a user interface can be presented via a web browser, or the like. In other examples, a user interface can be presented via an application, such as a mobile application or desktop application, which can be provided by the service provider 3321 or which can be an otherwise dedicated application. The POS application 116 and the customer application 118 are examples of such an application. In some examples, individual of the user devices 3106 can have an instance or versioned instance of an application, which can be downloaded from an application store, for example, which can present the user interface(s) described herein. In at least one example, a user 3114 can interact with the user interface via touch input, spoken input, or any other type of input.

As described above, in at least one example, the users 3114 can include merchants 3116 (individually, 3116(A)-3116(N)). In an example, the merchants 3116 can operate respective merchant devices 3108, which can be user devices 3106 configured for use by merchants 3116. For the purpose of this discussion, a "merchant" can be any entity that offers items (e.g., goods or services) for purchase or other means of acquisition (e.g., rent, borrow, barter, etc.). The merchant 104 can correspond to one of the merchants 3116. The merchants 3116 can offer items for purchase or other means of acquisition via brick-and-mortar stores, mobile stores (e.g., pop-up shops, food trucks, etc.), online stores, combinations of the foregoing, and so forth. In some examples, at least some of the merchants 3116 can be associated with a same entity but can have different merchant locations and/or can have franchise/franchisee relationships. In additional or alternative examples, the merchants 3116 can be different merchants. That is, in at least one example, the merchant 3116(A) is a different merchant than the merchant 3116(B) and/or the merchant 3116(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 3108 can have an instance of a POS application 3118 stored thereon. The POS application 3118 can configure the merchant device 3108 as a POS terminal, which enables the merchant 3116(A) to interact with one or more customers 3120. As described above, the users 3114 can include customers, such as the customers 3120 shown as interacting with the merchant 3116(A). For the purpose of this discussion, a "customer" can be any entity that acquires items from merchants. While only two customers 3120 are illustrated in FIG. 31, any number of customers 3120 can interact with the merchants 3116. The customer 108 can be an example of one of the customers 3120. Further, while FIG. 31 illustrates the customers 3120 interacting with the merchant 3116(A), the customers 3120 can interact with any of the merchants 3116.

In at least one example, interactions between the customers 3120 and the merchants 3116 that involve the exchange of funds (from the customers 3120) for items (from the merchants 3116) can be referred to as "POS transactions" and/or "transactions." In at least one example, the POS application 3118 can determine transaction data associated with the POS transactions. Transaction data can include payment information, which can be obtained from a reader device 3122 associated with the merchant device 3108(A), user authentication data, purchase amount information, point-of-purchase information (e.g., item(s) purchased, date of purchase, time of purchase, etc.), etc. The POS application 3118 can send transaction data to the server computing device(s) 3102. Furthermore, the POS application 3118 can present a UI to enable the merchant 3116(A) to interact with the POS application 3118 and/or the service provider 3321 via the POS application 3118.

In at least one example, the merchant device 3108(A) can be a special-purpose computing device configured as a POS terminal (via the execution of the POS application 3118). In at least one example, the POS terminal may be connected to a reader device 3122, which is capable of accepting a variety of payment instruments, such as credit cards, debit cards, gift cards, short-range communication-based payment instruments, and the like, as described below. In at least one example, the reader device 3122 can plug in to a port in the merchant device 3108(A), such as a microphone port, a headphone port, an audio-jack, a data port, or other suitable port. In additional or alternative examples, the reader device 3122 can be coupled to the merchant device 3108(A) via another wired or wireless connection, such as via a Bluetooth®, BLE, and so on. Additional details are described below with reference to FIG. 32. In some examples, the reader device 3122 can read information from alternative payment instruments including, but not limited to, wristbands and the like.

In some examples, the reader device 3122 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 3122, and communicate with the server computing device(s) 3102, which can provide, among other services, a payment processing service. The server computing device(s) 3102 associated with the service provider 3321 can communicate with server computing device(s) 3110, as described below. In this manner, the POS terminal and reader device 3122 may collectively process transaction(s) between the merchants 3116 and customers 3120. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 3122 of the POS system 3124 are shown as separate devices, in additional or alternative examples, the POS terminal and the reader device 3122 can be part of a single device. In some examples, the reader device 3122 can have a display integrated therein for presenting information to the customers 3120. In additional or alternative examples, the POS terminal can have a display integrated therein for presenting information to the customers 3120. POS systems, such as the POS system 3124, may be mobile, such that POS terminals and reader devices may process transactions in disparate locations across the world. POS systems can be used for processing card-present transactions and card-not-present (CNP) transactions, as described below.

A card-present transaction is a transaction where both a customer 3120 and his or her payment instrument are physically present at the time of the transaction. Card-present transactions may be processed by swipes, dips, taps, or any other interaction between a physical payment instrument (e.g., a card), or otherwise present payment instrument, and a reader device 3122 whereby the reader device 3122 is able to obtain payment data from the payment instrument. A swipe is a card-present transaction where a customer 3120 slides a card, or other payment instrument, having a magnetic strip through a reader device 3122 that captures payment data contained in the magnetic strip. A dip is a card-present transaction where a customer 3120 inserts a payment instrument having an embedded microchip (i.e., chip) into a reader device 3122 first. The dipped payment instrument remains in the payment reader until the reader device 3122 prompts the customer 3120 to remove the card, or other payment instrument. While the payment instrument is in the reader device 3122, the microchip can create a one-time code which is sent from the POS system 3124 to the server computing device(s) 3110 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 3120 may tap or hover his or her payment instrument (e.g., card, electronic device such as a smart phone running a payment application, etc.) over a reader device 3122 to complete a transaction via short-range communication (e.g., NFC, RFID, Bluetooth®, BLE, etc.). Short-range communication enables the payment instrument to exchange information with the reader device 3122. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 3124, the server computing device(s) 3102, and/or the server computing device(s) 3110 may exchange payment information and transaction data to determine whether payments for transactions are authorized. For example, the POS system 3124 may provide encrypted payment data, user authentication data, purchase amount information, point-of-purchase information, etc. (collectively, transaction data) to server computing device(s) 3102 over the network(s) 3104. The server computing device(s) 3102 may send the transaction data to the server computing device(s) 3110. As described above, in at least one example, the server computing device(s) 3110 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 3110 associated therewith) can send a fund transfer request to a server computing device of a card payment network (e.g., Mastercard®, VISA®, etc.) to determine whether the transaction is authorized or deficient. In at least one example, the service provider 3321 can serve as an acquirer and connect directly with the card payment network.

The card payment network (e.g., the server computing device(s) 3110 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 3110 associated therewith) can make a determination as to whether the customer has the capacity to absorb the relevant charge associated with the payment transaction. In at least one example, the service provider 3321 can serve as an issuer and/or can partner with an issuer. The transaction is either approved or rejected by the issuer and/or the card payment network (e.g., the server computing device(s) 3110 associated therewith), and a payment authorization message is communicated from the issuer to the POS device via a path opposite of that described above, or via an alternate path.

As described above, the server computing device(s) 3110, which can be associated with payment service provider(s), may determine whether a payment is authorized based on corresponding transaction data, as well as information relating to parties to the transaction (e.g., the customer 3120 and/or the merchant 3116(A)). The server computing device(s) 3110 may send an authorization notification over the network(s) 3104 to the server computing device(s) 3102, which may send the authorization notification to the POS system 3124 over the network(s) 3104 to indicate whether the payment is authorized. The server computing device(s) 3102 may also transmit additional information such as transaction identifiers to the POS system 3124. In one example, the server computing device(s) 3102 may include a merchant application and/or other functional components for communicating with the POS system 3124 and/or the server computing device(s) 3110 to authorize or decline payments for transactions.

Based on the authentication notification that is received by the POS system 3124 from server computing device(s) 3102, the merchant 3116(A) may indicate to the customer 3120 whether the transaction has been approved. In some examples, approval may be indicated at the POS system 3124, for example, at a display of the POS system 3124. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 3321 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 3114 can access all of the services of the service provider 3321. In other examples, the users 3114 can have gradated access to the services, which can be based on risk tolerance, IDV outputs, subscriptions, and so on. In at least one example, access to such services can be availed to the merchants 3116 via the POS application 3118. In additional or alternative examples, each service can be associated with its own access point (e.g., application, web browser, etc.).

The service provider 3321 can offer payment processing services for processing payments on behalf of the merchants 3116, as described above. For example, the service provider 3321 can provision payment processing software, payment processing hardware and/or payment processing services to merchants 3116, as described above, to enable the merchants 3116 to receive payments from the customers 3120 when conducting POS transactions with the customers 3120. For instance, the service provider 3321 can enable the merchants 3116 to receive cash payments, payment card payments, and/or electronic payments from customers 3120 for POS transactions and the service provider 3321 can process transactions on behalf of the merchants 3116.

As the service provider 3321 processes transactions on behalf of the merchants 3116, the service provider 3321 can maintain accounts or balances for the merchants 3116 in one or more ledgers. For example, the service provider 3321 can analyze transaction data received for a transaction to determine an amount of funds owed to a merchant 3116(A) for the transaction. In at least one example, such an amount can be a total purchase price less fees charged by the service provider 3321 for providing the payment processing services. Based on determining the amount of funds owed to the merchant 3116(A), the service provider 3321 can deposit funds into an account of the merchant 3116(A). The account can have a stored balance, which can be managed by the service provider 3321. The account can be different from a conventional bank account at least because the stored balance is managed by a ledger of the service provider 3321 and the associated funds are accessible via various withdrawal channels including, but not limited to, scheduled deposit, same-day deposit, instant deposit, and a linked payment instrument.

A scheduled deposit can occur when the service provider 3321 transfers funds associated with a stored balance of the merchant 3116(A) to a bank account of the merchant 3116(A) that is held at a bank or other financial institution (e.g., associated with the server computing device(s) 3110). Scheduled deposits can occur at a prearranged time after a POS transaction is funded, which can be a business day after the POS transaction occurred, or sooner or later. In some examples, the merchant 3116(A) can access funds prior to a scheduled deposit. For instance, the merchant 3116(A) may have access to same-day deposits (e.g., wherein the service provider 3321 deposits funds from the stored balance to a linked bank account of the merchant on a same day as POS transaction, in some examples prior to the POS transaction being funded) or instant deposits (e.g., wherein the service provider 3321 deposits funds from the stored balance to a linked bank account of the merchant on demand, such as responsive to a request). Further, in at least one example, the merchant 3116(A) can have a payment instrument that is linked to the stored balance that enables the merchant to access the funds without first transferring the funds from the account managed by the service provider 3321 to the bank account of the merchant 3116(A).

In at least one example, the service provider 3321 may provide inventory management services. That is, the service provider 3321 may provide inventory tracking and reporting. Inventory management services may enable the merchant 3116(A) to access and manage a database storing data associated with a quantity of each item that the merchant 3116(A) has available (i.e., an inventory). Furthermore, in at least one example, the service provider 3321 can provide catalog management services to enable the merchant 3116(A) to maintain a catalog, which can be a database storing data associated with items that the merchant 3116(A) has available for acquisition (i.e., catalog management services). In at least one example, the catalog may include a plurality of data items and a data item of the plurality of data items may represent an item that the merchant 3116(A) has available for acquisition. The service provider 3321 can offer recommendations related to pricing of the items, placement of items on the catalog, and multi-party fulfilment of the inventory.

In at least one example, the service provider 3321 can provide business banking services, which allow the merchant 3116(A) to track deposits (from payment processing and/or other sources of funds) into an account of the merchant 3116(A), payroll payments from the account (e.g., payments to employees of the merchant 3116(A)), payments to other merchants (e.g., business-to-business) directly from the account or from a linked debit card, withdrawals made via scheduled deposit and/or instant deposit, etc. Furthermore, the business banking services can enable the merchant 3116(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 3116 to visualize their cash flow to track their financial health, set aside money for upcoming obligations (e.g., savings), organize money around goals, etc.

In at least one example, the service provider 3321 can provide financing services and products, such as via business loans, consumer loans, fixed term loans, flexible term loans, and the like. In at least one example, the service provider 3321 can utilize one or more risk signals to determine whether to extend financing offers and/or terms associated with such financing offers.

In at least one example, the service provider 3112 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 3112 can offer different types of capital loan products. For instance, in at least one example, the service provider 3112 can offer a daily repayment loan product, wherein a capital loan is repaid daily, for instance, from a portion of transactions processed by the payment processing service on behalf of the borrower. Additionally and/or alternatively, the service provider 3112 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 3112 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 3116. The service provider 3112 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 3112 (e.g., from payments owed to the merchant from payments processed on behalf of the merchant, funds transferred to the merchant, etc.). The service provider 3112 can offer specific financial products, such as payment instruments, tied specifically to the loan products. For example, in one implementation, the server provider 3112 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 3112 can provide web-development services, which enable users 3114 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 3116. In at least one example, the service provider 3112 can recommend and/or generate content items to supplement omni-channel presences of the merchants 3116. That is, if a merchant of the merchants 3116 has a web page, the service provider 3112—via the web-development or other services—can recommend and/or generate additional content items to be presented via other channel(s), such as social media, email, etc.

Furthermore, the service provider 3112 can provide payroll services to enable employers to pay employees for work performed on behalf of employers. In at least one example, the service provider 3112 can receive data that includes time worked by an employee (e.g., through imported timecards and/or POS interactions), sales made by the employee, gratuities received by the employee, and so forth. Based on such data, the service provider 3112 can make payroll payments to employee(s) on behalf of an employer via the payroll service. For instance, the service provider 3112 can facilitate the transfer of a total amount to be paid out for the payroll of an employee from the bank of the employer to the bank of the service provider 3112 to be used to make payroll payments. In at least one example, when the funds have been received at the bank of the service provider 3112, the service provider 3112 can pay the employee, such as by check or direct deposit, often a day, a week, or more after when the work was actually performed by the employee. In additional or alternative examples, the service provider 3112 can enable employee(s) to receive payments via same-day or instant deposit based at least in part on risk and/or reliability analyses performed by the service provider 3112.

Moreover, in at least one example, the service provider 3112 can provide employee management services for managing schedules of employees. Further, the service provider 3112 can provide appointment services for enabling users 3114 to set schedules for scheduling appointments and/or users 3114 to schedule appointments.

In some examples, the service provider 3112 can provide restaurant management services to enable users 3114 to make and/or manage reservations, to monitor front-of-house and/or back-of-house operations, and so on. In such examples, the merchant device(s) 3108 and/or server computing device(s) 3102 can be configured to communicate with one or more other computing devices, which can be located in the front-of-house (e.g., POS device(s)) and/or back-of-house (e.g., kitchen display system(s) (KDS)). In at least one example, the service provider 3112 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 3112 can provide fulfilment services, which can use couriers for delivery, wherein couriers can travel between multiple locations to provide delivery services, photography services, etc. Couriers can be users 3114 who can travel between locations to perform services for a requesting user 3114 (e.g., deliver items, capture images, etc.). In some examples, the courier can receive compensation from the service provider 3112. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 3112 can receive requests for courier services, automatically assign the requests to active couriers, and communicate dispatch instructions to couriers via user interface (e.g., application, web browser, or other access point) presented via respective user devices 3106.

In some examples, the service provider 3112 can provide omni-channel fulfillment services. For instance, if a customer places an order with a merchant and the merchant cannot fulfill the order because one or more items are out of stock or otherwise unavailable, the service provider 3112 can leverage other merchants and/or sales channels that are part of the platform of the service provider 3112 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 3112 can enable conversational commerce via conversational commerce services, which can use one or more machine learning mechanisms to analyze messages exchanged between two or more users 3114, voice inputs into a virtual assistant or the like, to determine intents of user(s) 3114. In some examples, the service provider 3112 can utilize determined intents to automate customer service, offer promotions, provide recommendations, or otherwise interact with customers in real-time. In at least one example, the service provider 3112 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 3112 can provide a peer-to-peer payment service that enables peer-to-peer payments between two or more users 3114. In at least one example, the service provider 3112 can communicate with instances of a payment application (or other access point) installed on user devices 3106 configured for operation by users 3114. In an example, an instance of the payment application executing on a first device operated by a payor can send a request to the service provider 3112 to transfer an amount of funds (e.g., fiat currency or non-fiat currency such as cryptocurrency, securities, and related assets) from an account of the payor to an account of a payee (e.g., a peer-to-peer payment). The service provider 3112 can facilitate the transfer and can send a notification to an instance of the payment application executing on a second mobile device operated by the payee that the transfer is in process (or has been completed). In some examples, the service provider 3112 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 3112 funds the request to payee on behalf of the payor, to speed up the transfer process and compensate for any lags that may be attributed to payor's financial network.

In some implementations, the service provider 3112 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 3106.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 3112. For instance, the service provider 3112 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 3106 (e.g., mobile device or conventional personal computer (PC)) based on instructions transmitted to and from the server computing device(s) 3102 (which, in such an example can be called a "messaging server"). In some instances, the messaging application can include a payment application with messaging capability that enables users of the payment application to communicate with one another. In such instances, the payment application can be executed on the user device 3106 based on instructions transmitted to and from the server computing device(s) 3102 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 3112 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 3114 may be new to the service provider 3112 such that the user 3114 that has not registered (e.g., subscribed to receive access to one or more services offered by the service provider) with the service provider 3112. The service provider 3112 can offer onboarding services for registering a potential user 3114 with the service provider 3112. In some examples, onboarding can involve presenting various questions, prompts, and the like to a potential user 3114 to obtain information that can be used to generate a profile for the potential user 3114. In at least one example, the service provider 3112 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 3114 providing all necessary information, the potential user 3114 can be onboarded to the service provider 3112. In such an example, any limited or short-term access to services of the service provider 3112 can be transitioned to more permissive (e.g., less limited) or longer-term access to such services.

The service provider 3112 can be associated with IDV services, which can be used by the service provider 3112 for compliance purposes and/or can be offered as a service, for instance to third-party service providers (e.g., associated with the server computing device(s) 3110). That is, the service provider 3112 can offer IDV services to verify the identity of users 3114 seeking to use or using their services. Identity verification requires a customer (or potential customer) to provide information that is used by compliance departments to prove that the information is associated with an identity of a real person or entity. In at least one example, the service provider 3112 can perform services for determining whether identifying information provided by a user 3114 accurately identifies the customer (or potential customer) (i.e., Is the customer who they say they are?).

The service provider 3112 is capable of providing additional or alternative services and the services described above are offered as a sampling of services. In at least one example, the service provider 3112 can exchange data with the server computing device(s) 3110 associated with third-party service providers. Such third-party service providers can provide information that enables the service provider 3112 to provide services, such as those described above. In additional or alternative examples, such third-party service providers can access services of the service provider 3112. That is, in some examples, the third-party service providers can be subscribers, or otherwise access, services of the service provider 3112.

Techniques described herein can be configured to operate in both real-time/online and offline modes. "Online" modes refer to modes when devices are capable of communicating with the service provider 3112 (e.g., the server computing device(s) 3102) and/or the server computing device(s) 3110 via the network(s) 3104. In some examples, the merchant device(s) 3108 are not capable of connecting with the service provider 3112 (e.g., the server computing device(s) 3102) and/or the server computing device(s) 3110, due to a network connectivity issue, for example. In additional or alternative examples, the server computing device(s) 3102 are not capable of communicating with the server computing device(s) 3110 due to network connectivity issue, for example. In such examples, devices may operate in "offline" mode where at least some payment data is stored (e.g., on the merchant device(s) 3108) and/or the server computing device(s) 3102 until connectivity is restored and the payment data can be transmitted to the server computing device(s) 3102 and/or the server computing device(s) 3110 for processing.

In at least one example, the service provider 3112 can be associated with a hub, such as an order hub, an inventory hub, a fulfillment hub and so on, which can enable integration with one or more additional service providers (e.g., associated with the additional server computing device(s) 3110). In some examples, such additional service providers can offer additional or alternative services and the service provider 3112 can provide an interface or other computer-readable instructions to integrate functionality of the service provider 3112 into the one or more additional service providers.

Techniques described herein are directed to services provided via a distributed system of user devices 3106 that are in communication with one or more server computing devices 3102 of the service provider 3112. That is, techniques described herein are directed to a specific implementation—or, a practical application—of utilizing a distributed system of user devices 3106 that are in communication with one or more server computing devices 3102 of the service provider 3112 to perform a variety of services, as described above. The unconventional configuration of the distributed system described herein enables the server computing device(s) 3102 that are remotely-located from end-users (e.g., users 3114) to intelligently offer services based on aggregated data associated with the end-users, such as the users 3114 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 3112, and those outside of the control of the service provider 3112, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 3114 and user devices 3106. Furthermore, such features are changed dynamically based on the profiles of the users involved interacting with the GUIs. As such, techniques described herein are directed to improvements to computing systems.

Figure 32:
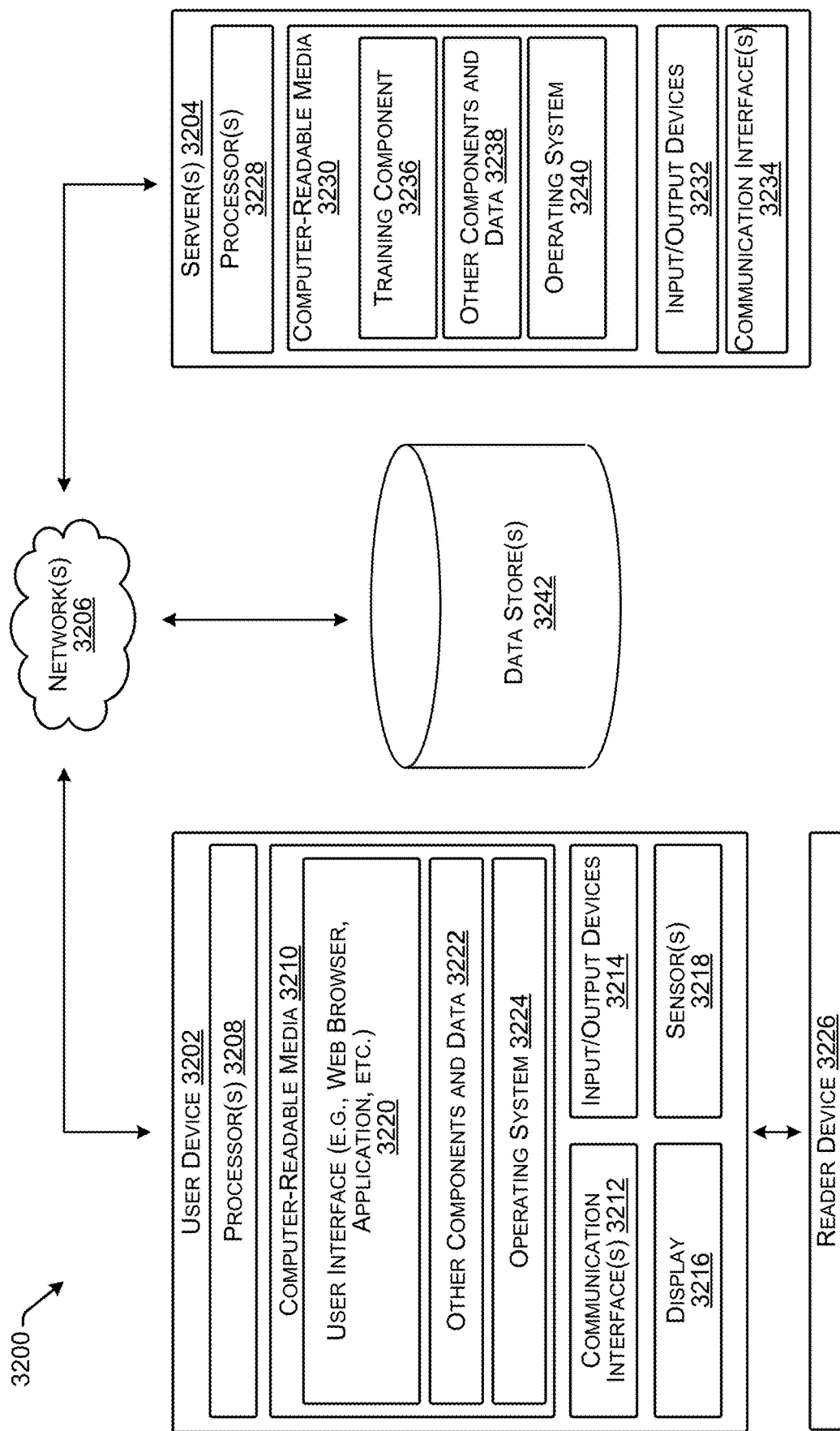
FIG. 32 illustrates additional details associated with individual components of the merchant ecosystem described above in FIG. 31.

FIG. 32 depicts an illustrative block diagram illustrating a system 3200 for performing techniques described herein. The system 3200 includes a user device 3202, that communicates with server computing device(s) (e.g., server(s) 3204) via network(s) 3206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 3202 is illustrated, in additional or alternate examples, the system 3200 can have multiple user devices, as described above with reference to FIG. 31.

In at least one example, the server(s) 3204 correspond to the server(s) 110, the merchant device 102 and/or the customer device 106 can correspond to the user device 3202, the network(s) 112 can correspond to the network(s) 3206.

In at least one example, the user device 3202 can be any suitable type of computing device, e.g., portable, semi-portable, semi-stationary, or stationary. Some examples of the user device 3202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 3202 can be any computing device capable of sending communications and performing the functions according to the techniques described herein. The user device 3202 can include devices, e.g., payment card readers, or components capable of accepting payments, as described below.

In the illustrated example, the user device 3202 includes one or more processors 3208, one or more computer-readable media 3210, one or more communication interface(s) 3231, one or more input/output (I/O) devices 3214, a display 3216, and sensor(s) 3218.

In at least one example, each processor 3208 can itself comprise one or more processors or processing cores. For example, the processor(s) 3208 can be implemented as one or more microprocessors, microcomputers, microcontrollers, digital signal processors, central processing units, state machines, logic circuitries, and/or any devices that manipulate signals based on operational instructions. In some examples, the processor(s) 3208 can be one or more hardware processors and/or logic circuits of any suitable type specifically programmed or configured to execute the algorithms and processes described herein. The processor(s) 3208 can be configured to fetch and execute computer-readable processor-executable instructions stored in the computer-readable media 3210.

Depending on the configuration of the user device 3202, the computer-readable media 3210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 3210 can include, but is not limited to, RAM, ROM, EEPROM, flash memory, solid-state storage, magnetic disk storage, optical storage, and/or other computer-readable media technology. Further, in some examples, the user device 3202 can access external storage, such as RAID storage systems, storage arrays, network attached storage, storage area networks, cloud storage, or any other medium that can be used to store information and that can be accessed by the processor(s) 3208 directly or through another computing device or network. Accordingly, the computer-readable media 3210 can be computer storage media able to store instructions, components or components that can be executed by the processor(s) 3208. Further, when mentioned, non-transitory computer-readable media exclude media such as energy, carrier signals, electromagnetic waves, and signals per se.

The computer-readable media 3210 can be used to store and maintain any number of functional components that are executable by the processor(s) 3208. In some implementations, these functional components comprise instructions or programs that are executable by the processor(s) 3208 and that, when executed, implement operational logic for performing the actions and services attributed above to the user device 3202. Functional components stored in the computer-readable media 3210 can include a user interface 3220 to enable users to interact with the user device 3202, and thus the server(s) 3204 and/or other networked devices. In at least one example, the user interface 3220 can be presented via a web browser, or the like. In other examples, the user interface 3220 can be presented via an application, such as a mobile application or desktop application, which can be provided by a service provider 3112 associated with the server(s) 3204, or which can be an otherwise dedicated application. In some examples, the user interface 3220 can be presented via the POS application 116 or the customer application 118, as described above. Non-limiting examples of GUIs that can be presented via the user interface 3220 are also described above. In at least one example, a user can interact with the user interface via touch input, spoken input, gesture, or any other type of input. The word "input" is also used to describe "contextual" input that may not be directly provided by the user via the user interface 3220. For example, user's interactions with the user interface 3220 are analyzed using, e.g., natural language processing techniques, to determine context or intent of the user, which may be treated in a manner similar to "direct" user input.

Depending on the type of the user device 3202, the computer-readable media 3210 can also optionally include other functional components and data, such as other components and data 3222, which can include programs, drivers, etc., and the data used or generated by the functional components. In addition, the computer-readable media 3210 can also store data, data structures and the like, that are used by the functional components. Further, the user device 3202 can include many other logical, programmatic and physical components, of which those described are merely examples that are related to the discussion herein.

In at least one example, the computer-readable media 3210 can include additional functional components, such as an operating system 3224 for controlling and managing various functions of the user device 3202 and for enabling basic user interactions.

The communication interface(s) 3231 can include one or more interfaces and hardware components for enabling communication with various other devices, such as over the network(s) 3206 or directly. For example, communication interface(s) 3231 can enable communication through one or more network(s) 3206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 3206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 3202 can further include one or more input/output (I/O) devices 3214. The I/O devices 3214 can include speakers, a microphone, a camera, and various user controls (e.g., buttons, a joystick, a keyboard, a keypad, etc.), a haptic output device, and so forth. The I/O devices 3214 can also include attachments that leverage the accessories (audio-jack, USB-C, Bluetooth, etc.) to connect with the user device 3202.

In at least one example, user device 3202 can include a display 3216. Depending on the type of computing device(s) used as the user device 3202, the display 3216 can employ any suitable display technology. For example, the display 3216 can be a liquid crystal display, a plasma display, a light emitting diode display, an OLED (organic light-emitting diode) display, an electronic paper display, or any other suitable type of display able to present digital content thereon. In at least one example, the display 3216 can be an augmented reality display, a virtually reality display, or any other display able to present and/or project digital content. In some examples, the display 3216 can have a touch sensor associated with the display 3216 to provide a touchscreen display configured to receive touch inputs for enabling interaction with a graphic interface presented on the display 3216. Accordingly, implementations herein are not limited to any particular display technology. Alternatively, in some examples, the user device 3202 may not include the display 3216, and information can be presented by other means, such as aurally, haptically, etc.

In addition, the user device 3202 can include sensor(s) 3218. The sensor(s) 3218 can include a GPS device able to indicate location information. Further, the sensor(s) 3218 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 3112, described above, to provide one or more services. That is, in some examples, the service provider 3112 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 3114 and/or for sending users 3114 notifications regarding available appointments with merchant(s) located proximate to the users 3114. In at least one example, location can be used for taking payments from nearby customers when they leave a geofence, or location can be used to initiate an action responsive to users 3114 enter a brick-and-mortar store of a merchant. Location can be used in additional or alternative ways as well.

Additionally, the user device 3202 can include various other components that are not shown, examples of which include removable storage, a power source, such as a battery and power control unit, a barcode scanner, a printer, a cash drawer, and so forth.

In addition, in some examples, the user device 3202 can include, be connectable to, or otherwise be coupled to a reader device 3226, for reading payment instruments and/or identifiers associated with payment objects. In some examples, as described above, the reader device 3226 can plug in to a port in the user device 3202, such as a microphone port, a headphone port, an audio-jack, a data port, or other suitable port. In additional or alternative examples, the reader device 3226 can be coupled to the user device 3202 via another wired or wireless connection, such as via a Bluetooth®, BLE, and so on. The reader device 3226 can include a read head for reading a magnetic strip of a payment card, and further can include encryption technology for encrypting the information read from the magnetic strip. Additionally or alternatively, the reader device 3226 can be an EMV payment reader, which in some examples, can be embedded in the user device 3202. Moreover, numerous other types of readers can be employed with the user device 3202 herein, depending on the type and configuration of the user device 3202.

The reader device 3226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 3226 may include hardware implementation, such as slots, magnetic tracks, and rails with one or more sensors or electrical contacts to facilitate detection and acceptance of a payment instrument. That is, the reader device 3226 may include hardware implementations to enable the reader device 3226 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 3226 may also include a biometric sensor to receive and process biometric characteristics and process them as payment instruments, given that such biometric characteristics are registered with the service provider 3112 and connected to a financial account with a bank server.

The reader device 3226 may include processing unit(s), computer-readable media, a reader chip, a transaction chip, a timer, a clock, a network interface, a power supply, and so on. The processing unit(s) of the reader device 3226 may execute one or more components and/or processes to cause the reader device 3226 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 3226, the computer-readable media may include volatile memory (such as RAM), non-volatile memory (such as ROM, flash memory, miniature hard drive, memory card, or the like), or some combination thereof. In at least one example, the computer-readable media of the reader device 3226 may include at least one component for performing various functions as described herein.

The reader chip may perform functionalities to control the operations and processing of the reader device 3226. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 326, which may provide a clock signal indicating a time. Furthermore, the reader chip may perform functionality to control the network interface, which may interface with the network(s) 3206, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 3226. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 3202, which can be a POS terminal, and the reader device 3226 are shown as separate devices, in additional or alternative examples, the user device 3202 and the reader device 3226 can be part of a single device, which may be a battery-operated device. In such an example, components of both the user device 3202 and the reader device 3226 may be associated with the single device. In some examples, the reader device 3226 can have a display integrated therewith, which can be in addition to (or as an alternative of) the display 3216 associated with the user device 3202.

The server(s) 3204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 3204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 3204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 3204 can include one or more processors 3228, one or more computer-readable media 3230, one or more I/O devices 3232, and one or more communication interfaces 3234. Each processor 3228 can be a single processing unit or a number of processing units, and can include single or multiple computing units or multiple processing cores. The processor(s) 3228 can be implemented as one or more microprocessors, microcomputers, microcontrollers, digital signal processors, central processing units, state machines, logic circuitries, and/or any devices that manipulate signals based on operational instructions. For example, the processor(s) 3228 can be one or more hardware processors and/or logic circuits of any suitable type specifically programmed or configured to execute the algorithms and processes described herein. The processor(s) 3228 can be configured to fetch and execute computer-readable instructions stored in the computer-readable media 3230, which can program the processor(s) 3228 to perform the functions described herein.

The computer-readable media 3230 can include volatile and nonvolatile memory and/or removable and non-removable media implemented in any type of technology for storage of information, such as computer-readable instructions, data structures, program components, or other data. Such computer-readable media 3230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 3204, the computer-readable media 3230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 3230 can be used to store any number of functional components that are executable by the processor(s) 3228. In many implementations, these functional components comprise instructions or programs that are executable by the processors 3228 and that, when executed, specifically configure the one or more processors 3228 to perform the actions attributed above to the service provider 3112 and/or payment processing service. Functional components stored in the computer-readable media 3230 can optionally include a merchant component 3236, a training component 3238, and one or more other components and data 3240.

The merchant component 3236 can be configured to receive transaction data from POS systems, such as the POS system 3124 described above with reference to FIG. 31. The merchant component 3236 can transmit requests (e.g., authorization, capture, settlement, etc.) to payment service server computing device(s) to facilitate POS transactions between merchants and customers. The merchant component 3236 can communicate the successes or failures of the POS transactions to the POS systems.

The training component 3238 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 3202 and/or the server(s) 3204 for use at a time after the data models have been trained (e.g., at runtime).

The one or more other components and data 3240 can include the merchant component 120 and the payment processing component 122, the functionality of which is described, at least partially, above. Further, the one or more other components and data 3240 can include programs, drivers, etc., and the data used or generated by the functional components. Further, the server(s) 3204 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Components are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 3230 can additionally include an operating system 3224 for controlling and managing various functions of the server(s) 3204.

The communication interface(s) 3234 can include one or more interfaces and hardware components for enabling communication with various other devices, such as over the network(s) 3206 or directly. For example, communication interface(s) 3234 can enable communication through one or more network(s) 3206, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 3206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 3204 can further be equipped with various I/O devices 3232. Such I/O devices 3232 can include a display, various user interface controls (e.g., buttons, joystick, keyboard, mouse, touch screen, biometric or sensory input devices, etc.), audio speakers, connection ports and so forth.

In at least one example, the system 3200 can include a datastore 3244 that can be configured to store data that is accessible, manageable, and updatable. In some examples, the datastore 3244 can be integrated with the user device 3202 and/or the server(s) 3204. In other examples, as shown in FIG. 32, the datastore 3244 can be located remotely from the server(s) 3204 and can be accessible to the server(s) 3204. The datastore 3244 can comprise multiple databases and/or servers connected locally and/or remotely via the network(s) 3206. The data store(s) 124 can correspond to the data store(s) 3242.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1, 31, and 32 for convenience and ease of understanding. However, the methods illustrated are not limited to being performed using components described in FIGS. 1, 31, and 32, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

EXAMPLE CLAUSES

A. A computer-implemented method comprising: receiving, via a point-of-sale (POS) application of a merchant device in a brick-and-mortar store of a merchant that uses a payment processing service for processing payments, an input to initiate a transaction between the merchant and a customer; determining, by the POS application, transaction data associated with an item to be purchased in the transaction; determining, by the POS application, a total amount for the transaction based on the transaction data; after the total amount is determined by the POS application, sending the total amount to a customer application of a customer device of the customer for presentation on a user interface (UI); sending a request for deferred payment of the total amount to the customer application, the request causing an instruction to be presented via the UI instructing the customer to (i) leave the brick-and-mortar store of the merchant and (ii) complete the request for deferred payment after leaving; receiving, at a computing device associated with the payment processing service, payment data to pay the total amount from the customer application; and processing, by the computing device associated with the payment processing service, payment for the total amount using the payment data.

B. The computer-implemented method as clause A recites, wherein the POS application is provided to the merchant device by the payment processing service and the customer application is provided to the customer device by the payment processing service.

C. The computer-implemented method as clause A or B recites, further comprising: accessing customer data associated with the customer; determining, based at least in part on the customer data, an indication of risk associated with whether the customer will complete the request for the deferred payment after leaving; and determining an amount of time to allow the customer to complete the request for deferred payment based at least in part on the determined indication of risk, wherein at least one of the request for deferred payment or the instruction include an indication of the amount of time.

D. The computer-implemented method as any of clauses A-C recites, further comprising sending, to the customer device, an electronic receipt indicating payment for the total amount is complete, wherein the electronic receipt includes at least one of (i) a feedback mechanism to enable the customer to provide feedback after completing the request or (ii) a chat mechanism to enable the customer to communicate with the merchant after completing the request.

E. A computer-implemented method comprising: receiving, via a point-of-sale (POS) application of a merchant device in a brick-and-mortar store of a merchant, an input to initiate a transaction between the merchant and a customer, wherein the POS application is provided by a payment processing service to enable the merchant to process payments for transactions via the payment processing service; determining, by the POS application, transaction data associated with an item to be purchased in the transaction; after the transaction data is generated by the POS application, sending the transaction data to a customer application of a customer device of the customer for presentation on a user interface (UI), wherein the customer application is provided by the payment processing service; sending, to the customer application, a request for identification of the customer; receiving an indication of the identification of the customer; comparing the indication of the identification with stored customer data associated with the customer; verifying the identification of the customer based at least in part on the comparing; sending, by the POS application and based at least in part on verifying the identification of the customer, a request for payment to satisfy a cost of the transaction to the customer application; receiving, at one or more computing devices associated with the payment processing service, payment data to satisfy the cost of the transaction; and processing, by the one or more computing devices associated with the payment processing service, payment for the cost of the transaction using the payment data.

F. The computer-implemented method as clause E recites, further comprising: after the transaction data is generated by the POS application, receiving, from the POS application, the transaction data at the one or more computing devices associated with the payment processing service; receiving, at the one or more computing devices associated with the payment processing service, an identifier associated with the merchant from the customer application; and sending, by the one or more computing devices associated with the payment processing service, the transaction data to the customer application based at least in part on receiving the identifier associated with the merchant from the customer application.

G. The computer-implemented method as clause E or F recites, further comprising: after the transaction data is generated by the POS application, receiving, from the POS application, the transaction data at the one or more computing devices associated with the payment processing service; receiving, at the one or more computing devices associated with the payment processing service, an identifier associated with the customer from the POS application; and sending, by the one or more computing devices associated with the payment processing service, the transaction data to the customer application based at least in part on receiving the identifier associated with the customer from the POS application.

H. The computer-implemented method as any of clauses E-G recites, further comprising: determining that the customer device is proximate to the merchant device; and sending the transaction data to the customer application based at least in part on determining that the customer device is proximate to the merchant device.

I. The computer-implemented method as any of clauses E-H recites, wherein the stored customer data is stored in a data store associated with the payment processing service or a data store associated with a third-party, and wherein the stored customer data is accessed based at least in part on obtaining consent from the customer.

J. The computer-implemented method as any of clauses E-I recites, further comprising: sending a request for loyalty information to the customer application, wherein the request for loyalty information is presented via the UI; receiving, from the customer application, customer loyalty information associated with the customer; and causing, based at least in part on receiving the customer loyalty information, reward data to be presented with the transaction data on the UI.

K. The computer-implemented method as any of clauses E-J recites, wherein the payment data is associated with a payment instrument of the customer, and receiving the payment data to satisfy the cost of the transaction comprises: receiving the payment data from the POS application, wherein the payment data is received by the POS application via a reader device associated with the merchant device; receiving the payment data from the customer application, wherein the payment data is received by the customer application via a reader device associated with the customer device; receiving the payment data from the customer application, wherein the payment data is accessed by the customer application from a mobile wallet associated with stored payment data; or receiving the payment data from a data store of the payment processing service, wherein the payment data is permissibly stored by the payment processing service for use by the customer.

L. The computer-implemented method as any of clauses E-K recites, further comprising: prior to sending the request for payment to the customer application, sending, to the customer application, a request for a temperature reading of the customer; receiving the temperature reading of the customer; determining whether the temperature reading satisfies a threshold or is within a range; and sending the request for payment to the customer application further based at least in part on the temperature reading satisfying the threshold or being within the range.

M. The computer-implemented method as any of clauses E-L recites, prior to sending the request for payment to the customer application, sending, to the customer application, at least one of (i) a request for deferred payment of the transaction or (ii) an instruction to leave the brick-and-mortar store of the merchant, wherein the payment data is received after the customer leaves the brick-and-mortar store of the merchant.

N. The computer-implemented method as clause M recites, further comprising: accessing customer data associated with the customer; determining, based at least in part on the customer data, an indication of risk associated with whether the customer will complete the request for the deferred payment after leaving; and determining an amount of time to allow the customer to complete the request for deferred payment, wherein at least one of the request for deferred payment or the instruction include an indication of the amount of time.

O. The computer-implemented method as any of clauses E-N recites, further comprising: prior to sending the request for payment to the customer application, determining that the customer qualifies for a deferred payment option, wherein the request for payment is associated with the deferred payment option; receiving, from the customer application, an indication of a selection of the deferred payment option; transferring, from an account of the payment processing service, funds associated with the cost of the transaction to a merchant account of the merchant prior to receiving the payment data from the customer; and based at least in part on processing payment for the transaction using the payment data, replenishing the account of the payment processing service for funds transferred to the merchant account.

P. A computer-implemented method comprising: receiving, via a first user interface (UI) presented on a first customer device, a first list of items to be purchased by a first customer; receiving, via a second UI presented on a second customer device, a second list of items to be purchased by a second customer; accessing, from a data store associated with a payment processing service, inventory data of a plurality of merchants associated with the payment processing service; determining, based at least in part on the first list of items and the inventory data, at least one of (i) a first time at which the first customer is to obtain the first list of items or (ii) a first merchant of the plurality of merchants from which the first customer is to obtain the first list of items; sending, to the first customer device, a first indication of the at least one of the first time or the first merchant; determining, based at least in part on the second list of items and the inventory data, at least one of (i) a second time at which the second customer is to obtain the second list of items or (ii) a second merchant of the plurality of merchants from which the second customer is to obtain the second list of items; and sending, to the second customer device, a second indication of the at least one of the second time or the second merchant, wherein at least one of the second time is different than the first time or the second merchant is different than the first merchant.

Q. The computer-implemented method as clause P recites, further comprising: receiving data associated with the plurality of merchants, wherein the data comprises indications of one or more of: occupancies of brick-and-mortar stores of the plurality of merchants; wait times associated with the brick-and-mortar stores; volumes of transactions processed on behalf of the plurality of merchants; and available inventories of the plurality of merchants; and determining the at least one of the first time, the first merchant, the second time, or the second merchant based at least in part on the data.

R. The computer-implemented method as clause P or Q recites, wherein the first list of items includes a first item that is associated with a first fulfillment mechanism and a second item that is associated with a second fulfillment mechanism.

S. The computer-implemented method as clause R recites, wherein the first item is designated by the first customer or recommended by the payment processing service.

T. The computer-implemented method as any of clauses P-S recites, further comprising: accessing stored customer data associated with at least the first customer; accessing transaction data associated with one or more previous transactions of at least the first customer; determining, based at least in part on the stored customer data and the transaction data, at least one item to add to the first list of items; and sending a recommendation to add the at least one item to the first list of items for presentation via the first UI.

While the example clauses described above are described with respect to one particular implementation, it should be understood that, in the context of this document, the content of the example clauses can also be implemented via a method, device, system, a computer-readable medium, and/or another implementation. Additionally, any of example clauses A-T may be implemented alone or in combination with any other one or more of the example clauses A-T.

What is claimed is:

1. A computer-implemented method comprising:
   receiving, via a point-of-sale (POS) application of a merchant device in a brick-and-mortar store of a merchant that uses a payment processing service for processing payments, and via a first user interface (UI) presented by the POS application, an input to initiate a transaction between the merchant and a customer;
   determining, by the POS application, transaction data associated with an item to be purchased in the transaction;
   determining, by the POS application, a total amount for the transaction based on the transaction data;
   after the total amount is determined by the POS application, sending the total amount to a customer application of a customer device of the customer for presentation on a second UI presented by the customer application;
   sending a request for deferred payment of the total amount to the customer application, the request causing an instruction to be presented via the second UI presented by the customer application, wherein the instruction instructs the customer to (i) leave the brick-and-mortar store of the merchant and (ii) complete the request for deferred payment after leaving;
   receiving, at a computing device associated with the payment processing service and at a time after the request for deferred payment is sent to the customer application, payment data to pay the total amount from the customer application; and
   processing, by the computing device associated with the payment processing service, payment for the total amount using the payment data.

2. The computer-implemented method as claim 1 recites, wherein the POS application is provided to the merchant device by the payment processing service and the customer application is provided to the customer device by the payment processing service.

3. The computer-implemented method as claim 1 recites, further comprising:
   accessing customer data associated with the customer;
   determining, based at least in part on the customer data, an indication of risk associated with whether the customer will complete the request for the deferred payment after leaving; and
   determining an amount of time to allow the customer to complete the request for deferred payment based at least in part on the determined indication of risk, wherein at least one of the request for deferred payment or the instruction include an indication of the amount of time.

4. The computer-implemented method as claim 1 recites, further comprising sending, to the customer device, an electronic receipt indicating the payment for the total amount is complete, wherein the electronic receipt includes at least one of (i) a feedback mechanism to enable the customer to provide feedback after completing the request or (ii) a chat mechanism to enable the customer to communicate with the merchant after completing the request.

5. The computer-implemented method as claim 1 recites, further comprising:
   sending, to the customer application, a request for identification of the customer;
   receiving, via the second UI presented by the customer application, an indication of the identification of the customer;
   comparing the indication of the identification with stored customer data associated with the customer;
   verifying the identification of the customer based at least in part on the comparing; and
   sending the request for deferred payment of the total amount to the customer application based at least in part on verifying the identification of the customer.

6. The computer-implemented method as claim 1 recites, further comprising:
   receiving an identifier associated with the merchant from the customer application; and
   sending at least one of (i) the total amount or (ii) the request for deferred payment of the total amount to the customer application based at least in part on receiving the identifier associated with the merchant from the customer application.

7. The computer-implemented method as claim 1 recites, further comprising:
   receiving an identifier associated with the customer from the POS application; and
   sending at least one of (i) the total amount or (ii) the request for deferred payment of the total amount to the customer application based at least in part on receiving the identifier associated with the customer from the POS application.

8. The computer-implemented method as claim 1 recites, further comprising:
   determining that the customer device is proximate to the merchant device; and
   sending at least one of (i) the total amount or (ii) the request for deferred payment of the total amount to the customer application based at least in part on determining that the customer device is proximate to the merchant device.

9. The computer-implemented method as claim 1 recites, wherein (i) the total amount and (ii) the request for deferred payment of the total amount are sent to the customer application by the POS application.

10. The computer-implemented method as claim 1 recites, wherein (i) the total amount and (ii) the request for deferred payment of the total amount are sent to the customer application by the computing device of the payment processing service.

11. The computer-implemented method as claim 1 recites, further comprising:
    sending a request for loyalty information to the customer application, wherein the request for loyalty information is presented via the second UI presented by the customer application;
    receiving, from the customer application and via an input to the second UI presented by the customer application, customer loyalty information associated with the customer; and
    causing, based at least in part on receiving the customer loyalty information, reward data to be presented on the second UI presented by the customer application.

12. A system comprising:
    one or more processors; and
    one or more non-transitory computer-readable media storing instructions, that when executed by the one or more processors, cause the system to perform operations comprising:
        receiving, via a point-of-sale (POS) application of a merchant device in a brick-and-mortar store of a merchant that uses a payment processing service for processing payments, and via a first user interface (UI) presented by the POS application, an input to initiate a transaction between the merchant and a customer;
        determining, by the POS application, transaction data associated with an item to be purchased in the transaction;
        determining, by the POS application, a total amount for the transaction based on the transaction data;
        after the total amount is determined by the POS application, sending the total amount to a customer application of a customer device of the customer for presentation on a second UI presented by the customer application;
        sending a request for deferred payment of the total amount to the customer application, the request causing an instruction to be presented via the second UI presented by the customer application, wherein the instruction instructs the customer to (i) leave the brick-and-mortar store of the merchant and (ii) complete the request for deferred payment after leaving;
        receiving, at one or more computing devices associated with the payment processing service, payment data to pay the total amount from the customer application; and
        processing, by the one or more computing devices associated with the payment processing service, payment for the total amount using the payment data.

13. The system as claim 12 recites, the operations further comprising:
    accessing customer data associated with the customer;
    determining, based at least in part on the customer data, an indication of risk associated with whether the customer will complete the request for the deferred payment after leaving; and
    determining an amount of time to allow the customer to complete the request for deferred payment based at least in part on the determined indication of risk, wherein at least one of the request for deferred payment or the instruction include an indication of the amount of time.

14. The system as claim 12 recites, the operations further comprising sending, to the customer device, an electronic receipt indicating payment for the total amount is complete, wherein the electronic receipt includes at least one of (i) a feedback mechanism to enable the customer to provide feedback after completing the request or (ii) a chat mechanism to enable the customer to communicate with the merchant after completing the request.

15. The system as claim 12 recites, the operations further comprising:
    sending, to the customer application, a request for identification of the customer;
    receiving an indication of the identification of the customer;
    comparing the indication of the identification with stored customer data associated with the customer;

verifying the identification of the customer based at least in part on the comparing; and sending the request for deferred payment of the total amount to the customer application based at least in part on verifying the identification of the customer.

16. The system as claim 12 recites, the operations further comprising:

receiving an identifier associated with the merchant from the customer application; and sending at least one of (i) the total amount or (ii) the request for deferred payment of the total amount to the customer application based at least in part on receiving the identifier associated with the merchant from the customer application.

17. The system as claim 12 recites, the operations further comprising:

receiving an identifier associated with the customer from the POS application; and sending at least one of (i) the total amount or (ii) the request for deferred payment of the total amount to the customer application based at least in part on receiving the identifier associated with the customer from the POS application.

18. The system as claim 12 recites, the operations further comprising:

determining that the customer device is proximate to the merchant device; and sending at least one of (i) the total amount or (ii) the request for deferred payment of the total amount to the customer application based at least in part on determining that the customer device is proximate to the merchant device.

19. The system as claim 12 recites, the operations further comprising:

sending a request for loyalty information to the customer application, wherein the request for loyalty information is presented via the second UI;

receiving, from the customer application, customer loyalty information associated with the customer; and causing, based at least in part on receiving the customer loyalty information, reward data to be presented on the second UI.

20. One or more non-transitory computer-readable media storing instructions, that when executed by one or more processors, cause the one or more processors to perform operations comprising:

receiving, via a point-of-sale (POS) application of a merchant device in a brick-and-mortar store of a merchant that uses a payment processing service for processing payments, and via a first user interface (UI) presented by the POS application, an input to initiate a transaction between the merchant and a customer;

determining, by the POS application, transaction data associated with an item to be purchased in the transaction;

determining, by the POS application, a total amount for the transaction based on the transaction data;

after the total amount is determined by the POS application, sending the total amount to a customer application of a customer device of the customer for presentation on a second UI presented by the customer application;

sending a request for deferred payment of the total amount to the customer application, the request causing an instruction to be presented via the second UI instructing the customer to (i) leave the brick-and-mortar store of the merchant and (ii) complete the request for deferred payment after leaving;

receiving, at one or more computing devices associated with the payment processing service, payment data to pay the total amount from the customer application; and processing, by the one or more computing devices associated with the payment processing service, payment for the total amount using the payment data.

* * * * *